US011467368B2

(12) United States Patent
Lee et al.

(10) Patent No.: US 11,467,368 B2
(45) Date of Patent: Oct. 11, 2022

(54) LENS DRIVING DEVICE, AND CAMERA MODULE AND OPTICAL DEVICE INCLUDING SAME

(71) Applicant: LG INNOTEK CO., LTD., Seoul (KR)

(72) Inventors: Sung Guk Lee, Seoul (KR); Sang Jun Min, Seoul (KR); Tae Jin Jung, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 195 days.

(21) Appl. No.: 16/643,426

(22) PCT Filed: Aug. 29, 2018

(86) PCT No.: PCT/KR2018/009965
§ 371 (c)(1),
(2) Date: Feb. 28, 2020

(87) PCT Pub. No.: WO2019/045439
PCT Pub. Date: Mar. 7, 2019

(65) Prior Publication Data
US 2021/0364729 A1 Nov. 25, 2021

(30) Foreign Application Priority Data

Aug. 30, 2017 (KR) ........................ 10-2017-0109853
Sep. 26, 2017 (KR) ........................ 10-2017-0123965
Sep. 28, 2017 (KR) ........................ 10-2017-0126106

(51) Int. Cl.
*G02B 7/08* (2021.01)
*G02B 7/09* (2021.01)
(Continued)

(52) U.S. Cl.
CPC ................. *G02B 7/08* (2013.01); *G02B 7/09* (2013.01); *G03B 3/10* (2013.01); *G03B 5/04* (2013.01);
(Continued)

(58) Field of Classification Search
CPC ... G02B 7/04; G02B 7/08; G02B 7/09; G02B 7/023; G03B 3/10; G03B 5/04;
(Continued)

(56) References Cited

U.S. PATENT DOCUMENTS 8,995,241 B1 3/2015 Heo et al.
2010/0246035 A1 9/2010 Yamashita et al.
(Continued)

FOREIGN PATENT DOCUMENTS

CN 104423007 A 3/2015
CN 105372785 A 3/2016
(Continued)

OTHER PUBLICATIONS

English machine translation of KR20150124036 corresponding to issued KR-101625818-B1 (Year: 2015).*
(Continued)

*Primary Examiner* — Marin Pichler
(74) *Attorney, Agent, or Firm* — Birch, Stewart, Kolasch & Birch, LLP

(57) ABSTRACT

An embodiment comprises: a base which comprises a body and a first column part, a second column part, a third column part, and a fourth column part arranged at corner parts of the body, respectively; a bobbin disposed on the body; a first roller part disposed in a first groove provided on the first column part; a second roller part disposed in a second groove provided on the second column part adjacent to the first column part; a magnet disposed on the bobbin; and a coil corresponding to the magnet and disposed between the first and the second column part, wherein the first roller part contacts at least two areas of the first groove, the second roller part contacts at least two areas of the second groove, the first groove comprises a first opening through which a part of the first roller part is exposed, the second groove
(Continued)

comprises a second opening through which a part of the second roller part is exposed, and the bobbin comprises a first support part disposed in the first opening and contacting the first roller part and a second support part disposed in the second opening and contacting the second roller part.

19 Claims, 40 Drawing Sheets

(51) Int. Cl.
*G03B 3/10* (2021.01)
*G03B 30/00* (2021.01)
*G03B 5/04* (2021.01)
*H02K 41/035* (2006.01)
*H04N 5/225* (2006.01)

(52) U.S. Cl.
CPC ......... *G03B 30/00* (2021.01); *H02K 41/0356* (2013.01); *H04N 5/2253* (2013.01); *G03B 2205/0069* (2013.01)

(58) Field of Classification Search
CPC ............ G03B 30/00; G03B 2205/0069; H02K 41/0356; H04N 5/2253
USPC ............................ 359/824, 823, 822; 396/89
See application file for complete search history.

(56) References Cited

U.S. PATENT DOCUMENTS

| | | | |
|---|---|---|---|
| 2012/0092551 A1 | 4/2012 | Ohishi et al. | |
| 2015/0070791 A1 | 3/2015 | Lam | |
| 2016/0048033 A1 | 2/2016 | Kim et al. | |
| 2016/0178924 A1 | 6/2016 | Lim et al. | |
| 2016/0344919 A1 | 11/2016 | Cho et al. | |
| 2017/0134628 A1 | 5/2017 | Hwang et al. | |

FOREIGN PATENT DOCUMENTS

| | | | | |
|---|---|---|---|---|
| CN | 105717725 A | | 6/2016 | |
| CN | 106170053 A | | 11/2016 | |
| CN | 106918973 A | | 7/2017 | |
| EP | 3166303 A1 | | 5/2017 | |
| JP | 2012-83582 A | | 4/2012 | |
| JP | 2013-148699 A | | 8/2013 | |
| KR | 10-2007-0047992 A | | 5/2007 | |
| KR | 10-2010-0108259 A | | 10/2010 | |
| KR | 10-2011-0008512 A | | 1/2011 | |
| KR | 10-1319169 B1 | | 10/2013 | |
| KR | 10-1451652 B1 | | 10/2014 | |
| KR | 20150124036 A | * | 11/2015 | |
| KR | 10-2015-0145682 A | | 12/2015 | |
| KR | 10-1625818 B1 | | 6/2016 | |
| KR | 101625818 B1 | * | 6/2016 | |
| KR | 10-2016-0120690 A | | 10/2016 | |
| KR | 10-2016-0137330 A | | 11/2016 | |
| KR | 10-2017-0051928 A | | 5/2017 | |
| KR | 10-2017-0093051 A | | 8/2017 | |
| WO | WO 2017/105010 A1 | | 6/2017 | |

OTHER PUBLICATIONS

International Search Report (PCT/ISA/210) issued in PCT/KR2018/009965, dated Dec. 14, 2018.

* cited by examiner

LENS DRIVING DEVICE, AND CAMERA MODULE AND OPTICAL DEVICE INCLUDING SAME

CROSS REFERENCE TO RELATED APPLICATIONS

This application is the National Phase of PCT International Application No. PCT/KR2018/009965, filed on Aug. 29, 2018, which claims priority under 35 U.S.C. 119(a) to Patent Application No. 10-2017-0109853, filed in the Republic of Korea on Aug. 30, 2017, Patent Application No. 10-2017-0123965, filed in the Republic of Korea on Sep. 26, 2017 and Patent Application No. 10-2017-0126106, filed in the Republic of Korea on Sep. 28, 2017, all of which are hereby expressly incorporated by reference into the present application.

TECHNICAL FIELD

Embodiments relate to a lens moving apparatus and to a camera module and an optical device each including the same.

BACKGROUND ART

It is difficult to apply technology of a voice coil motor (VCM) used in existing general camera modules to a subminiature, low-power camera module, and therefore research related thereto has been actively conducted.

Demand for and production of electronic products, such as smartphones and mobile phones equipped with cameras have increased. A camera for mobile phones is on a trend of increased resolution and miniaturization. As a result, an actuator has also been miniaturized, increased in diameter, and been made multifunctional. In order to realize a high-resolution camera for mobile phones, improvement in performance of the camera for mobile phones and additional functions thereof, such as autofocus, handshake correction, and zooming, are required.

DISCLOSURE

Technical Problem

Embodiments provide a lens moving apparatus capable of improving the speed of AF operation, of suppressing the movement of a bobbin during AF operation and of increasing a range of possible sizes of a magnet and a coil, and a camera module and an optical device each including the same.

Furthermore, the embodiments provide a novel lens moving apparatus configured to guide the bobbin in the optical-axis direction by means of a roller in place of a leaf spring, and a camera module and an optical device each including the same.

Technical Solution

A lens moving apparatus according to a first embodiment comprises a base including a body and a first post, a second post, a third post and a fourth post disposed at corner portions of the body, a bobbin disposed on the body, a first roller unit disposed in a first groove formed in the first post, a second roller unit disposed in a second groove formed in the second post adjacent to the first post, a magnet disposed at the bobbin, and a coil disposed between the first post and the second post so as to correspond to the magnet, wherein the first roller unit is in contact with at least two regions of the first groove, and the second roller unit is in contact with at least two regions of the second groove, wherein the first groove comprises a first opening, through which a portion of the first roller unit is exposed, and the second groove comprises a second opening, through which a portion of the second roller unit is exposed, and wherein the bobbin comprises a first support disposed in the first opening so as to be in contact with the first roller, and a second support disposed in the second opening so as to be in contact with the second roller.

The first support may project from an outer surface of the bobbin, and the second support may project from the outer surface of the bobbin. The first roller unit may be in contact with four regions of the first groove, and the second roller unit may be in contact with four regions of the second groove.

The lens moving apparatus according to the first embodiment may further comprise a circuit board, which is secured to the base and to which the coil is coupled, the circuit board being secured to the first post and the second post.

The circuit board may comprise a terminal conductively connected to the coil, the terminal including a first terminal and a second terminal and being disposed at the body.

The lens moving apparatus according to the first embodiment may further comprise a magnetic body disposed at the base under the coil so as to generate attractive force in cooperation with the magnet. The magnetic body may be disposed on the outer surface of the base. The magnetic body may comprise a plate disposed on the outer surface of the body of the base, a first extension disposed on the outer surface of the first post and extending upwards from the plate, and a second extension disposed on the outer surface of the second post and extending upwards from the plate.

Each of the first roller unit and the second roller unit may comprise a plurality of rollers, each of the plurality of rollers having a cylindrical shape. Each of the first roller unit and the second roller unit may be disposed so as to be rotatable about an axis perpendicular to an optical axis.

The ratio of the diameter and the longitudinal length of each of the plurality of rollers may be 1:1.5~1:5. The bobbin may comprise first to fourth projections disposed at the side surface thereof, and the magnet may be disposed in a mounting recess formed in the first projection, the first projection being disposed between the first post and the second post, the second projection being disposed between the second post and the third post, the third projection being disposed between the third post and the fourth post and the fourth projection being disposed between the fourth post and the first post.

The first roller unit may be disposed so as to be inclined at a first angle with respect to a first reference line, and the second roller unit may be disposed so as to be inclined at a second angle with respect to the first reference line. The first reference line may be an imaginary line parallel to a direction toward the second post from the first post, and the first angle may be different from the second angle.

The angle between the central axis of the roller and the first reference line may be 30°~60°, the central axis may be an axis that extends through the diametric center of the roller and is parallel to the longitudinal direction of the roller, and the roller may be rotatable about the central axis.

The lens moving apparatus may further comprise lubricant disposed in the first groove and the second groove, and the lubricant may be in contact with the first groove and the first roller unit and may be in contact with the second groove and the second roller unit.

A lens moving apparatus according to a second embodiment comprises a base including a body, and a first post and a second post adjacent to the first post, the first and second posts being respectively disposed at corners of the body, a bobbin disposed on the body, a first roller unit disposed in a first groove formed in the first post, a second roller unit disposed in a second groove formed in the second post, a magnet disposed at the bobbin, a substrate secured to the base, a coil coupled to the substrate so as to face the magnet, and a magnetic body disposed at the base under the coil so as to generate attractive force in cooperation with the magnet, wherein the first roller unit is in contact with the first post and the bobbin, and the second roller unit is in contact with the second post and the bobbin.

A lens moving apparatus according to a third embodiment comprises a base including a body and a first post, a second post, a third post and a fourth post, which are disposed at corner portion of the body, a bobbin disposed on the body, a magnet disposed on a first side surface of the bobbin, a first roller unit disposed in a first groove formed in a second side surface of the bobbin, a second roller unit disposed in a second groove formed in a third side surface of the bobbin, and a coil disposed between the first post and the second post so as to correspond to the magnet, wherein the first side surface of the bobbin is disposed between the second side surface and the third side surface, wherein the first roller unit is in contact with at least two regions of the first groove and the second roller unit is in contact with at least two regions of the second groove, wherein the first groove comprises a first opening, through which a portion of the first roller unit is exposed, and the second groove comprises a second opening, through which a portion of the second roller unit is exposed, and wherein the base comprises a first support disposed in the first opening so as to be in contact with the first roller unit and a second support disposed in the second opening so as to be in contact with the second roller unit.

The first support may project from the inner surface of the first post, and the second support may project from the inner surface of the second post.

The first roller unit may be in contact with four regions of the first groove, and the second roller unit may be in contact with four regions of the second groove.

A lens moving apparatus according to a third embodiment may further comprise a circuit board, which is secured to the base and to which the coil is coupled, and the circuit board may be secured to the first post and to the second post.

The circuit board may comprise a terminal conductively connected to the coil, and the terminal may comprise a first terminal and a second terminal, and may be disposed at the body of the base.

The lens moving apparatus according to the third embodiment may further comprise a magnetic body disposed at the base under the coil so as to generate attractive force in cooperation with the magnet. The magnetic body may be disposed on the outer surface of the base. The magnetic body may comprise a plate disposed on the outer surface of the body, a first extension disposed on the outer surface of the first post and extending upwards from the plate, and a second extension disposed on the outer surface of the second post and extending upwards from the plate.

Each of the first roller unit and the second roller unit may comprise a plurality of rollers, and each of the rollers may have a cylindrical shape and may be disposed so as to be rotatable about an axis perpendicular to the optical axis. The first roller unit may be disposed so as to be inclined at a first angle with respect to a first reference line, and the second roller unit may be disposed so as to be inclined at a second angle with respect to the first reference line. The first reference line may be an imaginary line parallel to a direction toward the second post from the first post, and the first angle and the second angle may be different from each other.

The lens moving apparatus according to the third embodiment may further comprise a roller cover disposed at the upper portion, the upper end or the upper surface of the bobbin so as to prevent the first roller unit and the second roller unit from being separated from the first groove and the second groove.

A lens moving apparatus according to a fourth embodiment comprises a housing including a base, and a first post, a second post, a third post and a fourth post, which are respectively disposed at the four corners of the base and project upwards from the base, a bobbin disposed in the housing, a coil disposed at the housing such that at least a portion thereof is exposed to the inside of the housing through the space between the first post and the second post, a magnet disposed at the bobbin so as to face the coil exposed through the space between the first post and the second post, and a roller disposed at the housing and positioned between the third post and the fourth post so as to be in contact with the bobbin, wherein the coil and the roller face each other with the bobbin interposed therebetween, and the roller is disposed so as to be rotated about an axis extending toward the fourth post from the third post.

The lens moving apparatus according to the fourth embodiment may further comprise a terminal positioned between the housing and the coil and conductively connected to the coil, the terminal including a magnetic material such that attractive force acts between the terminal and the magnet.

The magnet may comprise a first magnet disposed at the bobbin so as to face the coil, a second magnet disposed at the bobbin so as to face the roller, and a third magnet disposed at the housing and positioned between the third post and the fourth post, wherein attractive force acts between the second magnet and the third magnet.

The roller may be disposed between the second magnet and the third magnet.

The coil may comprise a first coil portion extending toward the second post from the first post, a second coil portion positioned under the first coil and extending toward the first post from the second post, a third coil portion connecting one end of the first coil portion to one end of the second coil portion, and a fourth coil portion connecting the other end of the first coil portion to the other end of the second coil portion, wherein the magnet may comprise a first magnet portion facing the first coil portion and a second magnet portion facing the second coil portion, and wherein orientations of polarities of the first magnet portion and the second magnet portion may be different from each other.

The housing may comprise a first connector connecting the first post to the second post, a second connector connecting the first post to the second post and positioned under the first connector, a first side wall connecting the second post to the third post, a second side wall connecting the third post to the fourth post, and a third side wall connecting the fourth post to the first post, the coil may be positioned between the first connector and the second connector, and the roller may be positioned inside the second side wall.

The housing may further comprise a first contact and a second contact, which project toward the roller from the second side wall so as to be in contact with the roller.

The housing may further comprise a first shield wall positioned inside the second side wall and projecting toward the fourth post from the third post, and a second shield wall positioned inside the second side wall and projecting toward the third post from the fourth post, and one end of the roller may be positioned between the first contact and the first shield wall so as to be in contact with one surface of the first shield wall, and the other end of the roller may be positioned between the second contact and the second shield wall so as to be in contact with one surface of the second shield wall.

The bobbin may comprise a third contact and a fourth contact, which project toward the roller from the surfaces that face the second side wall so as to be in contact with the roller.

A lens moving apparatus according to a fifth embodiment comprises a housing including a base, and a first post, a second post, a third post and a fourth post, which are respectively disposed at the four corners of the base and project upwards from the base, a lens module positioned inside the housing, a lens module disposed inside the bobbin, a substrate disposed under the base, an image sensor disposed at the substrate and positioned so as to face the lens module, a coil disposed at the housing such that at least a portion thereof is exposed to the inside of the housing through the space between the first post and the second post, a magnet disposed at the bobbin so as to face the coil exposed through the space between the first post and the second post, and a roller disposed at the housing between the third post and the fourth post so as to be in contact with the bobbin, wherein the coil and the roller face each other with the bobbin interposed therebetween, and the roller comprise a curved surface disposed so as to be rotated about an axis extending toward the fourth post from the third post.

An optical device according to an embodiment comprises a body, a display unit positioned at one side of the body, a housing, which is disposed inside the body and which comprises a base and first to fourth posts respectively disposed at the four corners of the base and projecting upwards from the base, a bobbin positioned inside the housing, a lens module disposed inside the bobbin, a substrate disposed under the base and conductively connected to the display unit, an image sensor disposed at the substrate and positioned so as to face the lens module, a coil disposed at the housing such that at least a portion thereof is exposed to the inside of the housing through the space between the first post and the second post, a magnet disposed at the bobbin so as to face the coil, and a roller disposed at the housing and positioned between the third post and the fourth post so as to be in contact with the bobbin, wherein the coil and the roller face each other with the bobbin interposed therebetween, and the roller comprise a curved surface disposed so as to be rotated about an axis extending toward the fourth post from the third post.

Advantageous Effects

Embodiments are capable of improving the speed of AF operation, of suppressing movement of a bobbin during AF operation, and of increasing the range of possible sizes of a magnet and a coil.

BEST MODE

Figure 1:
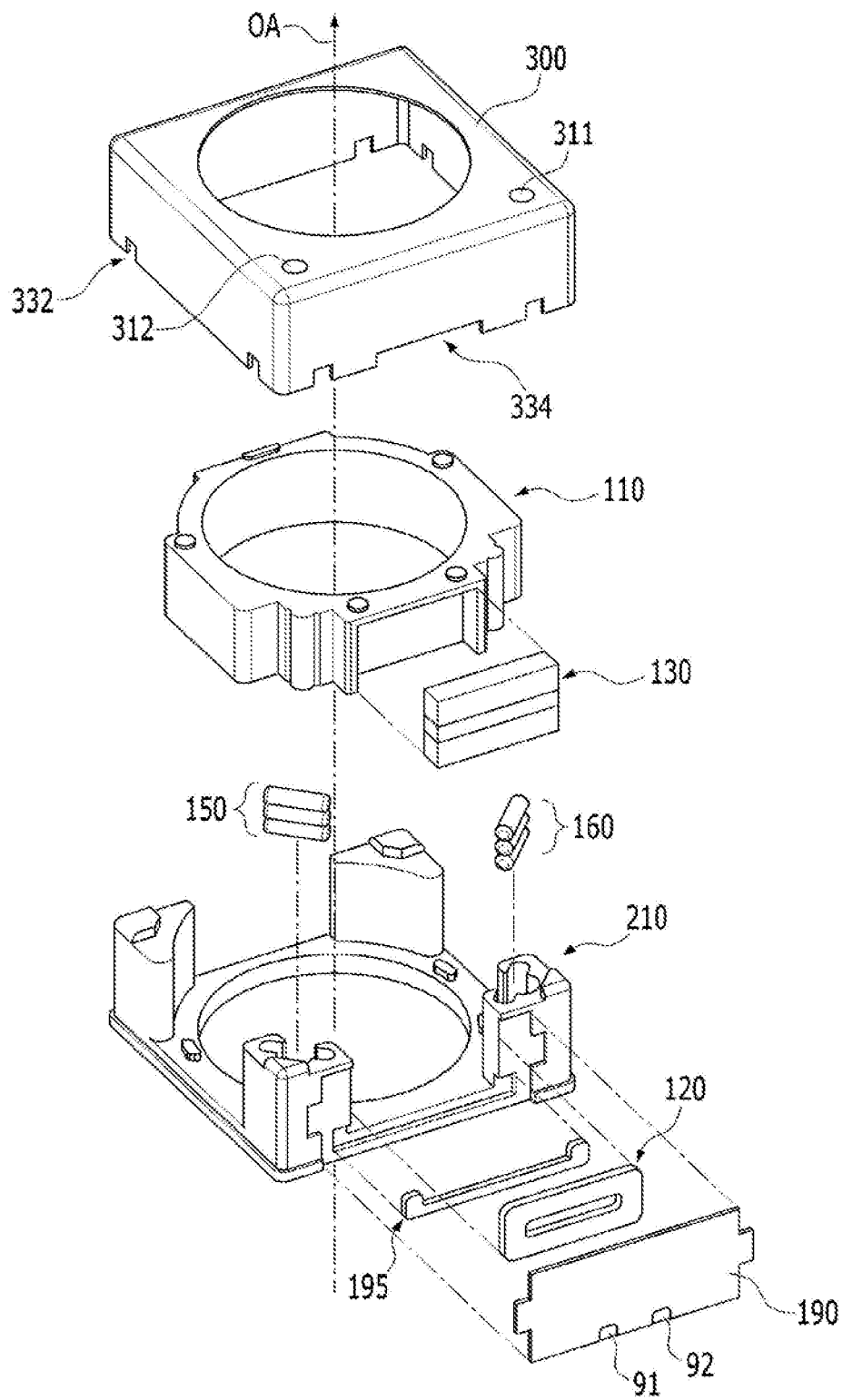
FIG. 1 is an exploded perspective view of a lens moving apparatus according to an embodiment.

Hereinafter, embodiments of the present invention capable of concretely achieving the above objects will be described with reference to the accompanying drawings.

In the following description of the embodiments, it will be understood that, when an element is referred to as being formed "on" or "under" another element, it can be directly "on" or "under" the other element, or can be indirectly disposed, with one or more intervening elements therebetween. In addition, it will also be understood that "on" or "under" the element may mean an upward direction or a downward direction based on the element.

In addition, relative terms such as, for example, "first", "second", "on/upper/above" and "beneath/lower/under", used in the following description may be used to distinguish any one substance or element from another substance or element without requiring or implying any physical or logical relationship or sequence between these substances or elements. The same reference numeral designates the same element throughout all of the drawings.

Unless otherwise defined, the terms "comprise," "include" or "have" used in the above description are used to designate the presence of features, steps or combinations thereof described in the specification, and should be understood so as not to exclude the presence or probability of additional inclusion of one or more different features, steps or combinations thereof.

Hereinafter, lens moving apparatuses according to embodiments of the present disclosure will be described with reference to the accompanying drawings. For the convenience of description, although the lens moving apparatus is described using a rectangular coordinate system (x, y, z), the lens moving apparatus may be described using some other coordinate systems, and the embodiments are not limited with regard thereto. In the respective drawings, the X-axis and the Y-axis mean directions perpendicular to an optical axis, i.e. the Z-axis, and the optical-axis OA direction or a direction parallel to the optical axis OA may be referred to as a "first direction", the X-axis direction may be referred to as a "second direction", and the Y-axis direction may be referred to as a "third direction".

The term "optical-axis direction" may be defined as the optical-axis direction of a lens module, which is in the state in which it is coupled to the lens moving apparatus. Here, the term "optical-axis direction" may also be used to indicate the up-and-down direction or the vertical direction.

An "auto-focusing device", which is applied to a subminiature camera module of a mobile device such as, for example, a smart phone or a tablet PC, is a device that automatically focuses an image of a subject on an image sensor surface. The auto-focusing device may be configured in various ways, and the lens moving apparatus according to an embodiment may move an optical module, which is constituted of at least one lens, in the first direction, so as to perform auto-focusing.

FIG. 1 is an exploded perspective view of a lens moving apparatus 100 according to an embodiment.

Referring to FIG. 1, the lens moving apparatus 100 may include a cover member 300, a bobbin 110, a coil 120, magnet 130, a first roller unit 150, a second roller unit 160, a circuit board 190, a magnetic body 195 and a base 210.

The cover member 300 will first be described.

The cover member 300 accommodates the components 110, 120, 130, 150, 160, 190 and 195, in the space defined between the cover member 300 and the base 210.

The cover member 300 may take the form of a box that has an open bottom and includes a top plate and side plates. The lower ends of the side plates of the cover member 300 may be coupled to the base 210. The top plate of the cover member 300 may have a polygonal shape, for example, a square or octagonal shape.

The cover member 300 may be provided in the upper plate thereof with an opening, through which the lens unit 400 coupled to the bobbin 110 is exposed to external light.

For example, the cover member 300 may be made of a non-magnetic metal or plastic material, such as SUS, aluminum (Al), copper (Cu), tin (Sn), or platinum. Because a cover member 300 made of the non-magnetic material is used, the embodiment is capable of preventing a phenomenon in which the magnet 130 and/or the magnetic body 195 attract the cover member 330.

Adhesive injection recesses 332 may be provided in the lower end of at least one of the side plates of the cover member 300.

The lower end of one of the side plates of the cover member 300 may have formed therein a groove 1334, through which terminals 1091 and 1092 of the circuit board 1190 are exposed.

Next, the bobbin 110 will be described.

Figure 2:
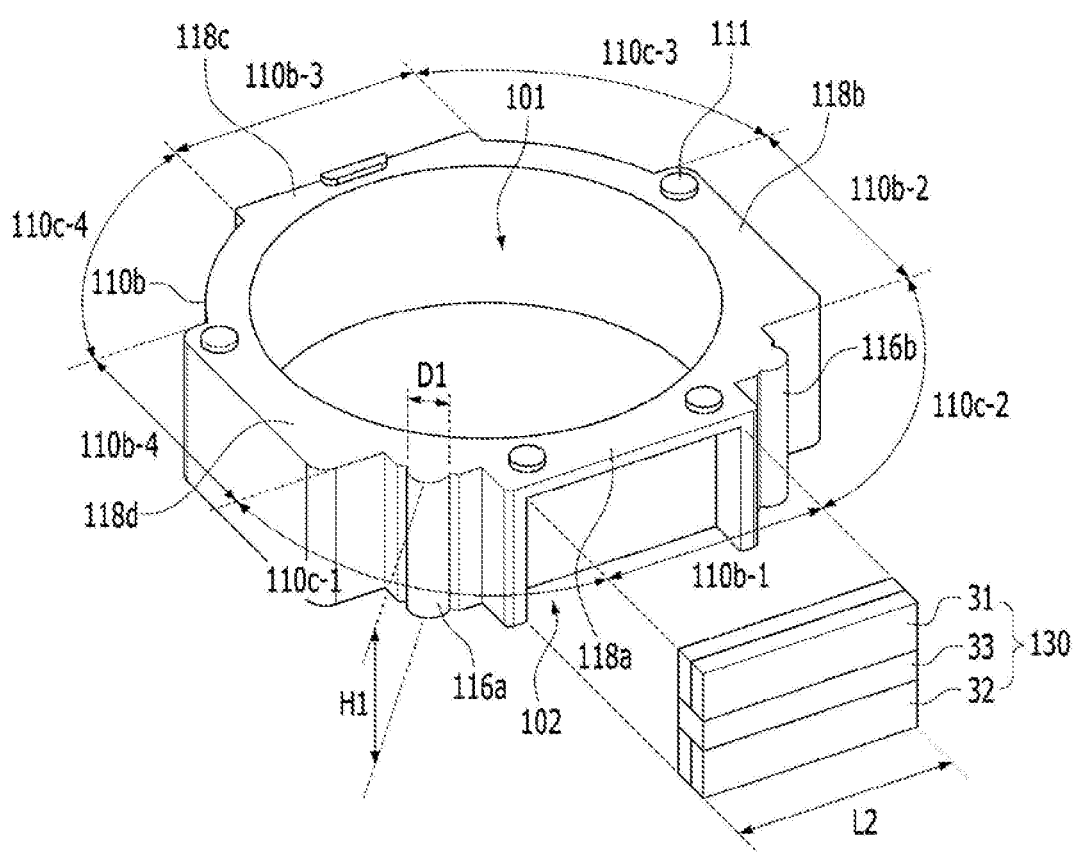
FIG. 2 is a perspective view of a bobbin and a magnet shown in FIG. 1.

FIG. 2 is a perspective view of the bobbin 110 and the magnet 130 shown in FIG. 1.

Referring to FIG. 2, the bobbin 110 may be positioned inside posts 216a to 216d of the base 210, and may be moved in the first direction (for example, in the Z-axis direction) by the electromagnetic interaction between the coil 120 and the magnet 130. For example, the bobbin 110 may be moved in one direction, for example, in an upward direction from the initial position of the bobbin 110.

The bobbin 110 may have an opening 101 in which the lens or the lens barrel is mounted.

The shape of the opening 101 in the bobbin 110 may correspond to the shape of the lens and the lens barrel mounted in the bobbin. For example, the shape of the opening may be circular, oval, or polygonal. However, the disclosure is not limited thereto.

The bobbin 110 may include at least one stopper 111 disposed on the upper surface thereof.

The stopper 111 of the bobbin 110 may be a structure that projects in the first direction or in an upward direction from the upper surface of the bobbin 110, and may prevent the upper surface of the bobbin 110 from directly colliding with the inner surface of the top plate of the cover member 300.

The bobbin 110 may include a mounting recess 102 formed in the outer surface thereof, in which the magnets 130 are mounted. For example, the mounting recess 102 may be a structure that is depressed from the outer surface of the bobbin 110 and is open at the lower portion thereof.

The bobbin 110 may include side surfaces 110c-1 to 110c-4, a side surface between the side surface 110c-1 and the side surface 110c-2, a side surface 110b-2 between the side surface 110c-2 and the side surface 110c-3, a side surface 110b-3 between the side surface 110c-3 and the side surface 110c-4, and a side surface 110b-4 between the side surface 110c-4 and the side surface 110c-1.

The side surfaces 110c-1 to 110c-4 of the bobbin 110 may correspond to the posts 216a to 216d of the base 210, and the side surfaces 110b-1 to 110b-4 of the bobbin 110 may respectively correspond to the spaces between the posts 216a to 216d of the base 210.

The bobbin 110 may include projections 118a to 118d projecting from the outer surface thereof. For example, the outer surfaces of the projections 118a to 119d may be the side surfaces 110b-1 to 110b-4 of the bobbin 110.

The mounting recess 102 may be formed in the side surface of the first projection 118a, and may have a shape identical to or coinciding with that of the magnet 130.

The bobbin 110 may include a first support provided at the side surface 110c-1 and a second support 116b provided at the side surface 110c-2.

For example, the first support 116a may be disposed between the first projection 118a and the fourth projection 118d, and the second support 116b may be disposed between the first projection 118a and the second projection 110b.

The first support 116a may project from the outer surface of the bobbin 110, and the second support 116b may project from the outer surface of the bobbin 110.

For example, the first support 116a may have a column shape projecting from the side surface 110c-1 of the bobbin 110, for example, a semicircular column. However, the disclosure is not limited thereto, and the first support may have various column shapes.

For example, the second support 116b may have a column shape projecting from the side surface 110c-2 of the bobbin 110, for example, a semicircular column. However, the disclosure is not limited thereto, and the second support may have various column shapes.

For example, the first support 116a and the second support 116b may be bilaterally symmetrical with respect to the first projection 118a; however, the disclosure is not limited thereto.

For example, the fourth projection 118d may project further than the first support 116a in a direction toward the side surface 110b-4 from the side surface 110b-2 of the bobbin 110, and the first projection 118a may project further than the first support 116a in a direction toward the side surface 110b-1 from the side surface 110b-3 of the bobbin 110.

For example, the second projection 118b may project further than the second support 116b in a direction toward the side surface 110b-2 from the side surface 110b-4 of the bobbin 110, and the first projection 118a may project further than the first support 116a in a direction toward the side surface 110b-1 from the side surface 110b-3 of the bobbin 110. The reason for this is to increase freedom in design of disposition of the posts 216a and 216b of the first and second roller units 150 and 160.

Next, the magnet 130 will be described.

The magnet 130 may be disposed or mounted to the bobbin 110. For example, the magnet 130 may be disposed in the mounting recess 102 formed in the side surface 110b-1 of the bobbin 110, for example, the outer surface of the first projection 118a.

Although the magnet 130 may have a shape corresponding to the side surface 110b-1 of the bobbin 110, for example, a rectangular parallelepiped shape, the disclosure is not limited thereto.

Although the magnet 130 may be a bipolar magnetized magnet in order to increase drive force resulting from the electromagnetic interaction with the coil, the disclosure is not limited thereto.

For example, the magnet 130 may be a bipolar magnetized magnet, which is divided into two poles in a direction perpendicular to the optical axis. Here, the magnet 130 may be embodied by a ferrite magnet, an alnico magnet, a rare-earth magnet or the like.

For example, the magnet 130 may include a first magnet portion 31 including an N pole and an S pole, a second magnet portion 32 including an S pole and an N pole, and a non-magnetic partition wall 33.

The first magnet portion 31 and the second magnet portion 32 may be spaced apart from each other, and the non-magnetic partition wall 33 may be positioned between the first magnet portion 31 and the second magnet portion 32.

The non-magnetic partition wall is a portion that is almost completely non-magnetic and which may include a zone having almost no polarity. The non-magnetic partition wall may be filled with air or a non-magnetic material, and may be referred to as a "neutral zone".

In another embodiment, the magnet 130 may be a monopolar magnetized magnet including an S pole and an N pole.

Next, the base 210 will be described.

Figure 3A:
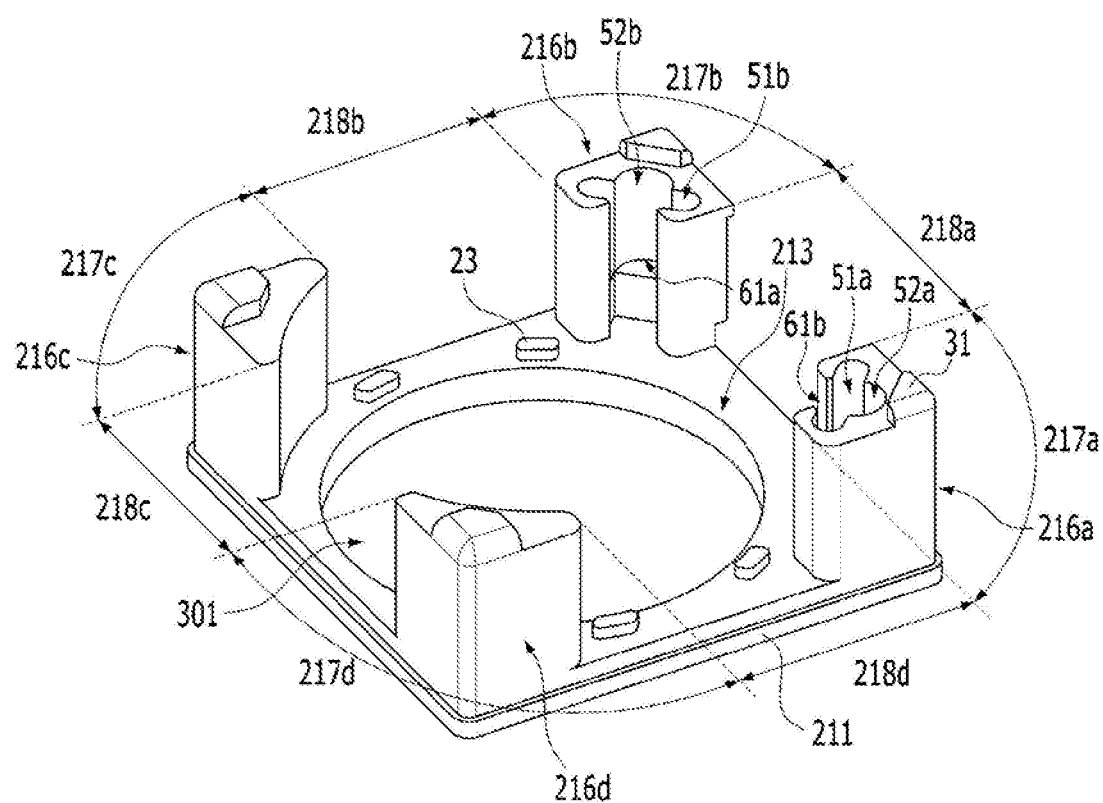
FIG. 3A is a first perspective view of a base shown in FIG. 1.
Figure 3B:
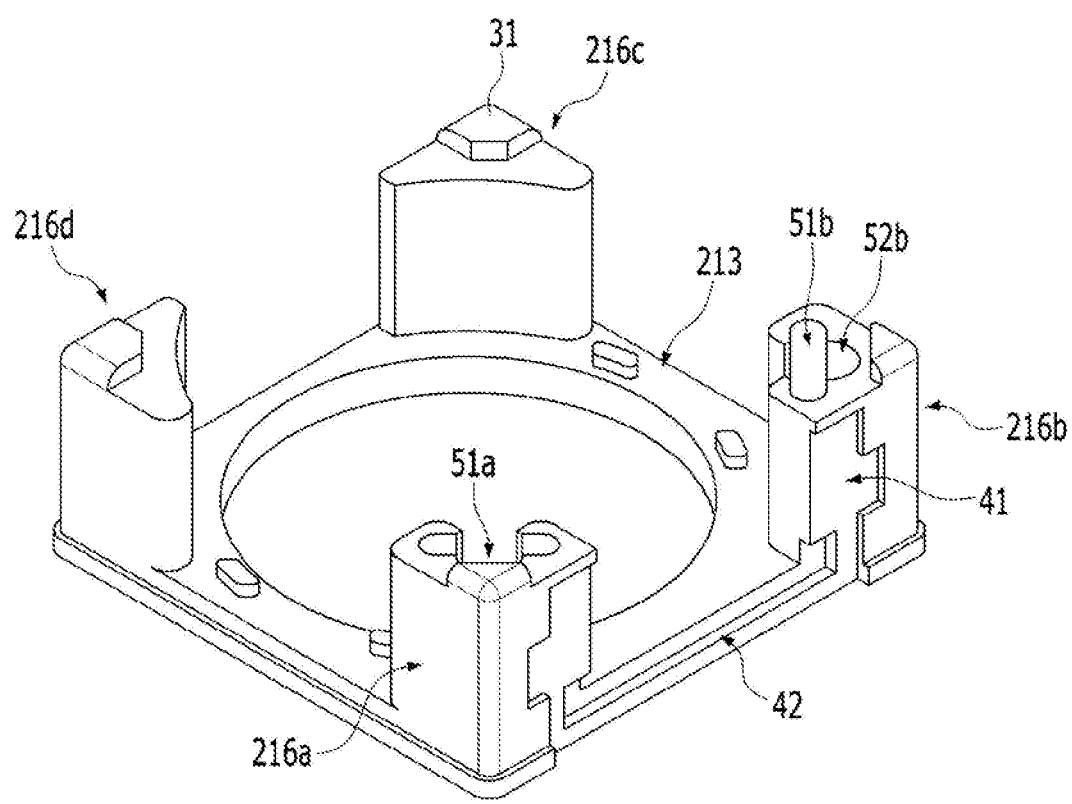
FIG. 3B is a second perspective view of the base shown in FIG. 1.
Figure 4:
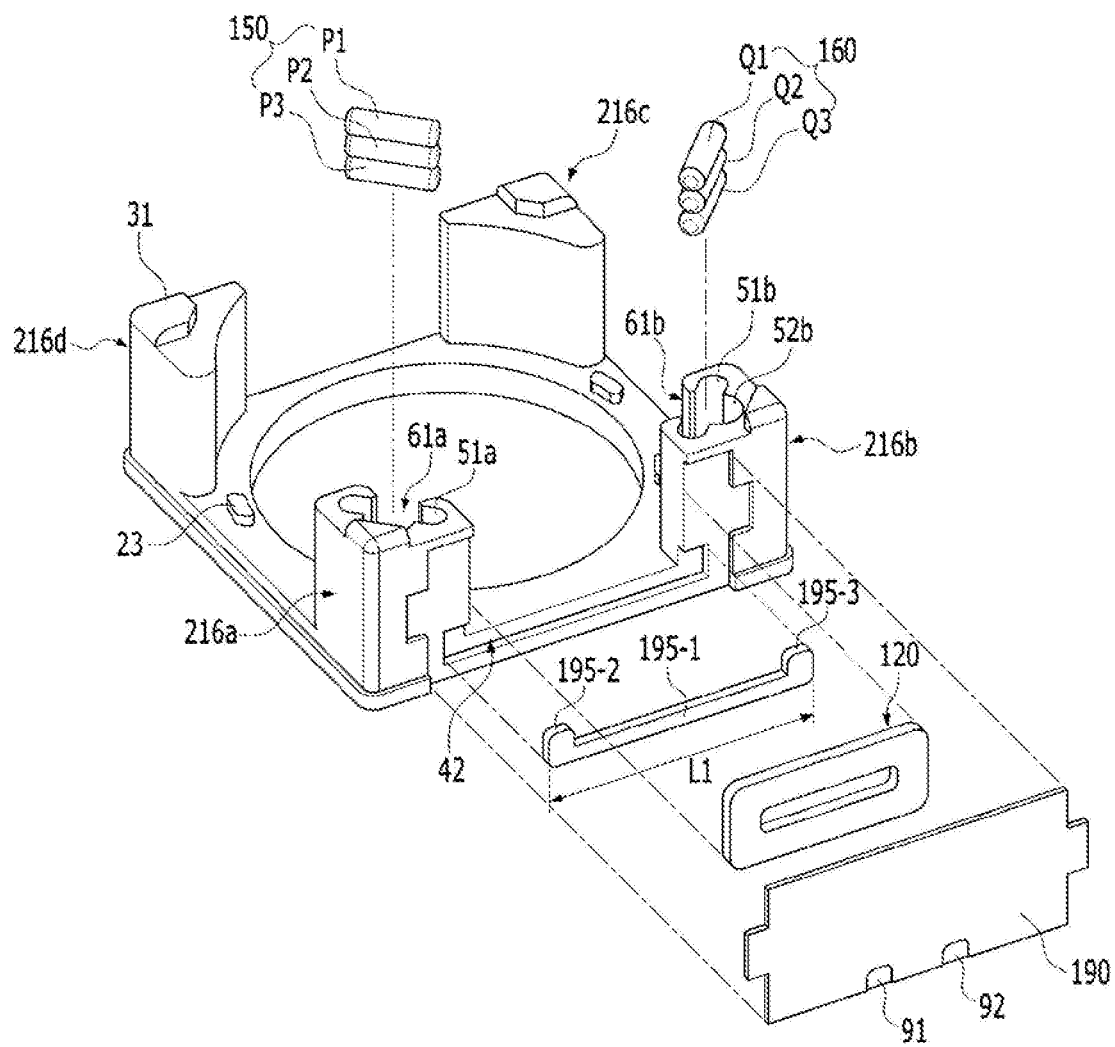
FIG. 4 is an exploded perspective view of the base, first and second roller units, a magnetic body, a coil and a circuit board, which are shown in FIG. 1.

FIG. 3A is a first perspective view of the base 210 shown in FIG. 1. FIG. 3B is a second perspective view of the base 210 shown in FIG. 1. FIG. 4 is an exploded perspective view of the base 210, the first and second roller units 150 and 160, the magnetic body 195, the coil 120 and the circuit board 190, which are shown in FIG. 1.

Referring to FIGS. 3A, 3B and 4, the base 210 may be coupled to the cover member 300, and may define a space for accommodating the bobbin 110, in cooperation with the cover member 300.

The base 210 may have an opening 301 that corresponds to the opening in the cover member 300 and/or the opening in the bobbin 110. The base 210 may have a shape, for example, a square shape, that coincides with or corresponds to the cover member 300.

The base 210 may include a body 213 having the opening 301 and the posts 216a to 216d projecting from the body 213.

The body 213 of the base 210 may include corner portions 217a to 217d and side portions 218a to 218d positioned between the corner portions 217a to 217d.

Each of the posts 216a to 216d may be disposed at a corresponding one of the corner portions 217a to 217d of the body 213.

For example, the base 210 may include a first post 216a, which projects upwards a predetermined height from the first corner portion 217a, a second post 216b, which project upwards a predetermined height from the second corner portion 217b, a third post 216c, which project upwards a predetermined height from the third corner portion 217c, and a fourth post 216d, which projects upwards a predetermined height from the fourth corner portion 217d.

The term "posts" of the base 210 may be used interchangeably with the term "projections".

Although each of the posts 216a to 216d may have, for example, a polygonal shape, a circular shape or an elliptical shape, which project vertically from the upper surface of the body 213 of the base 210, the disclosure is not limited thereto. Although the posts 216a to 216d may have, for example, a cross section of an "L" shape or a polygonal shape such as a triangular shape, the disclosure is not limited thereto.

Although the length of each of the side portions 218a to 218d of the body 213 of the base 210 in a transverse direction may be larger than the length of each of the corner portions 217a to 217d of the body 213 of the base 210, the disclosure is not limited thereto.

Openings may be defined between two adjacent posts 216a and 216b, 216b and 216c, 216c and 216d, and 216d and 216a.

Although the heights of the posts 216a to 216d may be the same with respect to the upper surface of the body 213 of the base 210, the disclosure is not limited thereto.

The base 210 may include stoppers 23 projecting from the upper surface of the body 2130. Although at least one, for example, two stoppers 23 may be disposed at the upper surface of each of the second side portion 218b and the fourth side portion 218d, the position and the number thereof are not limited thereto. The stopper 23 of the base 210 may also be referred to as a "lower stopper".

The stopper 23 may prevent the lower surface or the lower end of the bobbin 110 from directly colliding with the body 213 of the base 210.

The base 210 may include stoppers 31, which are disposed on the upper surfaces or the upper ends of the posts 216a to 216d. The stoppers 31 of the base 210 may be referred to as "upper stoppers".

For example, the stoppers 31 of the base 210 may form a structure projecting from the upper surfaces of the posts 216a to 216d in the optical-axis direction.

The stoppers 31 of the base 210 may serve to ensure a space or a gap in which the bobbin 110 is movable during AF operation.

The lower end of the outer surface of the body 213 of the base 210 may be provided with a step 211. The step 211 may be in contact with the lower ends of the side plates of the cover member 300, and may guide the cover member 300. The step 211 of the base 210 and the lower ends of the side plates of the cover member 300 may be adhesively and sealably secured to each other, and may be sealed using an adhesive or the like.

The base 210 may include a first groove 51a, formed in the first post 216a, in which the first roller unit 150 is disposed, and a second groove 51b, formed in the second post 216b adjacent to the first post 216a, in which the second roller unit 160 is disposed.

For example, the first groove 51a may have a shape that corresponds to or coincides with at least one of the rollers included in the first roller unit 150, and the second groove 51b may have a shape that corresponds to or coincides with at least one of the rollers included in the second roller unit 160.

Each of the first groove 51a and the second groove 51b may have a structure depressed from the upper surface of the base 210.

The first groove 51a may include a first opening, which is open at the inner surface of the first post 216a, and the second groove 51b may include a second opening, which is open at the inner surface of the second post 216b.

The first support 116a of the bobbin 110 may be disposed in the first opening 61a, and may be in contact with a portion of the first roller unit 150. Furthermore, the second support 116b of the bobbin 110 may be disposed in the second opening 61b, and may be in contact with a portion of the second roller unit 160.

By virtue of the first opening 61a and the second opening 61b, it is possible to reduce the frictional force between the first and second roller units 150 and 160 and the first and second grooves 51a and 51b in the base 210. By controlling the sizes of the first and second openings 61a and 61b, it is possible to obtain desired frictional force between the first and second roller units 150 and 160 and the base 210.

The base 210 may further include a first guide groove 52a formed in the inner surface of the first groove 51a in the first post 216a, and a second guide groove 52b formed in the inner surface of the second groove 51b in the second post 216b.

A first protrusion 311 of the cover member 300 (which will be described later) may be inserted or disposed in the first guide groove 52a, and a second protrusion 312 of the cover member 300 may be inserted or disposed in the second guide groove 52b.

Lubricant may be injected into the first groove 51a through the first guide groove 52a, and may be injected into the second groove 51b through the second guide groove 52b.

The lubricant may be disposed in the first groove 51a and the second groove 51b, may be in contact with the first groove 51a and the first roller unit 150, and may be in contact with the second groove 51b and the second roller unit 160.

Although the lubricant may be grease-type lubricant, for example, SDM (steel dust meter)-378, the disclosure is not limited thereto.

The lubricant may reduce the frictional force between the first and second roller units 1150 and 1160 and the first and second grooves 51a and 51b, and may make the rotation of the first and second roller units 150 and 160 smooth.

The base 210 may include a first mounting recess 41 and a second mounting recess 42, which are formed in the first and second posts 216a and 216b and the body 213.

Each of the first mounting recess 41 and the second mounting recess 42 may have a stepped structure or a 2-level structure based on the outer surface of the first and second posts 216a and 216b of the base 210.

The first mounting recess 41 may be formed in the outer surfaces of the first and second posts 216a and 216b and the outer surface of the first side portion 218a, and may have a shape that is the same as or coincides with that of the circuit board 190.

The second mounting recess 42 may be positioned in the first mounting recess 41, may be formed in the outer surfaces of the first and second posts 216a and 216b and in the outer surface of the first side portion 218a of the body 213, and may be the same as or coincide with the magnetic body 195.

Next, the circuit board 190 will be described.

The circuit board 190 may be disposed or secured to the base 210.

The circuit board 190 may be secured to the first and second posts 216a and 216b of the base 210. For example, the circuit board 190 may be disposed at the first and second posts 216a and 216b of the base 210 and at the first side portion 218a of the body 2130.

For example, the circuit board 190 may be disposed in the first mounting recess 41.

The circuit board 190 may include terminals conductively connected to the coil, for example, a first terminal 91 and a second terminal 92, and the terminals of the circuit board 190 may be disposed or positioned at the body 213 of the base 210.

For example, the circuit board 190 may be a printed circuit board or a flexible printed circuit board (FPCB).

Next, the coil 120 will be described.

The coil 120 may be disposed, mounted or secured to the circuit board 190 so as to correspond to or face the magnet 130. For example, the coil 120 may be disposed on a first surface of the circuit board 190, and the terminals 91 and 92 may be disposed on a second surface of the circuit board 190.

Although the coil 120 may be secured or attached to the circuit board 190 using, for example, an adhesive member, the disclosure is not limited thereto.

The coil 120 may be positioned between the first post 216a and the second post 216b of the base 210.

The coil 120 may be, for example, a coil ring having a ring shape. For example, the coil 120 may have an elongated ring shape in which the horizontal length thereof is greater than the vertical length thereof.

In order to generate electromagnetic force resulting from the electromagnetic interaction with the magnet 130, a drive signal may be applied to the coil 120. Here, the drive signal applied to the coil 120 may be a DC signal, and may be a voltage type or a current type. For example, the drive signal applied to the coil 120 may include at least one of a DC signal and an AC signal.

The coil 120, to which the drive signal is applied, may electromagnetically interact with the magnet 130 disposed at the bobbin 110, and an AF operation unit may be moved in the first direction by means of the electromagnetic force resulting from the electromagnetic interaction between the coil 120 and the magnet 130. By controlling the intensity of the drive signal, it is possible to control the movement of the AF operation unit in the first direction, and it is thus to possible to perform an autofocusing function.

The AF operation unit may include the bobbin 110 and components that are mounted on the bobbin 110 and moved therewith. For example, the AF operation unit may include the bobbin 110 and the magnet 130.

The coil 120 may be conductively connected to the first terminal 91 and the second terminal 92 of the circuit board 190. For example, the two ends of the coil 120 may be conductively connected to pads (not shown) provided on the first surface of the circuit board 190, and the pads (not shown) may be conductively connected to corresponding ones of the first and second terminals 91 and 92 of the circuit board 190.

A drive signal may be applied to the coil 120 via the first and second terminals 91 and 92 of the circuit board 190.

Next, the first roller unit 150 and the second roller unit 160 will be described.

The first roller unit 150 may be disposed in the first groove 51a so as to be in contact with at least two regions of the first groove 51a. For example, the first roller unit 150 (for example, rollers P1 to P3) may be in contact with four regions of the first groove 51a.

The second roller unit 160 may be disposed in the second groove 51b so as to be contact with at least two regions of the second groove 51b. For example, the second roller unit 160 (for example, rollers Q1 to Q3) may be in contact with four regions of the second groove 51b.

The first roller unit 150 may include at least one roller (for example, P1 to P3), and may be disposed in the first groove 51a in the first post 216a of the base 210.

The roller unit 160 may include at least one roller (for example, Q1 to Q3), and may be disposed in the second groove 51b in the second post 216b of the base 210.

The first roller unit 150 may be in contact with the first support 116a of the bobbin 110, and the second roller unit 150 may be in contact with the second support 116b of the bobbin 110.

When the bobbin 110 is moved in the optical-axis direction, the first roller unit 150 and the second roller unit 160, which are respectively in contact with the first and second supports 116a and 116b, may roll or rotate, thereby supporting the movement of the bobbin 110 in the optical-axis direction and guiding the movement of the bobbin 110 in the optical-axis direction.

Frictional force may be generated between the first and second roller units 150 and 160 and the first and second supports 116a and 116b of the bobbin 110. The frictional force may be affected by the contact areas between the first and second rollers and the first and second supports. In other words, the frictional force may increase as the contact area between the rollers and the supports increases.

Each of the first and second roller units 150 and 160 may include a plurality of rollers. For example, the number of rollers included in each of the first and second roller units 150 and 160 may be two, three, four or more.

Although the first roller unit 150 may include three rollers (P1 to P3), the disclosure is not limited thereto. The number of rollers may be one or more.

Although the second roller unit 160 may include three rollers (Q1 to Q3), the disclosure is not limited thereto. The number of rollers may be one or more.

Figure 5:
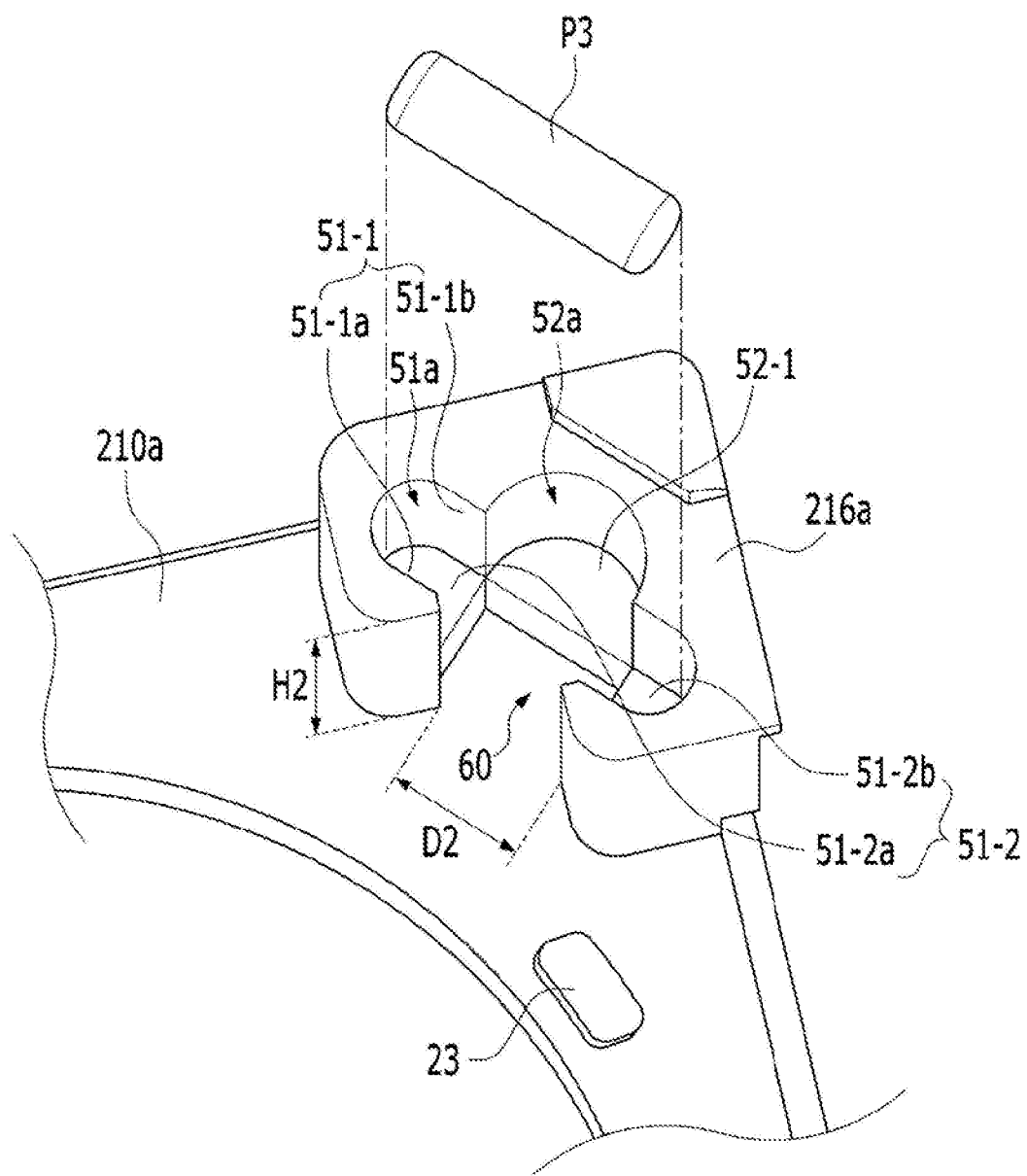
FIG. 5 is an enlarged view formed in a first post.
Figure 6:
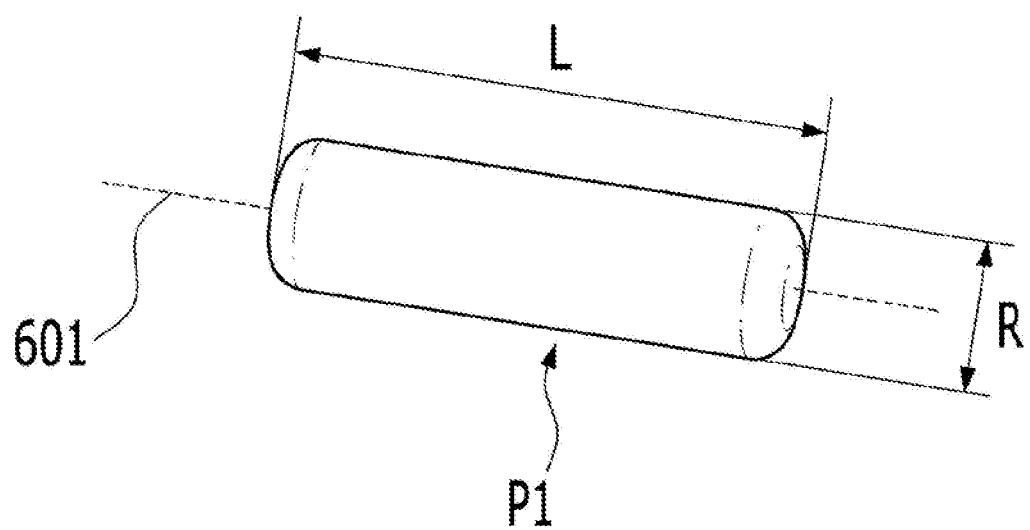
FIG. 6 is an enlarged view of the roller shown in FIG. 4.
Figure 7:
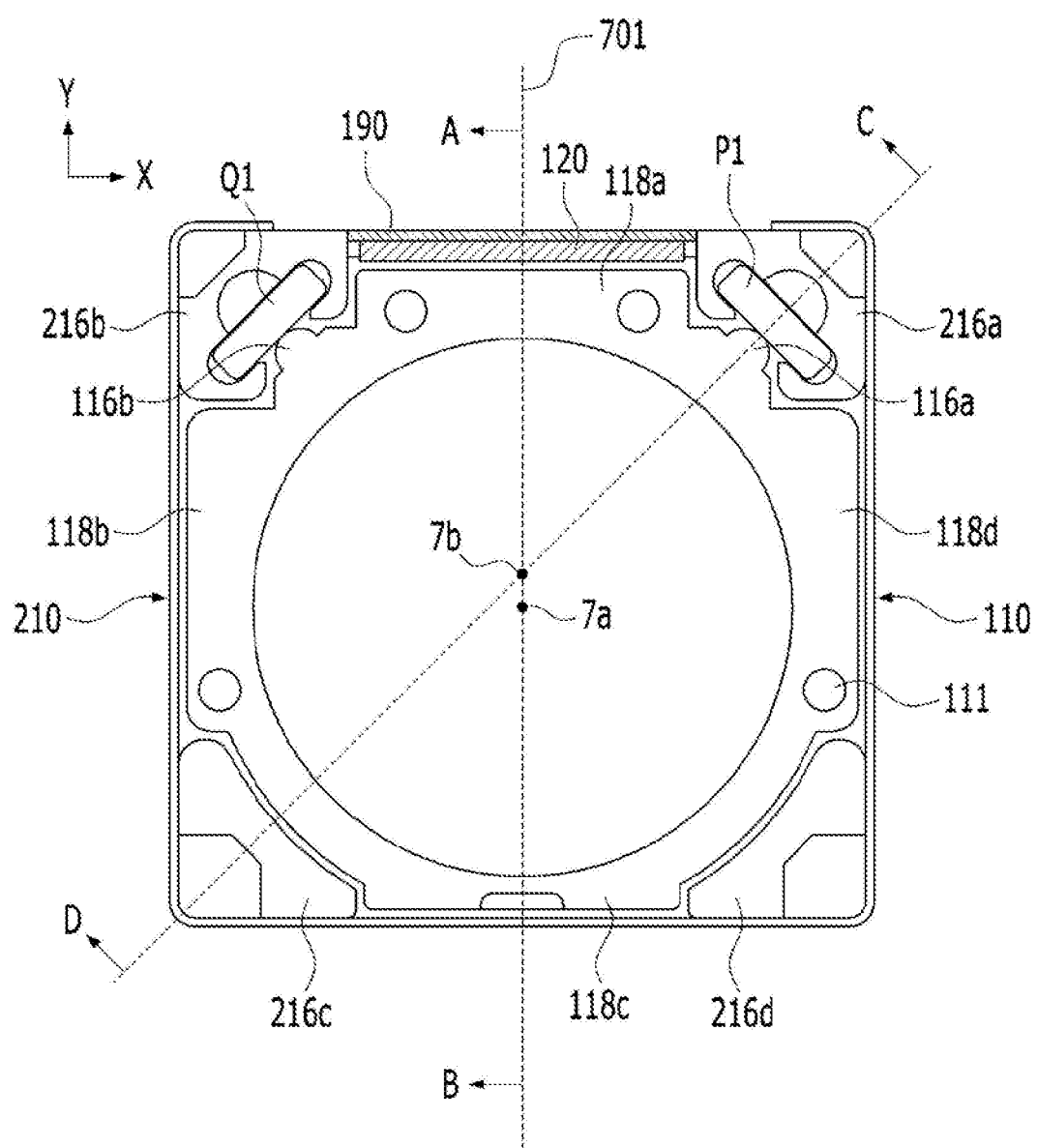
FIG. 7 is a plan view of the lens moving apparatus, from which a cover member is removed.
Figure 8:
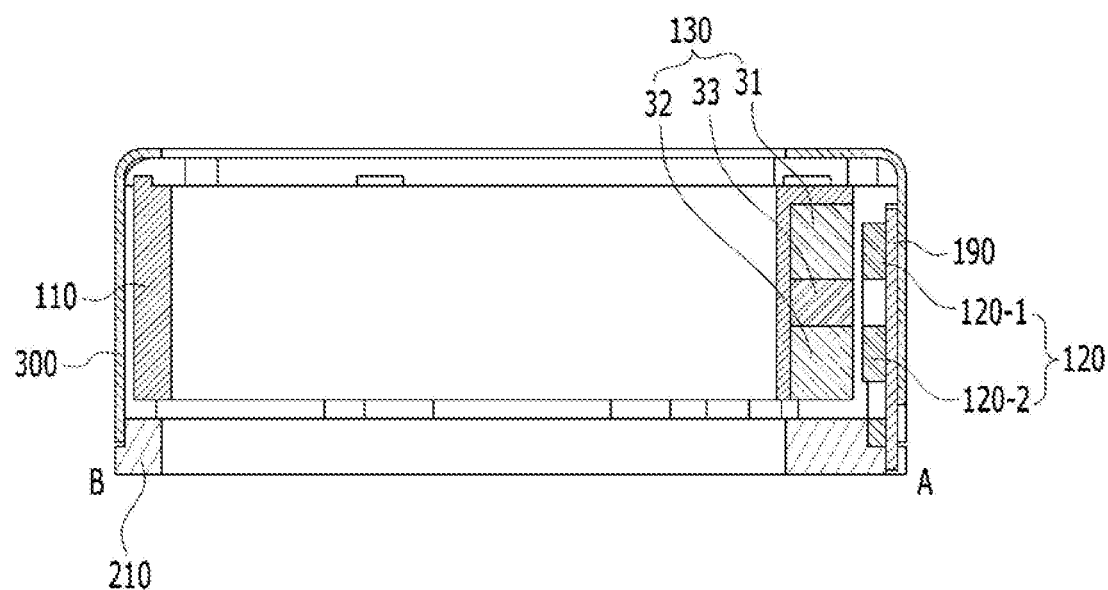
FIG. 8 is a cross-sectional view of the lens moving apparatus shown in FIG. 7, taken along line A-B.
Figure 9:
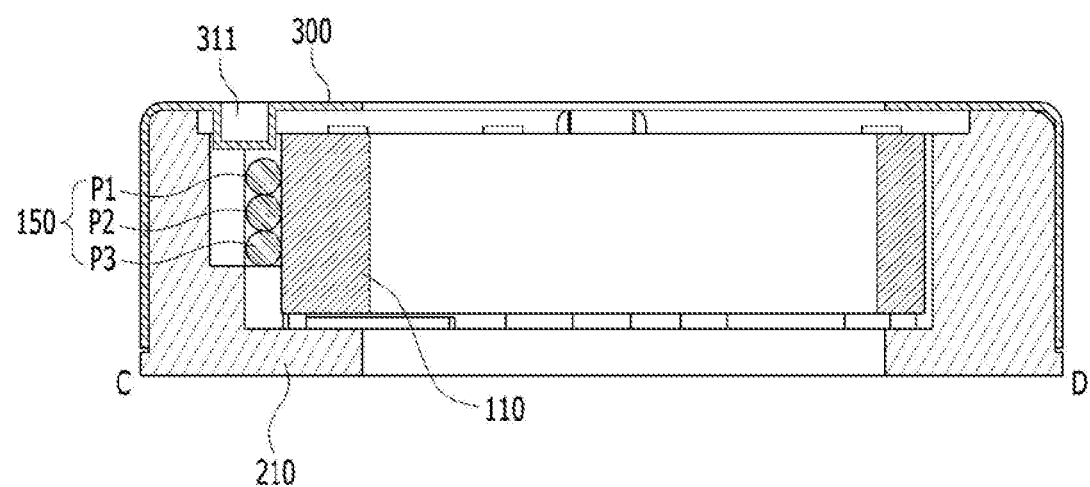
FIG. 9 is a cross-sectional view of the lens moving apparatus shown in FIG. 7, taken along line C-D.

FIG. 5 is an enlarged view of the first groove 51a formed in the first post 216a. FIG. 6 is an enlarged view of the roller P1 shown in FIG. 4. FIG. 7 is a plan view of the lens moving apparatus 100, from which the cover member 300 is removed. FIG. 8 is a cross-sectional view of the lens moving apparatus 100 shown in FIG. 7, taken along line A-B. FIG. 9 is a cross-sectional view of the lens moving apparatus 100 shown in FIG. 7, taken along line C-D.

Referring to FIGS. 5 to 9, the first groove 51a may include a side surface 51-1 and a bottom 51-2.

The bottom 51-2 of the first groove 51a may have a predetermined depth from the upper surface 210a of the base 210 in the optical-axis direction. For example, the bottom 51-2 of the first groove 51a may be positioned higher than the upper surface 210a of the base 210 based on the lower surface of the base 210.

The bottom 51-2 of the first groove 51a may have formed therein a groove or a hole 60. Although the groove 50 may expose the upper surface of the base therethrough, the disclosure is not limited thereto.

The bottom 51-2 of the first groove 51a may include a first bottom 51-2a and a second bottom 51-2b, which are spaced apart from each other, and the groove 60 may be disposed between the first bottom 51-2a and the second bottom 51-2b.

By virtue of the groove 60, the size of the surface area of the roller P3 that comes into contact with the bottom 51-2 of the first groove 51a may decrease, with the result that the frictional force between the roller P3 and the first post 216a may decrease and the frictional force between the roller P3 and the first support 116a may also decrease.

The first side surface 51-1a of the first groove 51a may have formed therein a first opening 61a, which is open at the inner surface of the first post 216a, and the second side surface 51-1b of the first groove 51a may have formed therein the first guide groove 52a.

The first opening 61a in the first post 216a may expose a portion or one surface of the rollers P1 to P3 inserted or disposed in the first groove 51a therethrough.

The first opening 61a may have a size sufficient to allow the first support 116a to be inserted thereinto.

For example, the horizontal length D2 of the first opening 61a may be larger than the horizontal length D1 of the first support 116a (D2>D1). The vertical length H2 of the first opening 61a may be equal to or larger than the vertical length H1 of the first support 116a (H2 H1).

For example, the first support 116a may be inserted into the first opening 61a so as to come into contact with the rollers P1 to P3 disposed in the first groove 51a and to be spaced apart from the first post 216a of the base 210.

The first guide groove 52a may have a shape depressed from the second side surface 51-1b of the first groove 51a, and may have a semicircular shape or a semicircular column shape; however, the shape is not limited thereto.

For example, the height of the bottom 52-1 of the first guide groove 52a may be equal to the height of the bottom 51-2 of the first groove 52a; however, the disclosure is not limited thereto.

Referring to FIG. 6, although the roller P1 may have a cylindrical shape or a circular cylinder shape, the disclosure is not limited thereto.

The length L of the roller P1 may be larger than the diameter R thereof.

The ratio of the diameter R of each of the rollers (for example, P1 to P3) and the longitudinal length L of each of the rollers (for example, P1 to P3) may be 1:1.5~1:5.

For example, the ratio of the diameter R of the roller P1 to the length L of the roller P1 may be 1:1.5~1:5.

Here, the ratio (R:L) of the diameter to the length may also be 1:2~1:3.

For example, when the ratio (L/R) of the length to the diameter of the roller P1 is smaller than 1.5, an effect of preventing movement of the bobbin 110 in the x-axis direction or in the y-axis direction may be reduced.

When the ratio (L/R) of the length to the diameter of the roller P1 is larger than 5, the size of the first post 216a for accommodating the roller may be increased, and spatial interference between the coil 120 and the circuit board 190 may occur.

The second groove 51b formed in the second post 216b may have the same shape as the first groove 51a, and the description regarding the first groove 51a shown in FIG. 5 may also be applied to the second groove 51b.

Furthermore, the description regarding the roller P1 shown in FIG. 6 may also be applied to the remaining rollers P2 and P3 of the first roller unit 150 and the rollers Q1 to Q3 of the second roller unit 160.

In order to prevent the first roller unit 150 and the second roller unit 160 from being separated from the first groove 51a and the second groove 51b, the cover member 300 may include the first protrusion 311 and the second protrusion 312.

The first protrusion 311 of the cover member 300 may be inserted or disposed in the first guide groove 52a, and the second protrusion 312 of the cover member 300 may be inserted or disposed in the second guide groove 52b.

Figure 11:
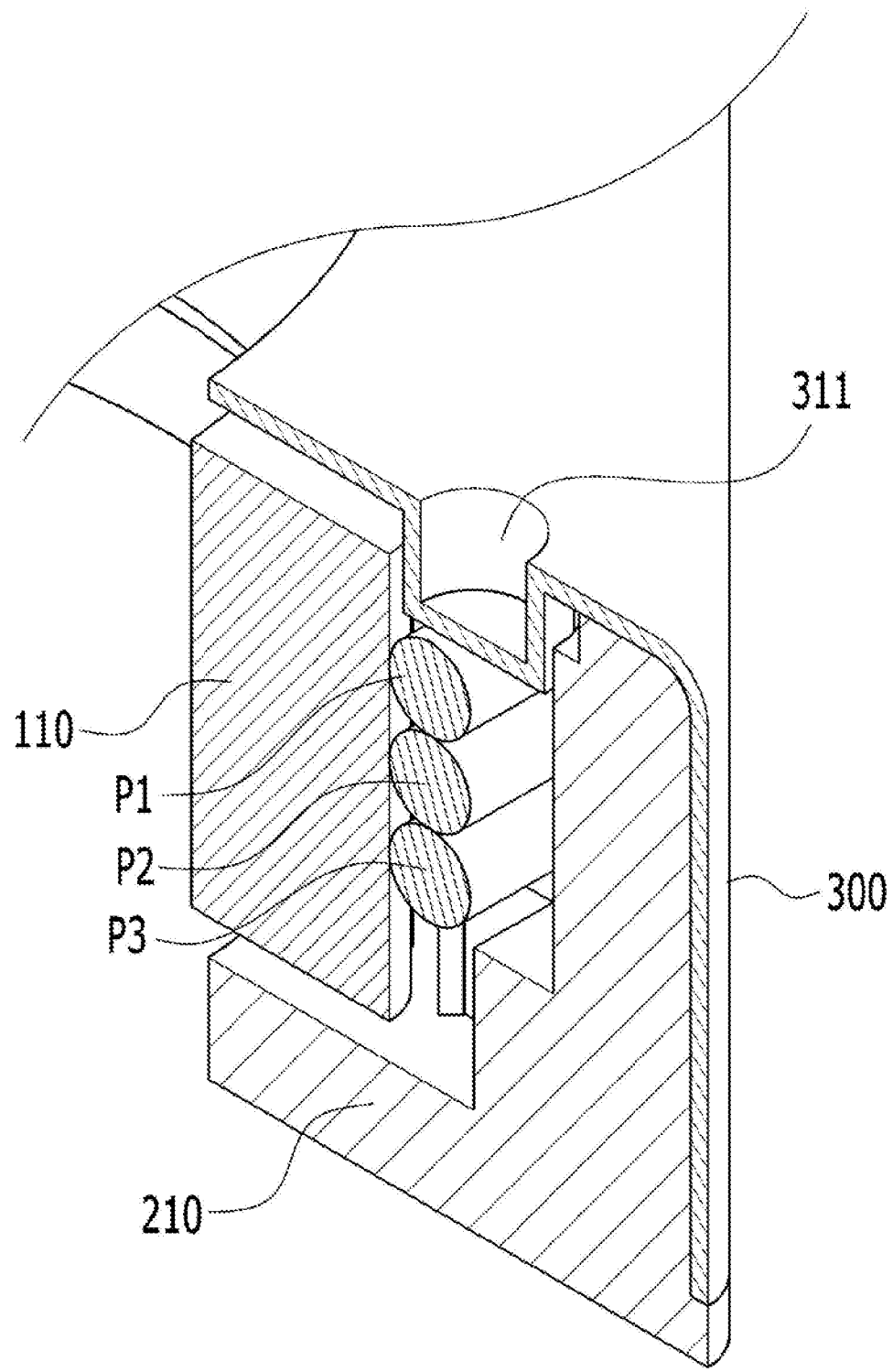
FIG. 11 illustrates a portion of the cross section of FIG. 7, taken along line C-D.

FIG. 11 illustrates a portion of a cross section of FIG. 7, taken along line C-D. The cover member 300 is illustrated in the cross-sectional view of FIG. 11.

Referring to FIGS. 1 and 11, the cover member 300 may include the first protrusion 311, which corresponds to the first roller unit 150 and projects from the inner surface of the top plate.

Furthermore, the cover member 300 may include the second protrusion 312, which corresponds to the second roller unit 160 and projects from the inner surface of the top plate.

The first protrusion 311 may project downwards from the inner surface of the top plate of the cover member 300, and may be inserted or disposed in the first groove 51a and the first guide groove 52a.

The second protrusion 312 may project downwards from the inner surface of the top plate of the cover member 300, and may be inserted or disposed in the second groove 51b and the second guide groove 52b.

Each of the first protrusion 311 and the second protrusion 312 may have a groove shape depressed from the upper surface of the top plate of the cover member 330.

Referring to FIG. 7, the center 7a of the opening 101 may not be aligned with the center 7b of the base 210, and may be positioned farther than the magnet 130 from the center 7b of the base 210. In other words, the center of the lens mounted in the bobbin 110 may be positioned farther than the center 7b of the base 210 from the magnet 130.

For example, the center 7b of the base 210 may be positioned between the center 7a of the opening 101 in the bobbin 110 and the magnet 130.

The projections 118a to 118d of the bobbin 110 may be positioned between the posts 216a to 216d of the base 210. For example, each of the projections 118a to 118d of the bobbin 110 may be positioned between two adjacent posts 216a and 216b, 216b and 216c, 216c and 216d, and 216d and 216d. Since each of the projections 118a to 118d of the bobbin 110 may be positioned between two adjacent posts 216a and 216b, 216b and 216c, 216c and 216d, and 216d and 216d, it is possible to reduce or decrease the size of the lens moving apparatus 100.

Each of the rollers P1 to P3 and Q1 to Q3 of the first and second roller units 150 and 160 may be in contact with a side surface (for example, 51-1) of the first and second grooves 51a and 51b. For example, the outer surface of each of the rollers P1 to P3 and Q1 to Q3 may be in surface contact with the side surface (for example, 51-1) of the first and second grooves 51a and 51b.

In another embodiment, the side surfaces (for example, 51-1) of the first and second grooves 51a and 51b may be provided with a plurality of protrusions. The plurality of protrusions may be in contact with the outer surfaces of the rollers P1 to P3 and Q1 to Q3.

Figure 14A:
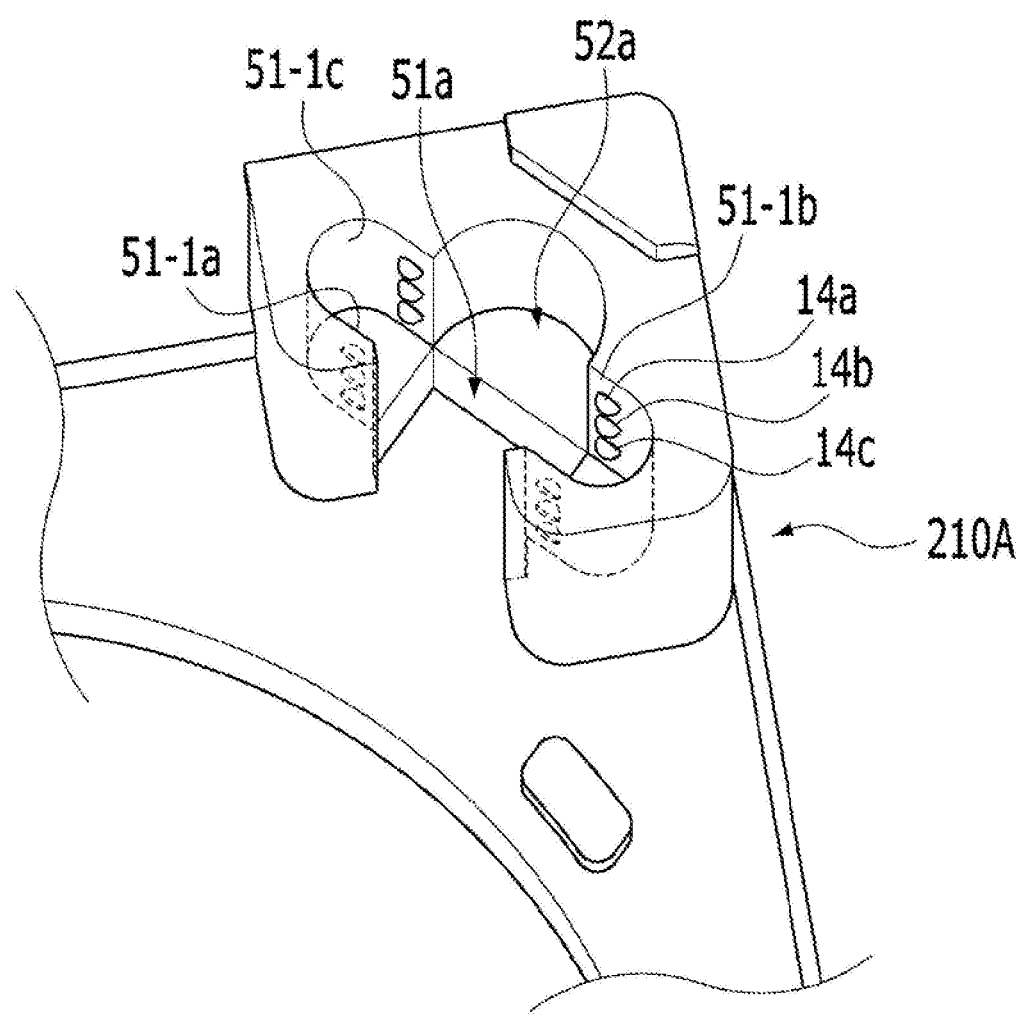
FIG. 14A is a fragmentary perspective view of a base according to another embodiment.
Figure 14B:
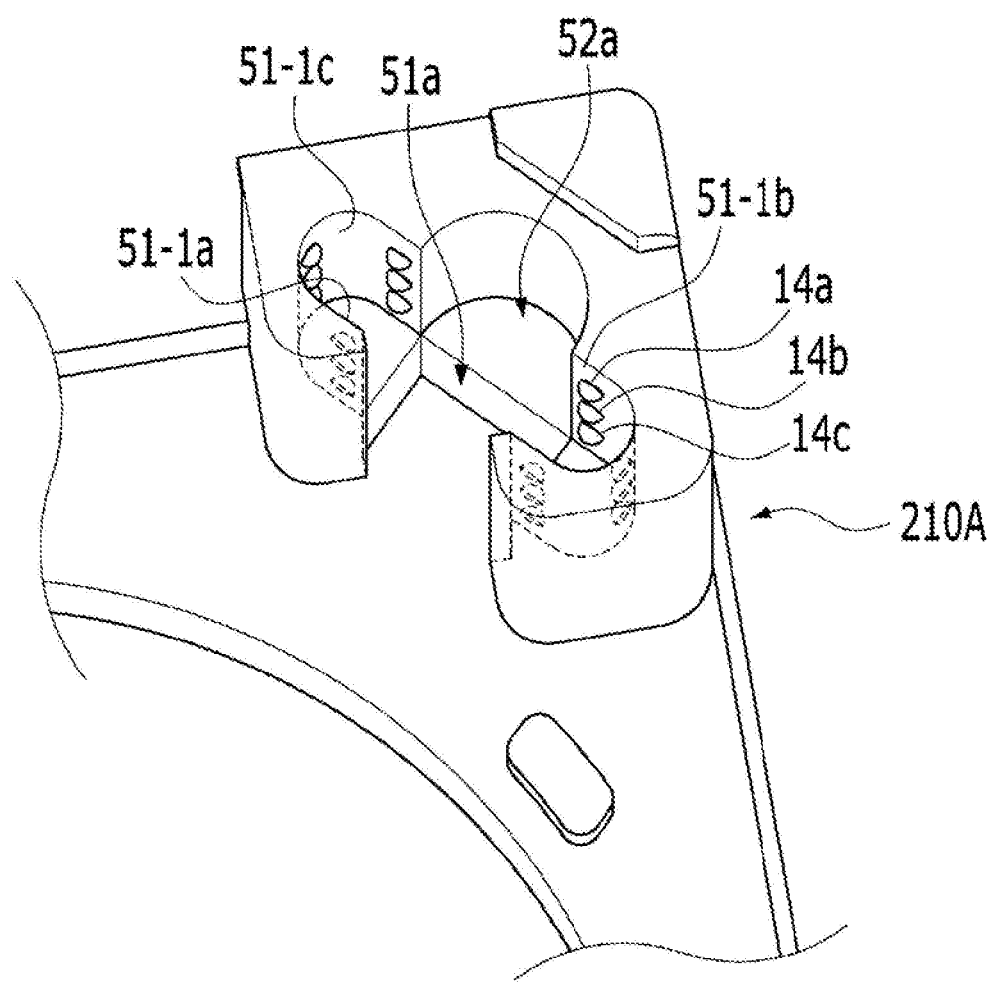
FIG. 14B is a fragmentary perspective view of a base according to a further embodiment.
Figure 14C:
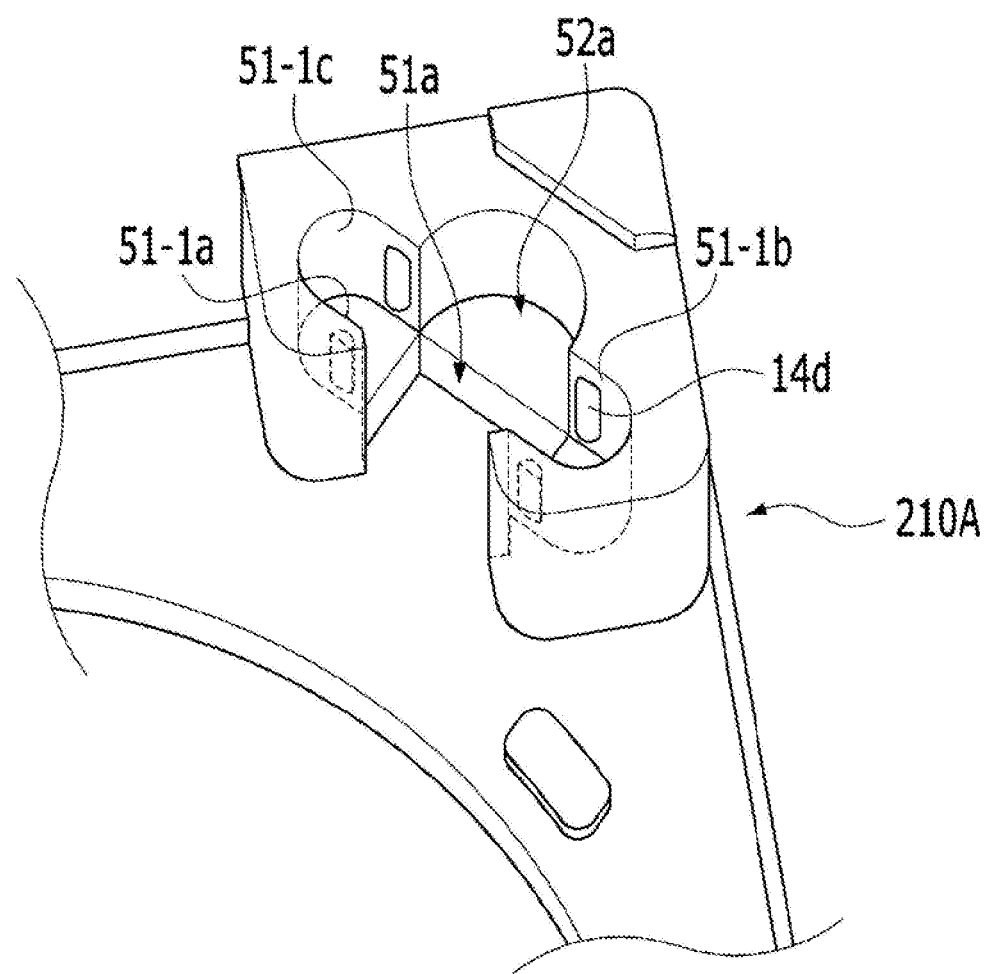
FIG. 14C is a fragmentary perspective view of a base according to a further embodiment.

FIGS. 14A to 14C are fragmentary perspective views of a base 210A according to another embodiment.

Referring to FIGS. 14A to 14C, the side surfaces 51-1a, 51-1b and 51-1c of the first groove 51a of the base 210A may be provided with a plurality of protrusions 14a to 14c or 14d, which correspond to the rollers P1 to P3.

In FIG. 14A, the protrusions 14a, 14b and 14c may be disposed at the first side surface 51-1a and the second side surface 51-1b of the first groove 51a.

In FIG. 14B, the protrusions 14a, 14b and 14c may be disposed at the first to third side surfaces 51-1a, 51-1b and 51-1c of the first groove 51a.

In FIGS. 14A and 14B, each of the protrusions 14a, 14b and 14c may have a semicircular shape. In FIG. 14C, the protrusion 14d may have a linear projection shape, the cross section of which has a semicircular or arched shape.

The outer circumferential surface or the side surface of each of the rollers P1 to P3 and Q1 to Q3 may be in contact with the plurality of protrusions 14a to 14d, and may be spaced apart from the first to third side surfaces 51-1a, 51-1b and 51-1c.

The side surface of the second groove 51b of the bobbin 110 may be provided with a plurality of protrusions, which correspond to the rollers Q1 to Q3. The description regarding the protrusions 14a to 14d provided at the side surfaces of the first groove 51b in the bobbin 110 may also be applied to the second groove 51b in the bobbin 110.

In FIGS. 14A to 14C, since the rollers P1 to P3 and Q1 to Q3 may be in line contact or surface contact with the protrusions 14a to 14d, the frictional force between the base 210A and the rollers P1, P2 and P3 shown in FIGS. 14A to 14C may be reduced compared to the base 210 shown in FIG. 1.

Referring to FIG. 8, at the initial position of the AF operation unit (for example, at the initial position of the bobbin 110), the coil 120 may overlap the magnet 130 in a direction toward the fourth post 216d from the first post 216a.

Here, the initial position of the AF operation unit, for example, the bobbin 110, may be the original position of the AF operation unit in the state in which no electric power is applied to the coil 120. In addition, the initial position of the AF operation unit may be the position at which the AF operation unit is located when gravity acts in the direction from the bobbin 110 to the base 210 or when gravity acts in the direction from the base 210 to the bobbin 110.

For example, in a direction toward the fourth post 216d from the first post 216a, an upper portion 120-1 of the coil 120 may overlap a first magnet portion 31 of the magnet 130, a lower portion 120-2 of the coil 120 may overlap a second magnet portion 32 of the magnet 130, and the space between the upper portion 120-1 and the lower portion 120-2 of the coil 120 may overlap a non-magnetic partition 33 of the magnet 130.

Figure 10:
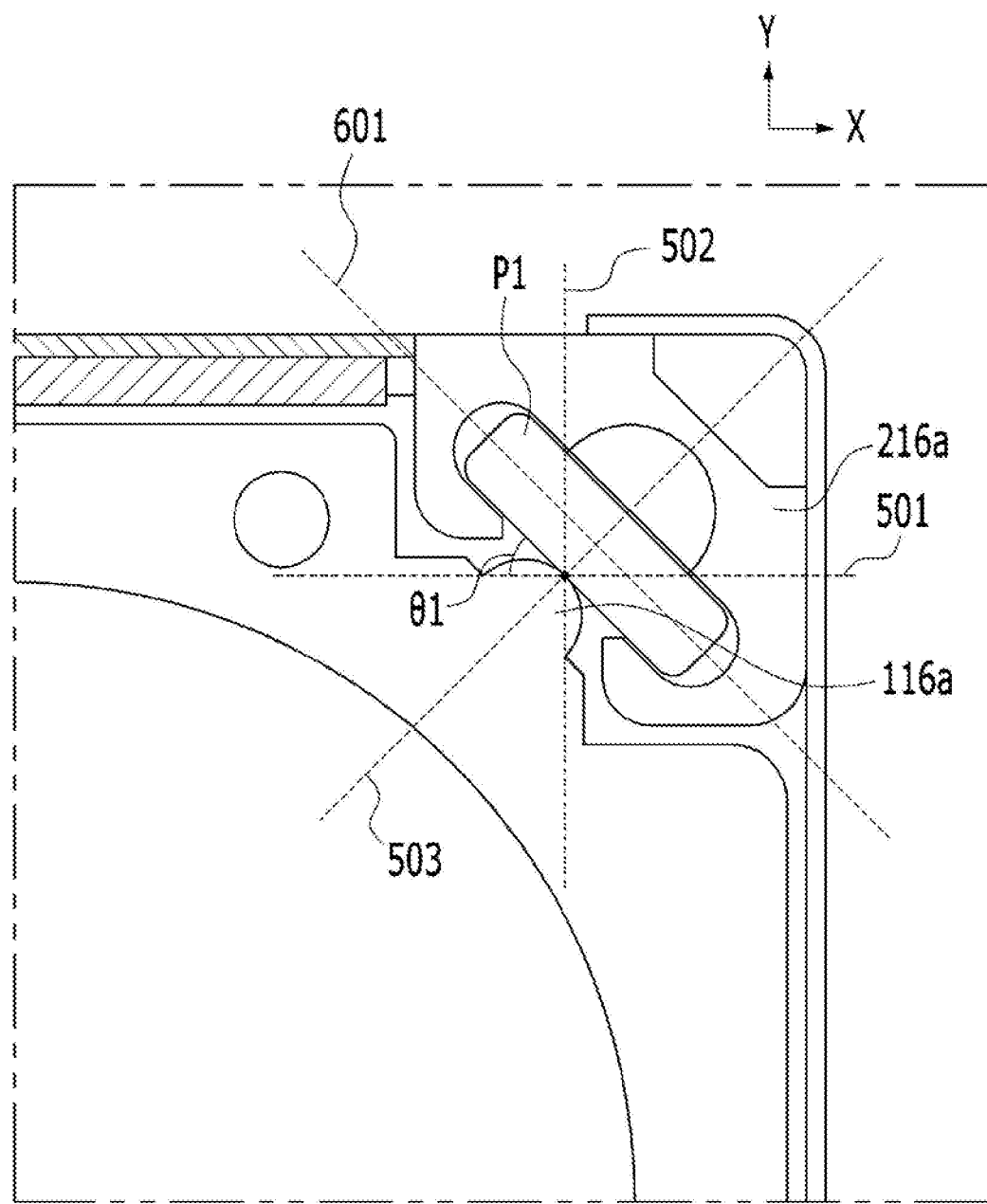
FIG. 10 is a fragmentary enlarged view of FIG. 7.

FIG. 10 is a fragmentary enlarged view of FIG. 7. The description regarding FIG. 10 may also be applied to the roller unit 1160 and the second support 116b of the bobbin 110.

Referring to FIGS. 7 and 10, the rollers P1 to P3 of the first roller unit 150 may be disposed so as to be inclined at a first angle θ1 with respect to a first reference line 501.

Furthermore, the rollers Q1 to Q3 of the second roller unit 160 may be disposed so as to be inclined at a second angle (not shown) with respect to the first reference line.

Here, the first reference line 501 may be an imaginary line (for example, the x-axis) parallel to a direction toward the second post 216b from the first post 216a.

For example, the first reference line 502 may extend through the point at which the rollers (for example, P1, P2 and P3) of the first roller unit 150 meet the first support 116a. Alternatively, the first reference line may extend through the point at which the rollers (for example, Q1, Q2 and Q3) of the second roller unit 160 meet the second support 116b.

For example, the central axis 601 (see FIG. 6) of the rollers (for example, P1, P2 and P3) may be inclined at a first angle (θ1) with respect to the first reference line 501. Furthermore, the central axis of the rollers (for example, Q1, Q2 and Q3) of the second roller unit 160 may be inclined at a second angle with respect to the first reference line.

For example, the first angle θ1 may be an angle between the central axis 601 (see FIG. 6) of the rollers (for example, P1, P2 and P3) and the first reference line 501, and the second angle may be an angle between the rollers (for example, Q1, Q2 and Q3) of the second roller unit 160 and the first reference line.

For example, the first angle θ1 may be an angle to which the central axis 601 of the rollers (for example, P1, P2 and P3) of the first roller unit 150 is rotated clockwise with respect to the first reference line 501.

Furthermore, the second angle may be an angle to which the central axis of the rollers (for example, Q1, Q2 and Q3) of the second roller unit 160 is rotated clockwise with respect to the first reference line.

For example, the central axis 601 (see FIG. 6) of the rollers (for example, P1, P2 and P3) of the first roller unit 150 may be an axis that extends through the center of the rollers (for example, P1, P2 and P3) and is parallel to the longitudinal direction of the rollers (for example, P1, P2 and P3). For example, the center of the rollers (for example, P1, P2 and P3) may be the diametric center of the rollers. The description regarding the central axis 601 of the rollers (for example, P1, P2 and P3) of the first roller unit 150 may be applied to the central axis of the rollers (for example, Q1, Q2 and Q3) of the second roller unit 160.

Each of the rollers (for example, P1, P2 and P3) may be disposed so as to be rotated about an axis perpendicular to the optical axis.

For example, the rollers (for example, P1, P2 and P3) may be disposed such that the central axis 601 is perpendicular to the optical axis OA, and may be rotated about the central axis 601. Furthermore, the rollers Q1, Q2 and Q3 of the second roller unit 160 may be disposed such that the central axis is perpendicular to the optical axis OA, and may be rotated about the central axis.

The first angle θ1 and the second angle may be different from each other.

For example, the first angle θ1 may be 30°~60°, and the second angle may be 120°~150°. For example, the second angle may be a value obtained by subtracting the first angle θ1 from 180°.

For example, the first angle θ1 may be 40°~50°.

For example, the first angle θ1 may be 43°~47°.

For example, the first angle θ1 may be 45°.

When the first angle θ1 is smaller than 40°, an effect of suppressing the movement of the bobbin 110 in the x-axis direction may be reduced. When the first angle θ1 is smaller than 40°, an effect of suppressing the movement of the bobbin 110 in the x-axis direction may be reduced. When the first angle θ1 is larger than 60°, an effect of suppressing the movement of the bobbin 110 in the y-axis direction may be reduced.

Since the rollers P1 to P3 of the first roller unit 150 are disposed so as to be inclined at the first angle 81 with respect to the first reference line 501 and the rollers Q1 to Q3 of the second roller unit 1160 are disposed so as to be inclined at the second angle with respect to the first reference line, it is possible to suppress the movement of the bobbin 110 in a direction parallel to the first reference line 501 (for example, in the x-axis direction) or in a direction parallel to the second reference line 502 (for example, in the y-axis direction). For example, the second reference line 502 may be an imaginary line perpendicular to the first reference line 501.

For example, when the first angle 81 is 45° and the second angle is 135°, the rollers P1 to P3 of the first roller unit 150 and the rollers Q1 to Q3 of the second roller unit 160 are able to suppress the movement of the bobbin 110 in the x-axis direction and in the y-axis direction in a balanced manner.

For example, the central line 503 of the first support 116a of the bobbin 110 and the central axis 601 of the rollers (for example, P1, P2 and P3) may be perpendicular to each other, and the central line of the second support 116b of the bobbin 110 and the central axis of the rollers (for example, Q1, Q2 and Q3) may be perpendicular to each other; however, the disclosure is not limited thereto.

The central line 503 of the first support 116a may be a line that extends through the point at which the first support is in contact with the rollers (for example, P1, P2 or P3) and that divides the first support 116a into two. For example, the central line 503 of the first support 116a may be a line that divides the first support 116a into two symmetrical segments.

Furthermore, the central line of the second support 116b may be a line that extends through the point at which the second support is in contact with the rollers (for example, Q1, Q2 or Q3) and that divides the second support 116b into two. For example, the central line of the second support 116b may be a line that divides the second support 116b into two symmetrical segments.

In FIG. 10, the description regarding the disposition of the rollers P1 to P3 of the first roller unit 150 may also be applied to the disposition of the rollers Q1 to Q3 of the second roller unit 160.

The first roller unit 150 and the second roller unit 160 may be disposed so as to be symmetrical with respect to the central line 710 (see FIG. 7), which is parallel to a direction toward the fourth post 216d from the first post 216a and which extends through the center of the opening 101 in the bobbin 110.

Next, the magnetic body 195 will be described.

The magnetic body 195 may be disposed at the base 210, and may be positioned under the coil 120.

For example, the magnetic body 195 may be disposed on the outer surface of the base 210.

For example, attractive force may act between the magnetic body 195 and the magnet 130.

For example, the magnetic body 195 may be positioned lower than the magnet 130 based on the lower surface of the base, and may serve to suppress tilting of the bobbin 110 during movement of the bobbin 110. The magnetic body 195 may also be referred to as a "tilt suppressor", "tilt compensator" or "tilt controller" because the magnetic body suppresses the occurrence of tilting of the bobbin 1110.

In the lens moving apparatus 100 according to the embodiment, because the magnet 130 is disposed on only one side surface 110b-1 of the bobbin 110 and only one coil 120 is disposed so as to correspond to the one magnet 130, imbalance in electromagnetic force may occur between the side surface 110b-1 of the bobbin 110 on which the magnet 130 is disposed, and the opposite side surface 110b-3.

Owing to the imbalance in electromagnetic force, tilting of the bobbin 110 may occur during movement of the bobbin 110. However, the embodiment is able to suppress the occurrence of tilting of the bobbin since the magnetic body 195 is made of a material that is attracted to the magnet 130.

The magnetic body 195 may be composed of a material, which is attracted to a magnet, for example, a magnetic material (for example, a material having magnetic property).

In another embodiment, the magnetic body 1195 may be composed of a material that is attracted to a magnet, for example, a metal material (for example, iron).

The magnetic body 195 may be disposed on the outer surfaces of the first and second posts 216a and 216b and the outer surface of the first side portion 218a of the body 213 of the base 210. For example, the magnetic body 195 may be disposed in the second mounting recess 42.

The magnetic body 195 may have a plate shape. For example, the magnetic body 195 may include a plate 195-1, a first extension 195-2 extending upwards from one end of the plate 195-1, and a second extension 195-3 extending upwards from the other end of the plate 195-1.

The plate 195-1 of the magnetic body 195 may be disposed on the outer surface of the first side portion 218a of the body 213 of the base 210. For example, the magnetic body 195 may be secured or attached to the base 210 using an adhesive member.

The first extension 195-2 may be disposed on the side surface (for example, the outer surface) of the first post 216a, and may extend in a direction toward the upper surface from the lower surface of the base 210.

The second extension 195-3 may be disposed on the side surface (for example, the outer surface) of the second post 216b, and may extend in a direction toward the upper surface from the lower surface of the base 210.

The first and second extensions 195-2 and 195-3 may increase the binding force between the magnetic body 195 and the base 210.

In order to increase the force acting between the magnet 130 and the magnetic body 195, the horizontal length L1 (see FIG. 4) of the plate 195-1 of the magnetic body 195 may be larger than the horizontal length L2 (see FIG. 2) of the magnet 130; however, the disclosure is not limited thereto. In another embodiment, L1 may be equal to Le.

Because attractive force acts between the magnetic body 195 and the magnet 130, it is possible to set the initial position of the bobbin 110 even when a drive signal is not applied to the coil 120.

For example, when a drive signal is not applied to the coil 120, it is possible to cause the bobbin 110 to be positioned at the lowest level by means of the attractive force acting between the magnetic body 195 and the magnet 130. Here, the lowest level of the bobbin 110 may be the lowest position from the base 210 in the range of displacement of the bobbin 110. Here, the lowest position of the bobbin 110 may be the initial position of the bobbin 110.

For example, when a drive signal is not applied to the coil 120, the force acting between the magnetic body 195 and the magnet 140 may be equal to or larger than the force required to cause the bobbin 110 to be disposed at the lowest position.

Since it is possible to set the initial position of the bobbin 110 by means of the attractive force acting between the magnetic body 195 and the magnet 130, it is possible to perform accurate AF operation even without an additional location sensor.

Since the center of the bobbin 110 is not aligned with the center of the base and only one magnet 130 is used, the embodiment is able to reduce the number of components.

Since the embodiment includes the rollers in place of a spring, the embodiment is able to reduce the amount of current that is consumed during AF operation compared to a lens moving apparatus employing a spring. Furthermore, since the settling time is reduced, it is possible to increase the speed of AF operation.

Since the magnetic body 195 and the magnet 130 are disposed at one side portion 218a of the body 213 of the base 210, the embodiment is able to simultaneously perform both tilt compensation and drive operation.

By means of lubricant injected into the first and second grooves 51a and 51b through the first and second guide grooves 52a and 52b, it is possible to make rotation and driving of the first and second roller units 150 and 160 smooth.

Furthermore, since the rollers P1 to P3 and Q1 to Q3 are disposed so as to be inclined at a predetermined angle with respect to the first reference line 501, the embodiment is able to suppress the movement of the bobbin 110 in x-axis and y-axis directions.

Since the cover member 300 includes the first and second protrusions 311 and 312, the embodiment is able to prevent the rollers P1 to P3 and Q1 to Q3 from being separated from the first and second grooves 51a and 51b.

Although the embodiment shown in FIGS. 1 to 11 is not provided with a location sensor, the disclosure is not limited thereto. A lens moving apparatus according to another embodiment may further include a location sensor.

Figure 12:
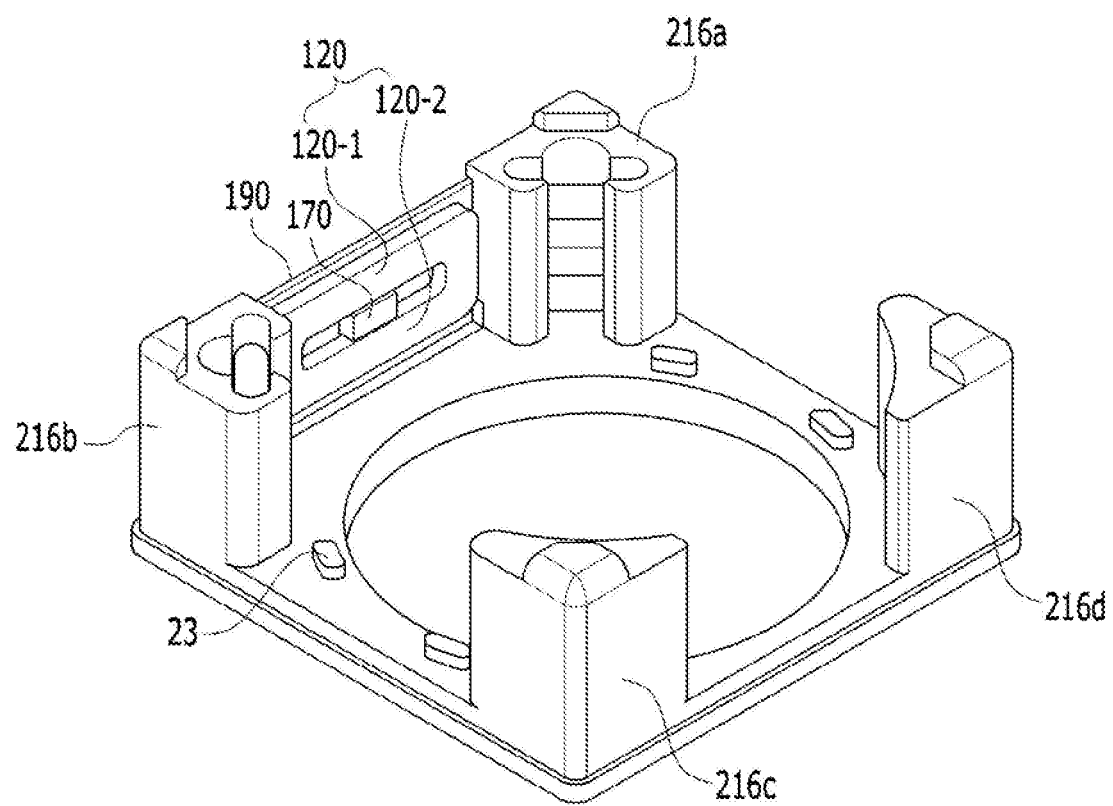
FIG. 12 illustrates a location sensor, which is additionally provided in the lens moving apparatus.
Figure 13:
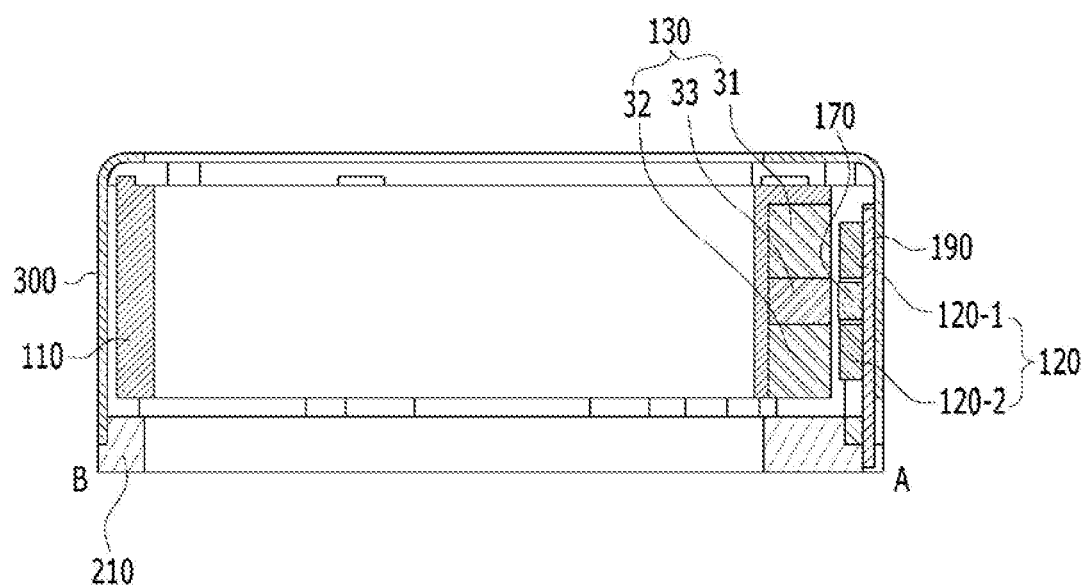
FIG. 13 is a cross-sectional view of the embodiment including the location sensor shown in FIG. 12.

FIG. 12 illustrates a location sensor 170, which is additionally provided at the lens moving apparatus 100. FIG. 13 is a cross-sectional view of the embodiment including the location sensor 170 of FIG. 12.

Referring to FIGS. 12 and 13, the location sensor 170 may be disposed or mounted on the circuit board 190, and may be positioned in the space in the coil 120.

For example, the location sensor 170 may be positioned in the space between the upper portion 120-1 and the lower portion 120-2 of the coil 120.

For example, the location sensor 170 may overlap the non-magnetic partition 33 in a direction toward the fourth post 216d from the first post 216d.

The location sensor 170 may detect the intensity of a magnetic field of the magnet 130 mounted on the bobbin 110 according to the movement of the bobbin 110, and may output an output signal corresponding to the detected intensity. The location sensor 170 may be disposed on the first surface of the circuit board 190. Here, the first surface of the circuit board 190 may be the surface on which the coil 120 is disposed.

The location sensor 170 may be embodied as a drive IC type including a hall sensor, or may be embodied as only a single location detection sensor such as a hall sensor or the like.

For example, when the location sensor 170 is embodied by only one hall sensor, the location sensor 170 may include two input terminals and two output terminals.

The circuit board 190 may be conductively connected to the location sensor 170. For example, the four terminals of the location sensor 170 may be conductively connected to the circuit board 190, and the circuit board 190 may further include terminals conductively connected to the four terminals of the location sensor 170. For example, the circuit board 190 may include two terminals conductively connected to the coil 120 and four terminals conductively connected to the location sensor 170.

When the location sensor 170 is a drive-IC-type sensor including a hall sensor, the circuit board 190 may include four terminals conductively connected to the location sensor 170 because a drive signal is applied to the coil 120 from the location sensor 170.

Figure 15:
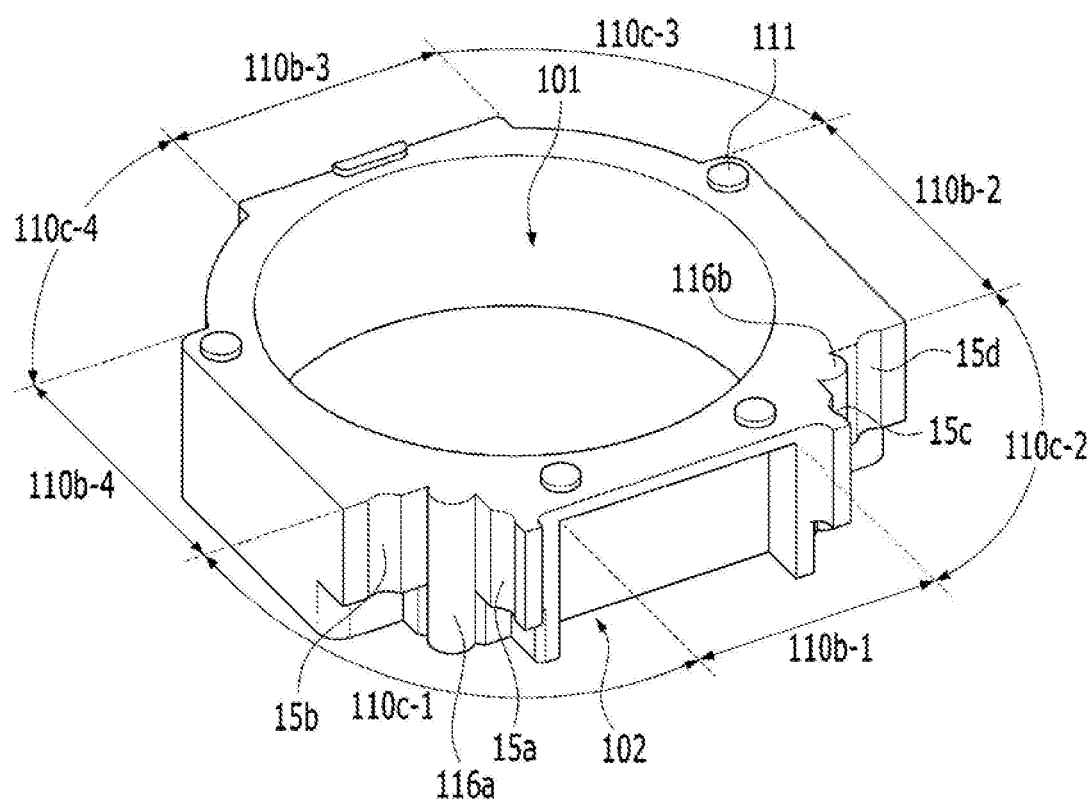
FIG. 15 is a perspective view of a bobbin according to another embodiment.
Figure 16:
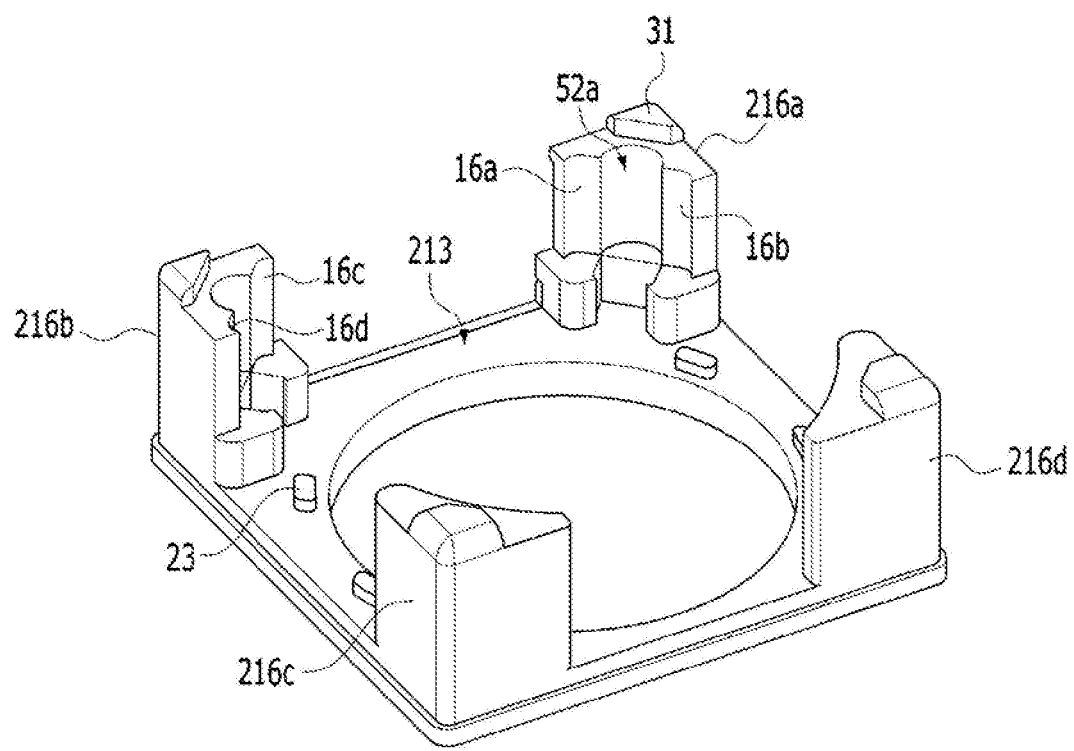
FIG. 16 is a perspective view of a base according to another embodiment.
Figure 17:
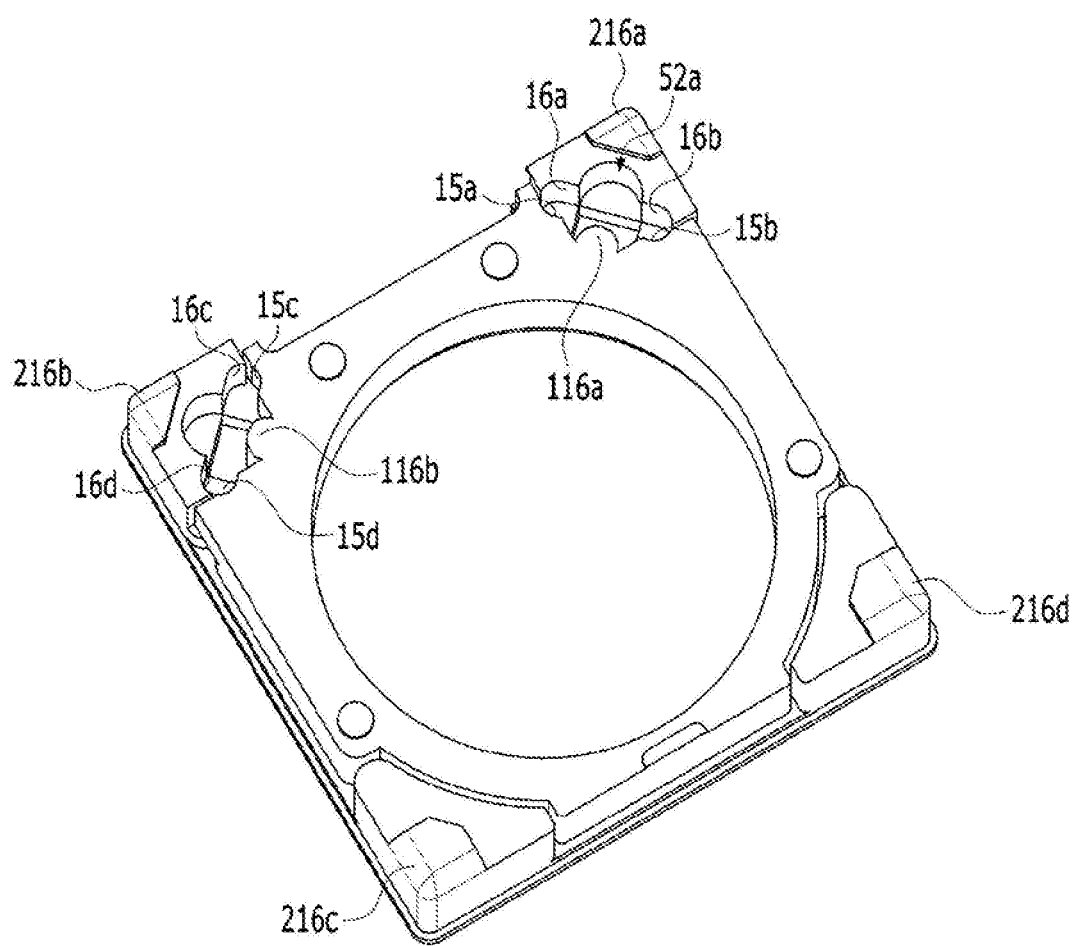
FIG. 17 is an assembled perspective view of the bobbin shown in FIG. 15 and the base shown in FIG. 16.
Figure 18:
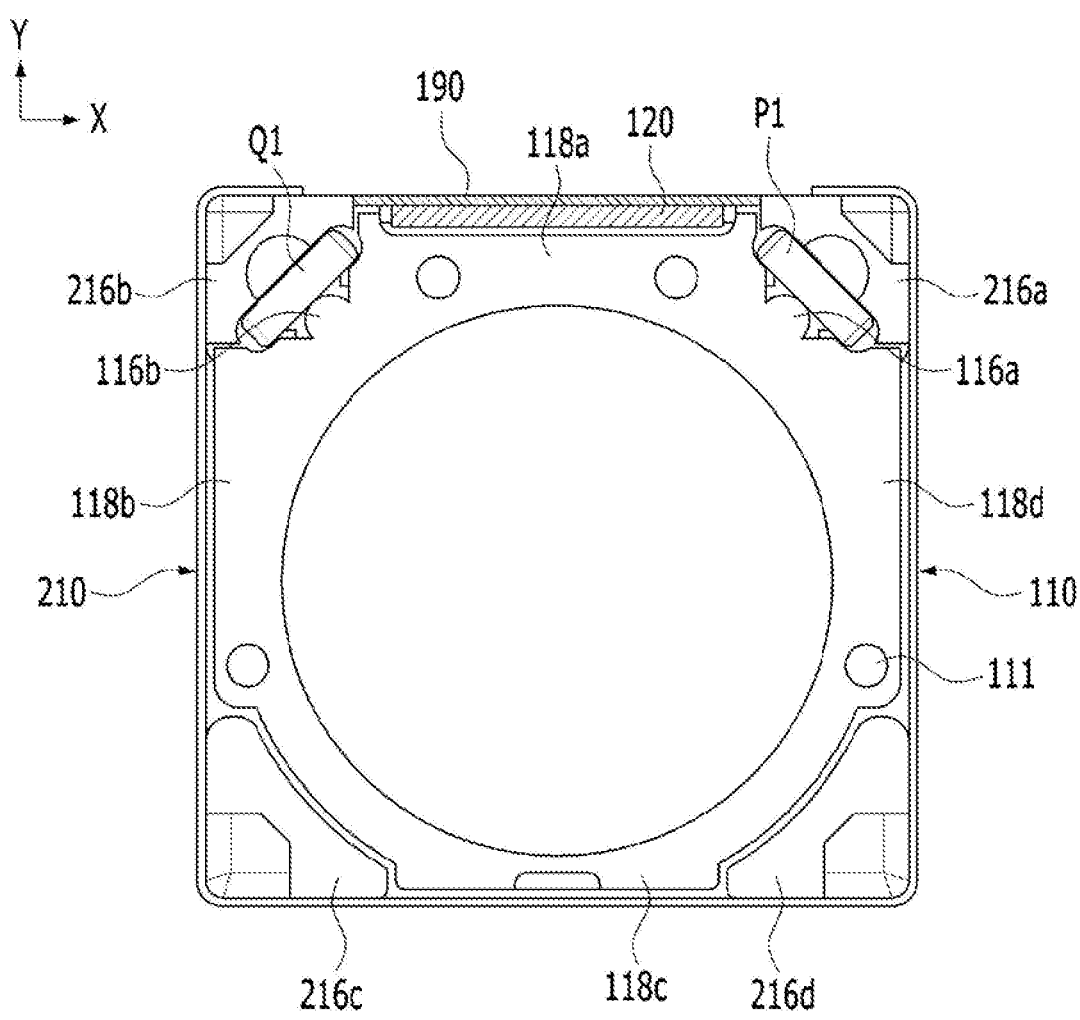
FIG. 18 is a perspective view of the bobbin shown in FIG. 15, the base shown in FIG. 16, the first and second roller units, the first coil and the circuit board.

FIG. 15 is a perspective view of a bobbin according to another embodiment. FIG. 16 is a perspective view of a base according to another embodiment. FIG. 17 is an assembled perspective view of the bobbin shown in FIG. 15 and the base shown in FIG. 16. FIG. 18 is a perspective view of the bobbin shown in FIG. 15 and the base, the first and second roller units 150 and 160, the first coil 120 and the circuit board 190 shown in FIG. 16.

In FIGS. 15 to 18, the same numerals as those in FIGS. to 13 indicate the same components, and descriptions regarding the same components will be made briefly or omitted.

Referring to FIGS. 15 to 18, the bobbin shown in FIG. 15 may include a first groove for supporting the first roller unit 150 and a second groove for supporting the second roller unit 160.

For example, the bobbin shown in FIG. 15 may include a first support groove 15a positioned to the right of the first support 116a and a second support groove 15b positioned to the left of the first support 116a.

Furthermore, the bobbin shown in FIG. 15 may include a third support groove 15c positioned to the left of the second support 116b and a fourth support groove 15d positioned to the right of the second support 116b.

For example, the first support groove 15a may be positioned at one side surface of the first projection 118a positioned to the right of the first support 116a, and the second support groove 15b may be positioned at one side surface of the fourth projection 118d positioned to the left of the first support 116a.

For example, the third support groove 15c may be positioned at the other side surface of the first projection 118a positioned to the left of the second support 116a, and the fourth support groove 15d may be positioned at one side surface of the second projection 118b positioned to the right of the second support 116b.

The inner surface of the first post 216a of the base shown in FIG. 16 may be provided with a first mounting groove 16a corresponding to the first support groove 15a in the bobbin shown in FIG. 15 and a second mounting groove 16b corresponding to the second support groove 15b in the bobbin shown in FIG. 15.

The inner surface of the second post 216b of the base shown in FIG. 16 may be provided with a third mounting groove 16c corresponding to the third support groove 15c of the bobbin shown in FIG. 15 and a fourth mounting groove 16d corresponding to the fourth support groove 15d of the bobbin shown in FIG. 15.

Referring to FIG. 17, the first and second support grooves 15a and 15b in the bobbin shown in FIG. 15 and the first and second mounting grooves 16a and 16b corresponding to the first and second support grooves 15a and 15b may define a first groove, in which the first roller unit 150 as inserted, disposed or mounted.

Furthermore, the third and fourth support grooves 15c and 15d in the bobbin shown in FIG. 15 and the third and fourth mounting grooves 16c and 16d in the second post 216b shown in FIG. 16 may define together a second groove, in which the second roller unit 160 is inserted, disposed or mounted.

Referring to FIG. 18, the first roller unit 150 may be in contact with the first and second support grooves 15a and 16b in the bobbin shown in FIG. 15 and the first and second mounting grooves 16a and 16b in the first post 216a shown in FIG. 16.

The second roller unit 160 may be in contact with the third and fourth support grooves 15c and 15d in the bobbin shown in FIG. 15 and the third and fourth mounting grooves 16c and 16d in the second post 216b shown in FIG. 16.

In the embodiment shown in FIGS. 1 to 13, the first roller unit 150 is inserted or disposed in the first groove 51a formed in the first post 216a, and the second roller unit 160 is inserted or disposed in the second groove 51b formed in the second post 216b.

In contrast, in the embodiment shown in FIGS. 15 to 18, the first and second roller units 150 and 160 may be disposed or mounted in the grooves defined by the first to fourth support grooves 15a to 15d formed in the bobbin and the first and second mounting grooves 16a to 16d.

The description of FIGS. 7 to 10 may also be applied to the embodiment of FIGS. 15 to 18.

The protrusions 14a, 14b, 14c and 14d shown in FIGS. 14A to 14C may be applied to the embodiment shown in FIGS. 15 to 18, and the description regarding the protrusions 14a, 14b1, 14 may also be applied thereto.

The location sensor 170 shown in FIG. 12 may be applied to the embodiment shown in FIGS. 15 to 18, and the description regarding the location sensor 170 may be applied thereto.

Figure 19:
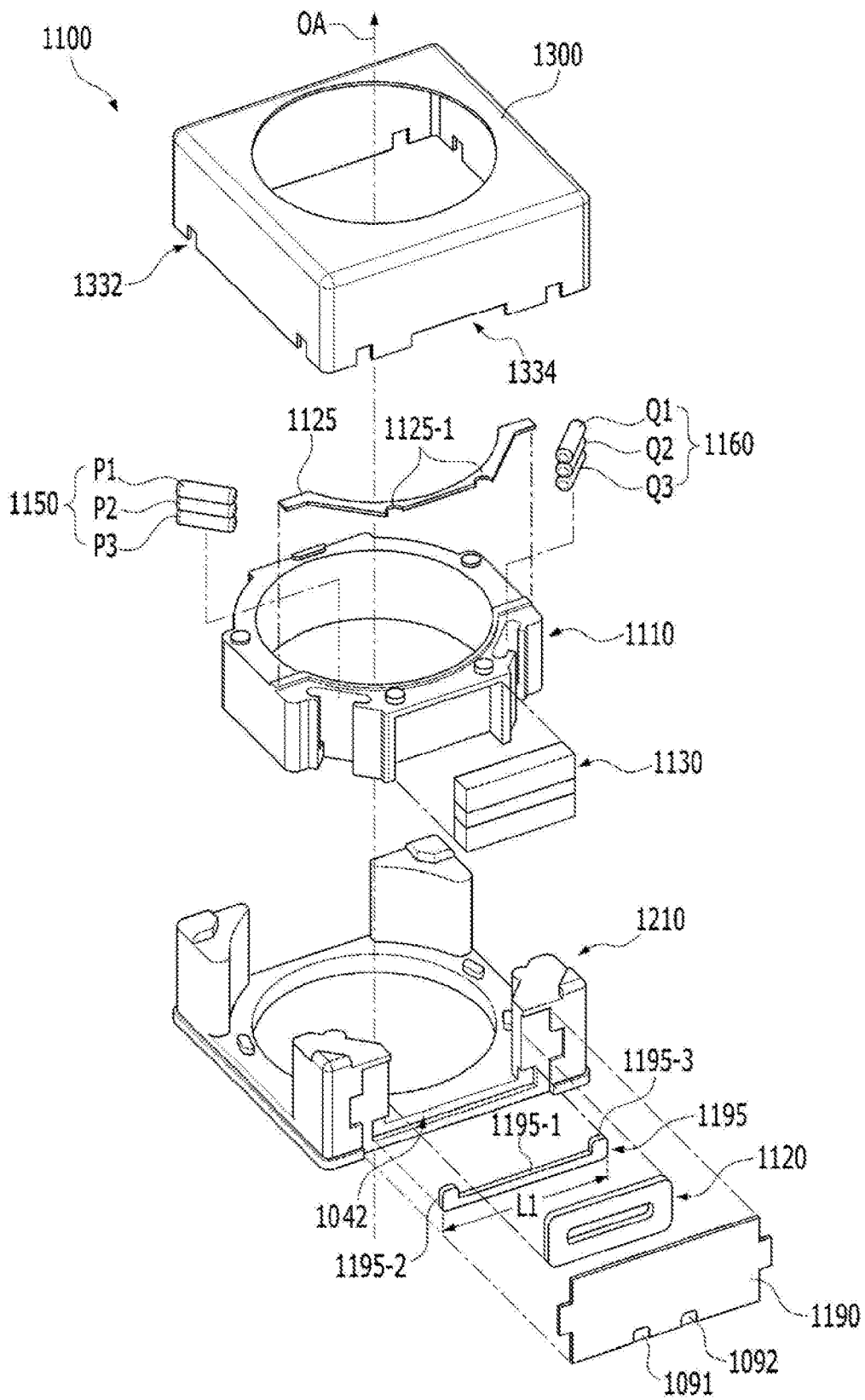
FIG. 19 is an exploded perspective view of a lens moving apparatus according to another embodiment.

FIG. 19 illustrates an exploded perspective view of a lens moving apparatus 1100 according to another embodiment.

Referring to FIG. 19, the lens moving apparatus 1100 may include a cover member 1300, a bobbin 1110, a coil 1120, a magnet 1130, a first roller unit 1150, a second roller unit 1160, a circuit board 1190, a magnetic body 1195 and a base 1210.

The cover member 1300 will first be described.

The cover member 1300 may accommodate the other components 1110, 1120, 1130, 1150, 1160, 1190 and 1195 in the space defined by being combined with the base 1210. The description regarding the cover member 300 shown in FIG. 1 may be applied to the cover member 1300 shown in FIG. 19.

Next, the bobbin 1110 will be described.

Figure 20:
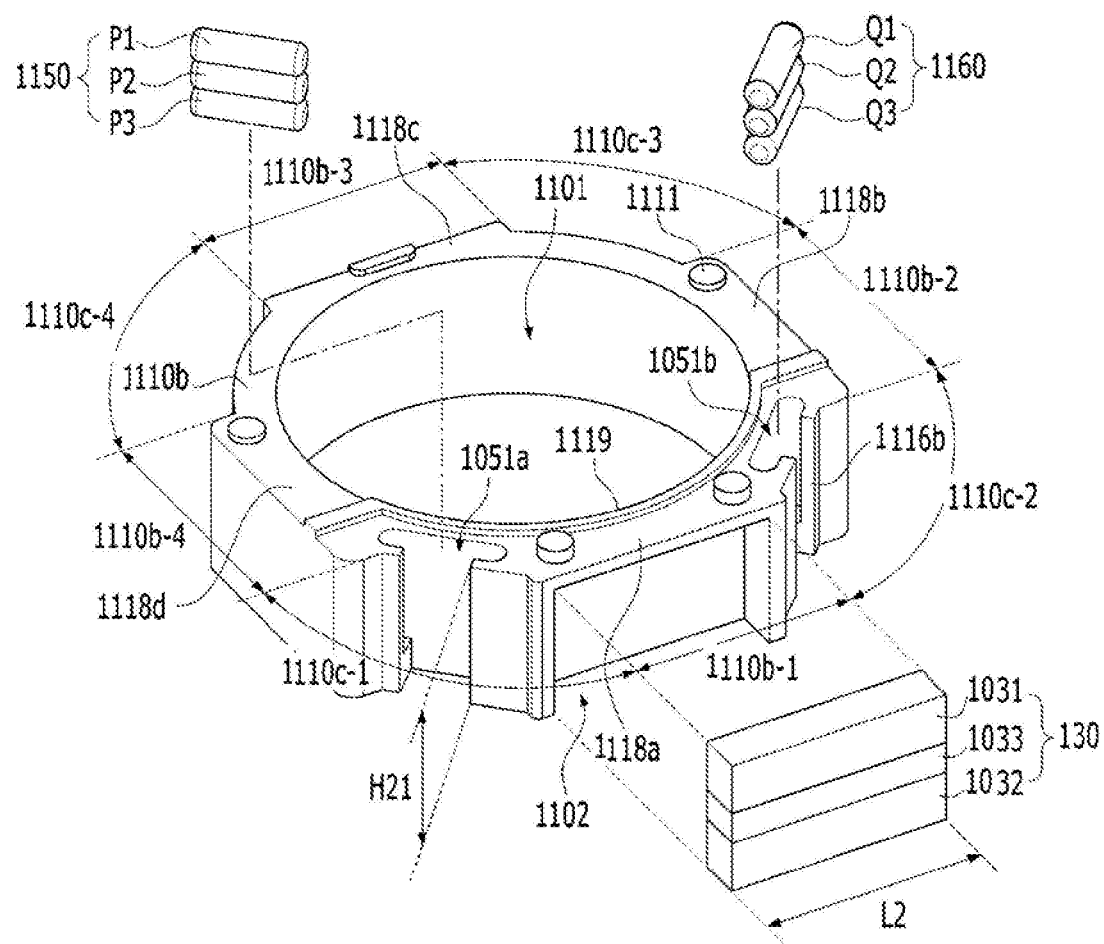
FIG. 20 is a perspective view of a bobbin and a magnet shown in FIG. 19.
Figure 21:
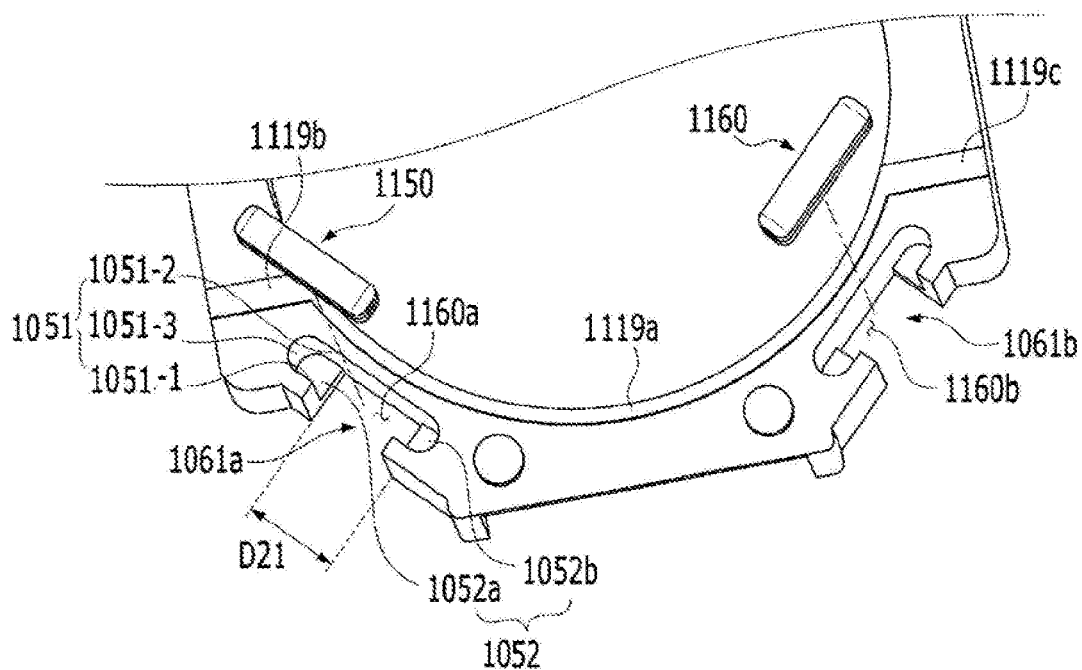
FIG. 21 is a perspective view of first and second grooves in the bobbin and first and second roller units, shown in FIG. 20.

FIG. 20 is a perspective view of the bobbin 1110 and the magnets 1130 shown in FIG. 19. FIG. 21 illustrates a perspective view of the first and second grooves 1051a and 1051b in the bobbin 1110 and the first and second roller units 1150 and 1160 shown in FIG. 20. The description regarding the roller P1 shown in FIG. 6 may be applied to the rollers P1 to P3 and Q1 to Q3 included in the roller units 1150 and 1160 shown in FIGS. 20 and 21.

Referring to FIGS. 20 and 21, the bobbin 1110 may be positioned inside posts 1216a to 1216d of the base 1210, and may be moved in the first direction (for example, in the z-axis direction) by the electromagnetic interaction between the coil 1120 and the magnet 1130. For example, the bobbin 1110 may be moved in one direction, for example, in an upward direction, from the initial position of the bobbin 1110.

The bobbin 1110 may include an opening 1101 in which a lens or a lens barrel is mounted. The description regarding the opening 101 in the bobbin 110 may be applied to the opening 1101 in the bobbin 1110.

The bobbin may include at least one stopper 1111 disposed on the upper surface thereof. The description regarding the stopper 111 shown in FIG. 2 may also be applied to the stopper 1111 of the bobbin 1110.

The bobbin 1110 may have a mounting recess 1102 formed in the outer surface thereof for mounting the magnet 1130. The description of the mounting recess 102 in the bobbin 110 may be applied to the mounting recess 1102 in the bobbin 1100.

The bobbin 1110 may include side surfaces 1110c-1 to 1110c-4, a side surface 1110b-1 between the side surface 1110c-1 and the side surface 1110c-2, a side surface 1110b-2 between the side surface 1110c-2 and the side surface 1110c-3, a side surface 1110b-3 between the side surface 1110c-3 and the side surface 1110c-4, and a side surface 1110b-4 between the side surface 1110c-4 and the side surface 1110c-1.

The side surfaces 1110c-1 to 1110c-4 of the bobbin 1110 may correspond to the posts 1216a to 1216d of the base 1210, and the side surfaces 1110b-1 to 1110b-4 of the bobbin 1110 may correspond to the spaces between the posts 1216a to 1216d of the base 1210.

The bobbin 1110 may include projections 118a to 118d projecting from the outer surface 1110b thereof. For example, the outer surfaces of the projections 118a to 118d may be the side surfaces 1110b-1 to 1110b-4 of the bobbin 1110.

The mounting recess may be formed in the first projection 118a, and may have a shape that is identical to or coincides with the magnet 1130.

The bobbin 1110 may have a first groove 1051a formed in the side surface 1110c-1 for disposition of the first roller unit 1150 and a second groove 1051b formed in the side surface 1110c-2 for disposition of the second roller unit 1160.

For example, the magnet 1130 may be disposed on the first side surface 1110b-1 of the bobbin 1110. The first groove 1051a may be formed in the second side surface 1110c-1 adjacent to the first side surface 1110b-1 of the bobbin 1110, and the second groove 1051b may be formed in the third side surface 1110c-2 adjacent to the first side surface 1110b-1 of the bobbin 1110. For example, the first side surface 1110b-1 of the bobbin 1100 may be disposed between the second side surface 1110c-1 and the third side surface 1110c-2 of the bobbin 1100. For example, the first side surface 1110b-1 of the bobbin 1100 may connect the second side surface 1110c-1 to the third side surface 110c-2 thereof.

For example, the first groove 1051a may be disposed between the first projection 118a and the fourth projection 118d, and the second groove 1051b may be disposed between the first projection 118a and the second projection 118b.

For example, the first groove 1051a may have a shape that corresponds to or coincides with at least one of the rollers included in the first roller unit 1150, and the second groove 1051b may have a shape that corresponds to or coincides with at least one of the rollers included in the second roller unit 1160.

Each of the first groove 1051a and the second groove 1051b may have a structure depressed from the upper surface of the bobbin 1110.

For example, the first groove 1051a may have a first opening 1061a formed in the side surface 1110c-1 of the bobbin 1110, and the second groove 1051b may have a second opening 1061b formed in the side surface 1110c-2 thereof.

By virtue of the first opening 1061a and the second opening 1061b, it is possible to reduce the frictional force between the first and second roller units 1150 and 1160 and the first and second grooves 1051a and 1051b, and it is possible to obtain desired frictional force between the first and second roller units 1150 and 1160 and the bobbin 1110 by controlling the size of the openings.

Lubricant may be injected into the first groove 1051a and the second groove 1051b in the bobbin 1110. The lubricant may be capable of reducing the frictional force between the first and second roller units 1150 and 1160 and the first and second grooves 1051a and 1051b and of making rotation of the first and second roller units 1150 and 1160 smooth.

Next, the first roller unit 1140 and the second roller unit 1160 will be described.

The first roller unit 1150 may include at least one roller (for example, P1 to P3), and may be disposed in the first groove 1051a in the bobbin 1110.

The second roller unit 1160 may include at least one roller (for example, Q1 to Q3), and may be disposed in the first groove 1051b in the bobbin 1110.

For example, the first roller un 1150 may be in contact with at least two regions of the first groove 1051a in the bobbin 1110, and the second roller unit 1150 may be in contact with at least two regions of the second groove 1051b therein.

The first roller unit 1150 may be in contact with the first support 1116a of the base 1210, and the second roller unit 1150 may be in contact with the second support 1116b of the base 1210.

When the bobbin 1110 is moved in the optical-axis direction, each of the first roller unit 1150 and the second roller unit 1160, which are in contact with the first and second supports 1116a and 1116b, may perform rolling or rotation, thereby supporting movement of the bobbin 1110 in the optical-axis direction and guiding movement of the bobbin 1110 in the optical-axis direction.

Frictional force may act between the first and second roller units 1150 and 1160 and the first and second supports 1116a and 1116b of the base 1210, and the frictional force may be affected by the contact area between the first and second roller units 1150 and 1160 and the first and second supports 1116a and 1116b. In other words, the larger the contact area, the greater the frictional force.

Each of the first and second roller units 1150 and 1160 may include a plurality of rollers. For example, the number of rollers included in each of the first and second roller units 1150 and 1160 may be two, three, four or more.

For example, the first roller unit 1150 may include three rollers P1 to P3, and the second roller unit 1160 may include three rollers Q1 to Q3.

Referring to FIG. 21, the first groove 1051a may include a side surface 1051 and a bottom 1052.

For example, the side surface 1051 of each of the first groove 1051a and the second groove 1051b may include first to third side surfaces 1051-1 to 1051-3.

The first roller unit 1150 may be in contact with four regions of the first groove 1051a, and the second roller unit 1501b may be in contact with four regions of the second groove 1501b.

For example, the first roller unit 1150 may be in contact with two regions of the first side surface 1051-1 and two regions of the second side surface 51-1. The second roller unit 1160 may be in contact with two regions of the first side surface 1015-1 and two regions of the second side surface 51-2.

The bottom 1052 of the first groove 1051a may have a predetermined depth from the lower surface of the bobbin 1110 in the optical-axis direction. For example, the bottom 1052 of the first groove 1051a may be positioned higher than the lower surface of the bobbin 1110 based on the lower surface 1110.

The bottom 1052 of the first groove 1051a may have formed therein a groove or a hole 1160a.

Although the groove 1160a may be a through hole, the disclosure is not limited thereto.

The bottom 1052 of the first groove 1051a may include a first bottom 1052a and a second bottom 1052b, which are spaced apart from each other, and the groove 1060a may be disposed between the first bottom 1052a and the second bottom 1052b.

By virtue of the groove 1060a, the size of the surface area of the roller P3 that is in contact with the bottom 1052 of the first groove 1051a may be reduced, thereby reducing the frictional force between the roller P3 and the groove 1051a in the bobbin 1110 and reducing the frictional force between the roller P3 and the first support 1116a.

For example, the first side surface 1051-1 of the first groove 1051a may have formed therein the first opening 1061a formed in the side surface 1110c-1 of the bobbin 1110.

The first opening 1061a may expose a portion or a surface of the rollers P1 to P3 inserted or disposed in the first groove 1051a.

The first opening 1061a may have a size sufficient to allow the first support 1116a to be inserted thereinto.

For example, the horizontal length D21 of the first opening 1061a may be larger than the horizontal length D11 of the first support 1116a (D21>D11), and the vertical length H21 of the first opening 1061a may be equal to or larger than the vertical length H11 of the first support 1116a (H21≥H11).

For example, the first support 1116a may be inserted or disposed in the first opening 1061a so as to be in contact with the rollers P1 to P3 disposed in the first groove 1051a but to be spaced apart from the bobbin 1110, for example, the first groove 1051a.

For example, the second support 1116b may be inserted or disposed in the second opening 1061b so as to be in contact with the rollers Q1 to Q3 disposed in the second groove 1051b but to be spaced apart from the bobbin 1110, for example, the second groove 1051b.

Although the roller P1 may have a cylindrical shape, the disclosure is not limited thereto.

The length L of the roller P1 may be larger than the diameter R of the roller P1. For example, the ratio of the diameter R of the roller P1 to the length L of the roller P1 may be 1:1.5~1:5.

For example, the ratio (R:L) of the diameter to the length may also be 1:2~1:3.

For example, when the ratio (L/R) of the length to the diameter of the roller P1 is smaller than 1.5, an effect of preventing movement of the bobbin 110 in the x-axis direction or in the y-axis direction may be reduced.

When the ratio (L/R) of the length to the diameter of the roller P1 is larger than 5, the size of the bobbin 1110 for accommodating the roller may be increased, and spatial interference with the magnet 1130 may occur.

The second groove 1051b formed in the bobbin 1110 may also have the same shape as the first groove 1051a. The description regarding the first groove 1051a shown in FIGS. 20 and 21 may also be applied to the second groove 1051b.

For example, the second groove 1051b may have a second opening 1061b, and the bottom of the second groove 1051b may have formed therein a groove having a through-hole shape.

The embodiment may further include a roller cover 1125, which is disposed on the upper portion, the upper end or the upper surface of the bobbin 1110, in order to prevent the first roller unit 1150 and the second roller unit 1160 from being separated from the first groove 1051a and the second groove 1051b. Here, the roller cover 1125 may be referred to as "cover", "support" or "separation-preventing portion".

The roller cover 1125 may be disposed above the first groove 1051a and the second groove 1051b in the bobbin 1110 to prevent the first roller unit 1150 and the second roller unit 1160 from being separated from the first groove 1051a and the second groove 1051b.

The roller cover 1125 may cover at least a portion of the first groove 1051a and at least a portion of the second groove 1051b.

At least a portion of the roller cover 1125 may overlap the rollers P1, P2 and P3 of the first roller unit 1150 in the optical-axis direction.

Another portion of the roller cover 1125 may overlap the rollers Q1, Q2 and Q3 of the second roller unit 1160 in the optical-axis direction.

The bobbin 1110 may include a projection 1119 formed on the upper surface thereof so as to support the roller cover 1125. Although the projection 1119 may abut the upper portion of the inner surface of the opening 1101, the disclosure is not limited thereto.

For example, the projection 1119 may include a curved portion 1119a abutting the inner surface of the opening 1101 of the bobbin 1110, a first extending portion 1119b connected to one end of the curved portion 1119a and extending from the side surface 1110b-2 of the bobbin 1110 toward the side surface 1110b-4 of the bobbin 1110, and a second extending portion 1119c connected to the other end of the curved portion 1119a and extending from the side surface 1110b-4 of the bobbin 1110 and extending toward the side surface 1110b-2 of the bobbin 1110.

Although each of the first and second extending portions 1119b and 1119c may have a linear shape, the disclosure is not limited thereto. In another embodiment, the extending portion may have a curved shape.

The stopper 1111 may be positioned at the bobbin 1110 between the projection 1119 of the bobbin 1110, for example, the curved portion 1119a and the side surface 1110b-1 of the bobbin 1110.

Figure 24:
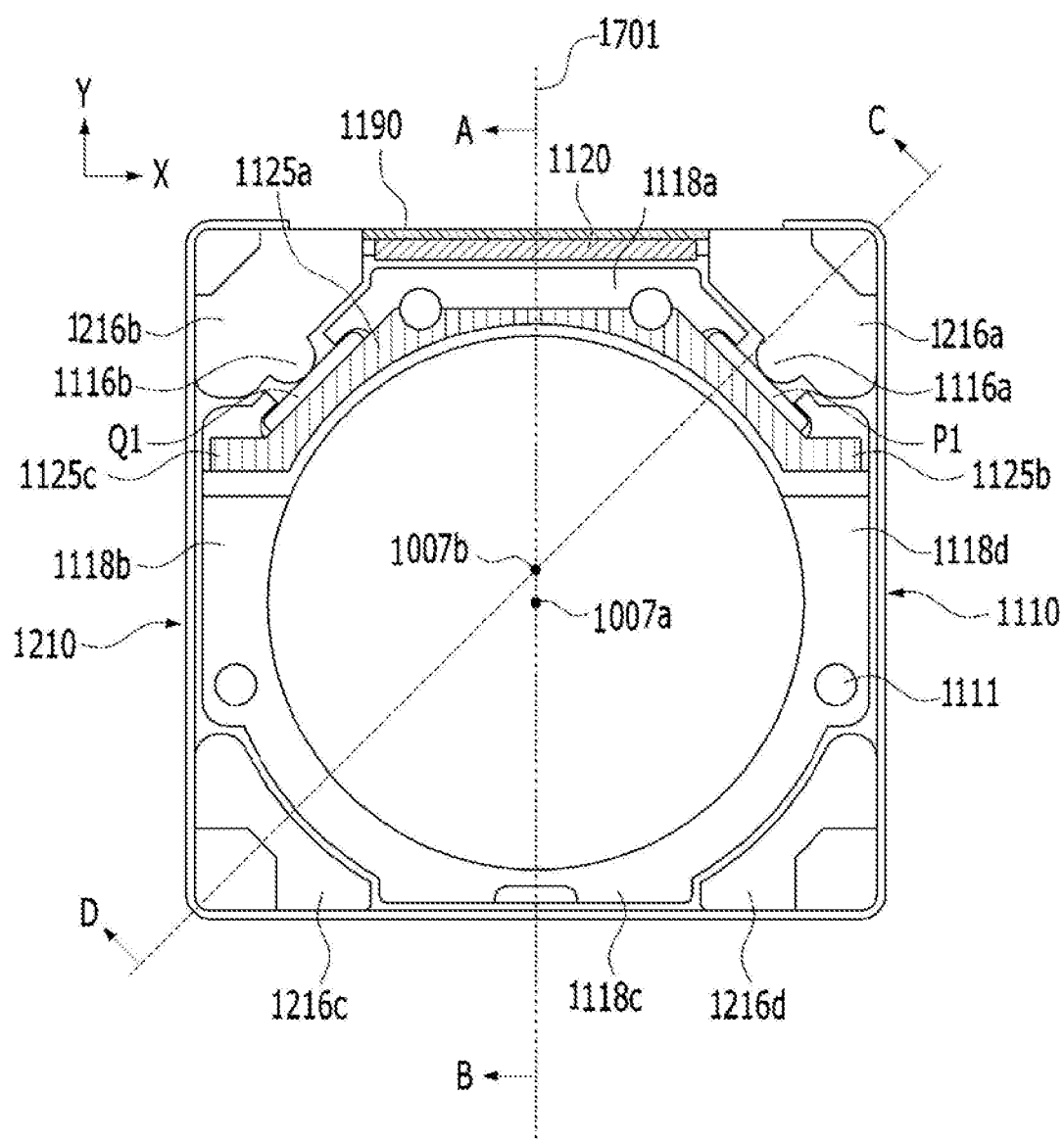
FIG. 24 is a plan view of the lens moving apparatus, from which a cover member is removed.

Referring to FIG. 24, the roller cover 1125 may be disposed on the upper portion or the upper surface of the bobbin 1110. Although the roller cover 1125 may be, for example, an injection-molded plastic product, the disclosure is not limited thereto. In another embodiment, the roller cover 1125 may be made of a magnetic body or metal.

For example, the roller cover 1125 may be disposed at a region (for example, a second region) of the upper surface of the bobbin 1110 abutting the second surface 1110c-1 of the bobbin 1110 and another region (for example, a third region) of the upper surface of the bobbin 1110 abutting the third side surface 1110c-2 of the bobbin 1110.

For example, the roller cover 1125 may also be disposed at another region (for example, a first region), the second region and the third region of the upper surface of the bobbin 1110, which abuts the first side surface 1110b-1 of the bobbin 1110.

The roller cover 1125 may include a curved portion 1125a corresponding to the opening 1101 in the bobbin 1110, a first extending portion 1125b connected to one and of the curved portion 1125a and extending from the side surface 1110b-2 of the bobbin 1110 toward the side surface 1110b-4, and a second extending portion 1125c connected to the other end of the curved portion 1119a and extending from the side surface 1110b-4 of the bobbin 1110 toward the side surface 1110b-2.

For example, the curved portion 1125a of the roller cover 1125 may correspond to the curved portion 1119a of the projection 1119 of the bobbin, and curved portion 1125a and the curved portion 1119a may be in contact with each other.

For example, the curved portion 1125a of the roller cover 1125 may include a curved surface or a curved side surface abutting the curved portion 1119a of the projection 1119.

For example, the first extending portion 1125b of the roller cover 1125 may correspond to the first extending portion 1119b of the projection 1119 of the bobbin 1110, and the two extending portions 1125b and 119b may be in contact with each other.

For example, the second extending portion 1125c of the roller cover 1125 may correspond to the second extending portion 1119c of the projection 1119 of the bobbin 1110, and the two extending portions 1125c and 1119c may be in contact with each other.

The curved portion 1125a of the roller cover 1125 may have formed therein a groove 1125-1 corresponding to the stopper 1111, and a portion of the stopper 1111 may be coupled to or inserted into the groove 1125-1 in the roller cover 1125. Consequently, it is possible to increase the contact area between the roller cover 1125 and the bobbin 1110 and thus the binding force between the two components. The roller cover 1125 may be attached or coupled to the bobbin 1110 using an adhesive member.

For example, the groove 1125-1 in the roller cover 1125 may be positioned at the side surface opposite the curved surface (or the curved side surface) abutting the curved portion 1119a of the projection 1119 of the roller cover 1125.

Another embodiment may include a first protrusion, disposed on the top plate of the cover member 1300 and positioned so as to correspond to the first groove 1051a, and a second protrusion, positioned so as to correspond to the second groove 1051b, in place of the roller cover 1125.

Next, the magnet 1130 will be described.

The magnet 1130 may be disposed or mounted on the bobbin 1110.

For example, the magnet 1130 may be disposed on the side surface 1110b-1 of the bobbin 1110, for example, in the mounting recess 1102 formed in the outer surface of the first projection 118a.

Although the magnet 1130 may have a shape corresponding to the side surface 1110b-1 of the bobbin 1110, for example, a rectangular parallelepiped shape, the disclosure is not limited thereto.

Although the magnet 1130 may be a bipolar magnetized magnet in order to increase the drive force resulting from the electromagnetic interaction with the coil 1120, the disclosure is not limited thereto.

For example, the magnet 1130 may be a bipolar magnetized magnet, which is divided into two poles in a direction perpendicular to the optical axis OA. Here, the magnet 1130 may be embodied by a ferrite magnet, an alnico magnet, a rare-earth magnet or the like.

For example, the magnet 1130 may include a first magnet portion 31 including an N pole and an S pole, a second magnet portion 32 including an S pole and an N pole, and a non-magnetic partition wall 33.

The first magnet portion 31 and the second magnet portion 32 may be spaced apart from each other, and the non-magnetic partition wall 33 may be positioned between the first magnet portion 31 and the second magnet portion 32.

The non-magnetic partition wall is a portion that is almost completely non-magnetic and which may include a zone having almost no polarity. The non-magnetic partition wall may be filled with air or a non-magnetic material, and may be referred to as a "neutral zone".

In another embodiment, the magnet 1130 may be a monopolar magnetized magnet including an S pole and an N pole.

Next, the base 1210 will be described.

Figure 22:
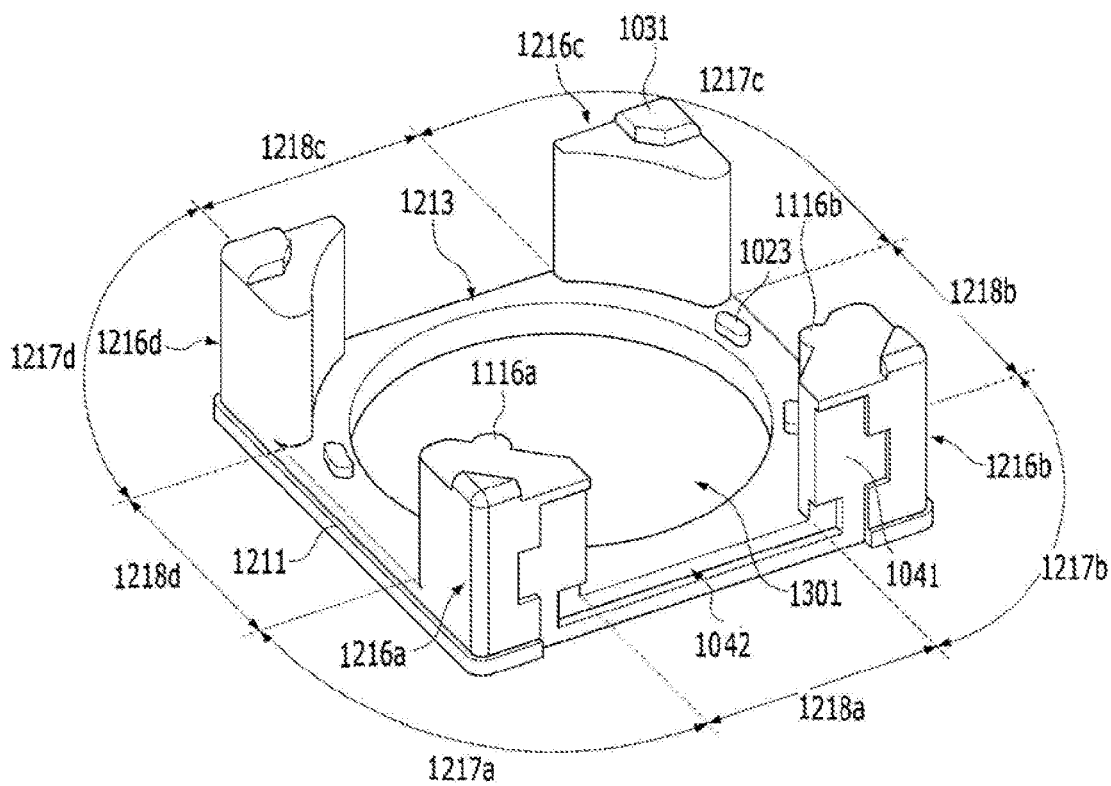
FIG. 22 is a first perspective view of the base shown in FIG. 19.
Figure 23:
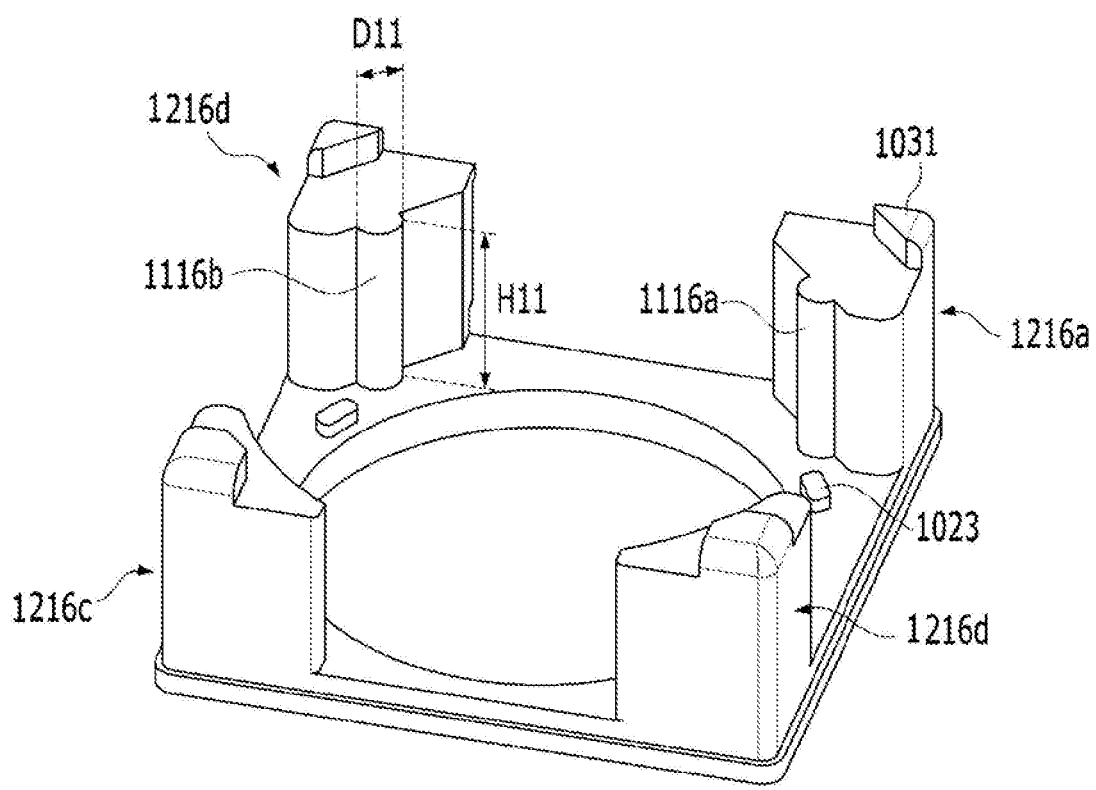
FIG. 23 is a second perspective view of the base shown in FIG. 19.

FIG. 22 is a first perspective view of the base 1210 shown in FIG. 19. FIG. 23 is a second perspective view of the base 1210 shown in FIG. 19.

Referring to FIGS. 19, 22 and 23, the base 1210 may be coupled to the cover member 1300, and may define a space for accommodating the bobbin 1110 in conjunction with the cover member 1300.

The base 1210 may have therein an opening 1301 corresponding to the opening in the cover member 1300 and/or the opening in the bobbin 1110. The base 1210 may have a shape that coincides with or corresponds to that of the cover member 1300, for example, a square shape.

The base 1210 may include a body 1213 having therein the opening 1301 and the posts 1216a to 1216d projecting from the body 1213.

The body 1213 of the base 1210 may include corner portions 1217 to 1217d and side portion 1218a to 1218d positioned between the corner portions 1217 to 1217d.

Each of the posts 1216a to 1216d may be disposed at a corresponding one of the corner portions 1217 to 1217d of the body 1213.

For example, the base 1210 may include the first post 1216a, projecting upwards a predetermined height from the first corner portion 1217a, the second post 1216b, projecting a predetermined height from the second corner portion 1217b, the third post 1216c, projecting a predetermined height from the third corner portion 1217c, and the fourth post 1216d, projecting a predetermined height from the fourth corner portion 1217d.

The term "post" of the base 1210 may be interchangeably used with "projection".

Although each of the posts 1216a to 1216d may have, for example, a polygonal column shape or a circular or elliptical column shape vertically projecting from the upper surface of the body 1213 of the base 1210, the disclosure is not limited thereto.

Although the cross section of each of the posts 1216a to 1216d may have an "L" shape or a polygonal shape such as a triangular shape, the disclosure is not limited thereto.

Although the horizontal length of each of the side portion 218a to 218d of the body 1213 of the base 1210 may be greater than the horizontal length of each of the corner portions 1217 to 1271d of the body 1213 of the base 1210, the disclosure is not limited thereto.

Openings may be defined between two adjacent posts 1216a and 1216b, 1216b and 1216c, 1216c and 1216d, and 1216d and 1216a.

Although the height of each of the posts 1216a to 1216d from the upper surface of the body 1214 of the base 1210 may be the same, the disclosure is not limited thereto.

The base 1210 may include stoppers 1023 projecting from the upper surface of the body 1213. Although at least one, for example, two stoppers 1023 may be disposed on each of the second side portion 1218b and the fourth side portion 1218d, the positions and number thereof are not limited thereto. Each of the stoppers 1023 may be referred to as a "lower stopper".

The stopper 23 may prevent the lower surface or the lower end of the bobbin 1110 from directly colliding with the body 1213 of the base 1210.

The base 1210 may include stoppers 1031 disposed on the upper surfaces or the upper ends of the posts 1216a to 1216d. Each of the stoppers 1031 may be referred to as an "upper stopper".

For example, the stoppers 1031 of the base 1210 may be structures projecting from the upper surfaces of the posts 1216a to 1216d in the optical-axis direction.

The stoppers 1031 of the base 1210 may serve to ensure a space or a gap in which the bobbin 1110 is movable during AF operation.

The lower end of the outer surface of the body 1213 of the base 1210 may be provided with a step 1211. The step 1211 may be in contact with the lower ends of the side plates of the cover member 1300, and may guide the cover member 1300. Here, the step 1211 of the base 1210 and the lower ends of the side plates of the cover member 1300 may be adhesively and sealably secured to each other using an adhesive or the like.

The base 1210 may include a first support 1116a provided at the inner surface of the first post 1216a and a second support 1116b provided at the inner surface of the second post 1216b.

The first support 1116a may project from the inner surface of the first post 1216a, and the second support may project from the inner surface of the second post 1216b.

Although the first support 1116a may have the shape of a column, for example, a semicircular column projecting from the inner surface of the first post 1216a, the disclosure is not limited thereto, and the first support may have various column shapes.

Although the second support 1116b may have the shape of a column, for example, a semicircular column projecting from the inner surface of the second post 1216b, the disclosure is not limited thereto, and the second support may have various column shapes.

For example, the inner surface of the first post 1216a may be the side surface that faces the side surface 1110c-1 of the bobbin 1110, and the inner surface of the second post 1216b may be the side surface that faces the side surface 1110c-2 of the bobbin 1110.

Although the first support 1116a and the second support 1116b may be symmetrical with respect to the first side portion 1218a of the base 1210, the disclosure is not limited thereto.

Referring to FIG. 23, the first support 1116a may extend to the upper surface from the lower surface of the first post 1216a. The upper end or the upper portion of the first support 1116a may abut the upper surface of the first post 1216a and may be positioned in the same plane as the upper surface of the first post 1216a; however, the disclosure is not limited thereto.

The second support 1116b may extend to the upper surface from the lower surface of the second post 1216b. The upper end or the upper portion of the second support 1116b may abut the upper surface of the second post 1216b and may be positioned in the same plane as the upper surface of the second post 1216b; however, the disclosure is not limited thereto.

In another embodiment, the upper end or the upper portion of the first support 1116a may be spaced apart from the upper surface of the first post 1216a. Furthermore, the lower end or the lower portion of the first support 1116a may be spaced apart from the upper surface of the body 1213 of the base 1210.

In another embodiment, the upper end or the upper portion of the second support 1116b may be spaced apart from the upper surface of the second post 1216b. The lower end or the lower portion of the second support 1116b may be spaced apart from the upper surface of the body 1213 of the base 1210.

The base 1210 may include a first mounting recess 41 and a second mounting recess 42 formed in the first and second posts 1216a and 1216b and the body 1213.

Each of the first mounting recess 1041 and the second mounting recess 1042 may have a stepped structure or a two-level structure based on the outer surface of the first and second posts 1216a and 1216b of the base 1210.

The first mounting recess 1041 may be formed in the outer surfaces of the first and second posts 1216a and 1216b and the outer surface of the first side portion 1218a of the body 1213 and may have a shape that is identical to or coincides with that of the circuit board 1190.

The second mounting recess 1042 may be positioned in the first mounting recess 1041, and may be formed in the outer surfaces of the first and second posts 1216a and 1216b and the outer surface of the first side portion 1218a. The second mounting recess 1042 may have a shape that is identical to or coincides with that of the magnetic body 1195.

Next, the circuit board 1190 will be described.

The circuit board 1190 may be disposed at or secured to the base 1210. For example, the circuit board 1190 may be secured to the first and second posts 1216a and 1216b of the base 1210. Alternatively, the circuit board 1190 may be disposed at or secured to the first and second posts 1216a and 1216b and the first side portion 1218a of the body 1213.

For example, the circuit board 1190 may be disposed in the first mounting recess 1041.

The circuit board 1190 may include terminals conductively connected to the coil. The terminals of the circuit board may include a first terminal 1091 and a second circuit board 1092. The terminals of the circuit board 1190 may be disposed at the body 1213.

For example, the circuit board 1190 may be a printed circuit board or a flexible printed circuit board.

Next, the coil 1120 will be described.

The coil 1120 may be disposed, mounted or secured to the circuit board 1190 so as to correspond to or face the magnet 1130. For example, the coil 1120 may be disposed on the first surface of the circuit board 1190, and the terminals 1091 and 1092 may be disposed on the second surface of the circuit board 1190.

The first surface of the circuit board 1190 may be the surface that faces the magnet 1130, and the second surface of the circuit board 1190 may be the surface opposite the first surface of the circuit board 1190.

Although the coil 1120 may be secured or attached to the circuit board 1190 using an adhesive member, the disclosure is not limited thereto.

The coil 1120 may be positioned between the first post 1216a and the second post 1216b of the base 1210.

For example, the coil 1120 may be a ring-shaped coil ring. For example, the coil 1120 may have a ring shape in which the horizontal length thereof is larger than the vertical length thereof.

In order to generate electromagnetic force resulting from the electromagnetic interaction with the magnet 1130. Here, a drive signal applied to the coil 1120 may be a DC signal and may be of a voltage type or a current type. For example, the drive signal applied to the coil 1120 may include at least one of a DC signal and an AC signal.

The coil 1120, to which the drive signal is applied, may electromagnetically interact with the magnet 1130 disposed at the bobbin 1110, and the AF operation unit may be moved in the first direction by means of the electromagnetic force resulting from the electromagnetic interaction between the coil 1120 and the magnet 1130.

By controlling the intensity of the drive signal, it is possible to control the movement of the AF operation unit in the first direction, and it is thus possible to perform an autofocusing function.

The AF operation unit may include the bobbin 1110 and components mounted on the bobbin 1110 and moved therewith. For example, the AF operation unit may include the bobbin 1110 and the magnet 1130.

The coil 1120 may be conductively connected to the first terminal 1091 and the second terminal 1092 of the circuit board 1190. For example, the two ends of the coil 1190 may be conductively connected to pads (not shown) provided at the first surface, and the pads (not shown) may be conductively connected to a corresponding one of the first and second terminals 1091 and 1092 of the circuit board 1190.

A drive signal may be applied to the coil 1120 via the first and second terminals 1091 and 1092.

Figure 25:
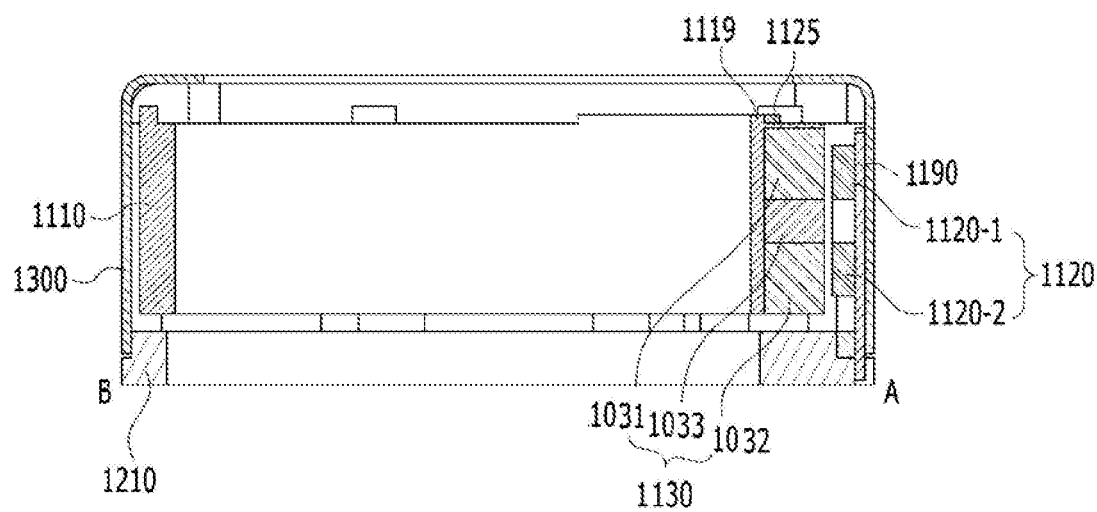
FIG. 25 is a cross-sectional view of the lens moving apparatus shown in FIG. 24, taken along line A-B.
Figure 26:
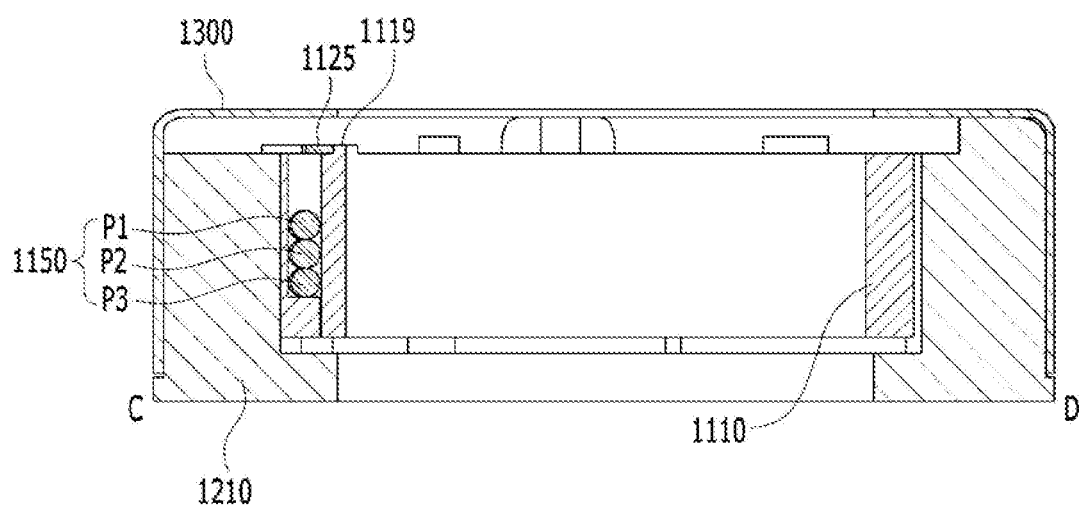
FIG. 26 is a cross-sectional view of the lens moving apparatus shown in FIG. 24, taken along line C-D.

FIG. 24 is a plan view of the lens moving apparatus 1100 from which the cover member 1300 is removed. FIG. 25 is a cross-sectional view of the lens moving apparatus 110 shown in FIG. 24, taken along line A-B. FIG. 26 is a cross-sectional view of the lens moving apparatus 1100 shown in FIG. 24, taken along line C-D.

Referring to FIG. 24, the center 1007a of the opening 1101 in the bobbin 1110 may not be aligned with the center 1007b of the base 1210 or may not coincide with the center 1007b of the base 1210.

For example, the center 1007a of the opening 1101 in the bobbin 1110 may be positioned farther than the center 1007b of the base 1210 from the magnet 1130. For example, the center of a lens mounted on the bobbin 1110 may be positioned farther than the center 1007b of the base 1210 from the magnet 1130.

For example, the center 1007b of the base 1210 may be positioned between the center 1007a of the opening 1101 in the bobbin 1110 and the magnet 1130.

The projections 1118a to 1118d of the bobbin 1110 may be positioned between the posts 1216a to 1216d of the base 1210.

For example, each of the projections 1118a to 1118d of the bobbin 1110 may be positioned between two adjacent posts 1216a and 1216b, 1216b and 1216c, 1216c and 1216d, and 1216d and 1216a. Since the projections 1118a to 1118d of the bobbin 1110 are disposed in spaces between the posts 1216a and 1216b, 1216b and 1216c, 1216c and 1216d, and 1216d and 1216a, it is possible to reduce or decrease the size of the lens moving apparatus 1100.

Each of the rollers P1 to P2 and Q1 to Q3 of the first and second roller units 1150 and 1160 may be in contact with the side surfaces 1051 of the first and second grooves 1051a and 1051b. For example, the outer surface of each of the rollers P1 to P2 and Q1 to Q3 may be in surface contact with the side surfaces 1051 of the first and second grooves 1051a and 1051b.

In another embodiment, the side surfaces 1051 of the first and second grooves 1051a and 1051b may be provided with a plurality of protrusions. The plurality of protrusions may be in contact with the outer surfaces of the rollers P1 to P3 and Q1 to Q3.

Figure 30A:
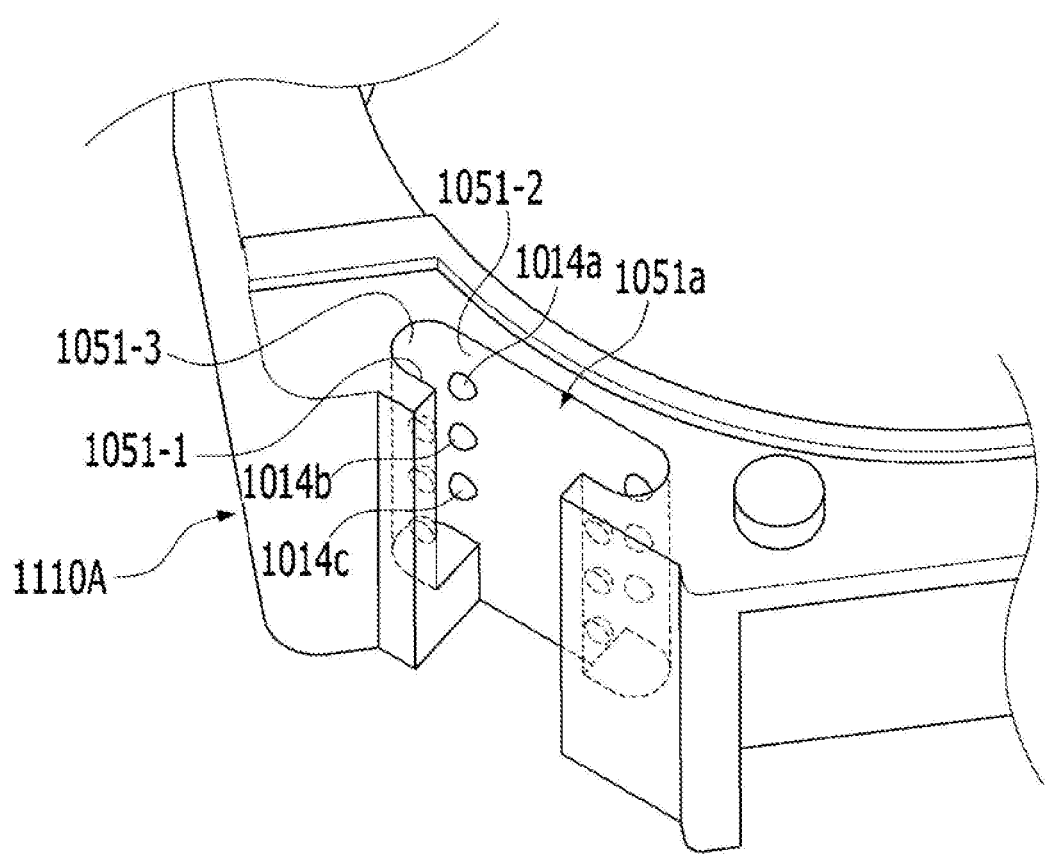
FIGS. 30A to 30C are fragmentary perspective views of other embodiments of the bobbin.
Figure 30B:
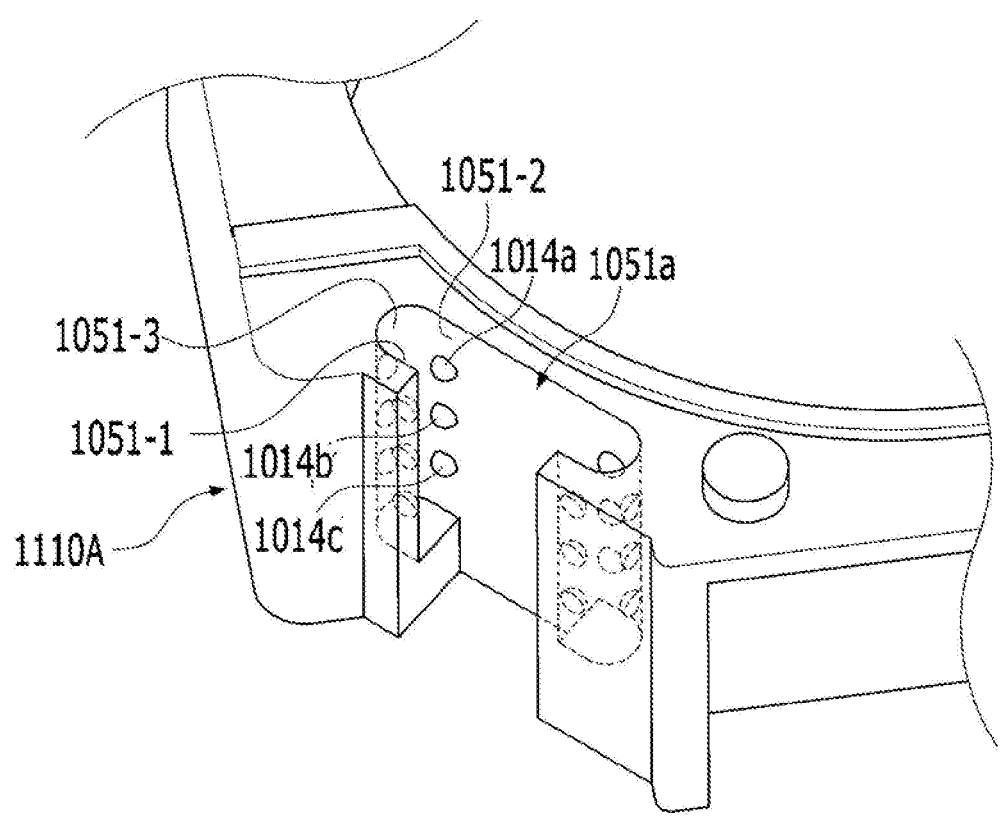
Figure 30C:
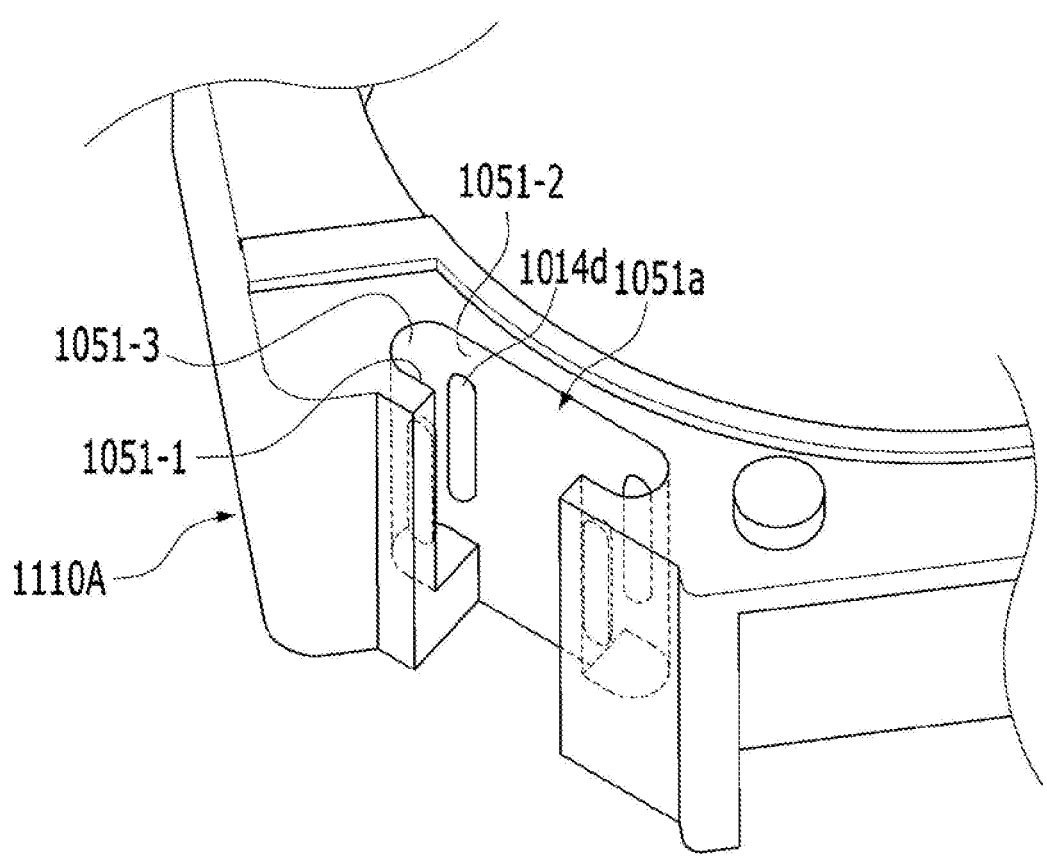

FIGS. 30A to 30C are fragmentary perspective views of other embodiments 1110A of the bobbin 1110.

Referring to FIGS. 30A to 30C, the side surface 1051 of the first groove 1051a in the bobbin 1110A may be provided with a plurality of protrusions 1014a to 1014c or 1014d corresponding to the rollers P1 to P3.

In FIG. 30A, the protrusions 1014a, 1014a and 1014c may be disposed on the first side surface 1051-1 and the second side surface 1051-2 of the first groove 1051a.

In FIG. 30B, the protrusions 1014a, 1014b and 1014c may be disposed on the first to third side surfaces 1051-1, 1051-2 and 1051-3 of the first groove 1051a.

In FIGS. 30A and 30B, each of the protrusions 1014a, 1014b and 1014c may have a hemispherical shape or a dome shape.

In FIG. 30C, each of the protrusions 1014d may have a linear projection shape, and the cross section thereof may have a semicircular shape or an arched shape.

The outer surface or the side surface of each of the rollers P1 to P3 and Q1 to Q3 may be in contact with the plurality of protrusions 1014a to 1014d, but may be spaced apart from the first to third side surfaces 1051-1, 1051-2 and 1051-3.

The side surface 1051 of the second groove 1051b of the bobbin 1110A may be provided with a plurality of protrusions corresponding to the rollers Q1 to Q3. The description regarding the protrusions 1014a to 1014d provided at the side surface 1051 of the first groove 1051b in the bobbin 1110A shown in FIGS. 30A to 30C will also applied to the second groove 1051b in the bobbin 1110A.

In FIGS. 30A to 30C, since the rollers P1 to P3 and Q1 to Q3 may be in point or line contact with the protrusions 1014a to 1014d, the frictional force between the bobbin 1110A and the rollers P1, P2 and P3 shown in FIGS. 30A to 30C may be reduced compared to that between the bobbin 1110 and the rollers.

Referring to FIG. 25, at the initial position of the AF operation unit (for example, the bobbin 1110), the coil 1120 may overlap the magnet 1130 in a direction toward the fourth post 1216d from the first post 1216a.

Here, the initial position of the AF operation unit, for example, the bobbin 1110, may be the original position of the AF operation unit in the state in which no electric power is applied to the coil 1120. In addition, the initial position of the AF operation unit may be the position at which the AF operation unit is located when gravity acts in the direction from the bobbin 1110 to the base 1210 or when gravity acts in the direction from the base 1210 to the bobbin 1110.

For example, in a direction toward the fourth post 1216d from the first post 1216a, an upper portion 1120-1 of the coil 1120 may overlap a first magnet portion 1031 of the magnet 1130, a lower portion 1120-2 of the coil 1120 may overlap a second magnet portion 1032 of the magnet 1130, and the space between the upper portion 1120-1 and the lower portion 1120-2 of the coil 1120 may overlap a non-magnetic partition 1033 of the magnet 1130.

Figure 27:
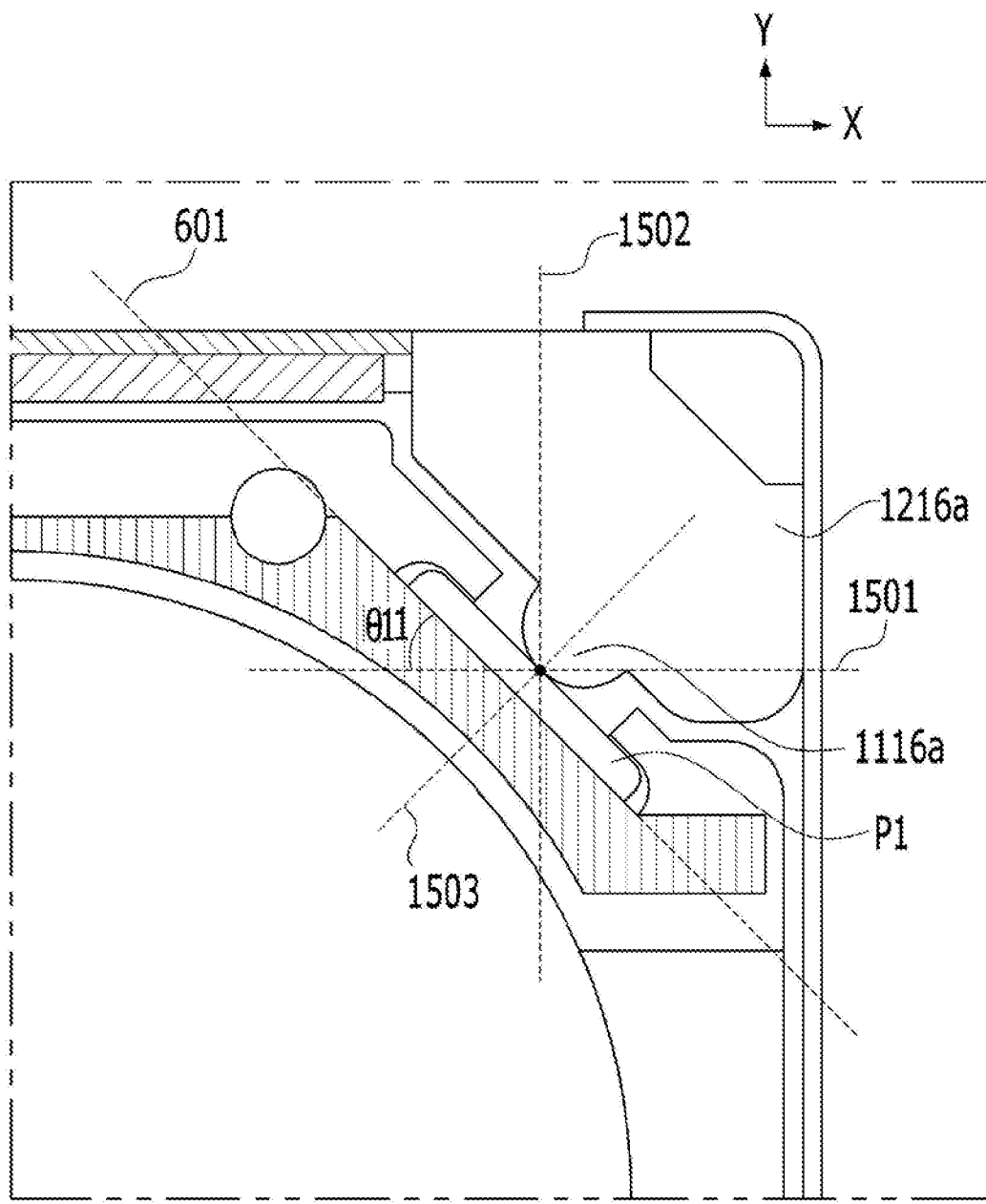
FIG. 27 is a fragmentary enlarged view of FIG. 24.

FIG. 27 is a fragmentary enlarged view of FIG. 24. The description of FIG. 27 may also be applied to the second roller unit 1160 and the second support 1116b of the second post 1216b.

Referring to FIGS. 24 and 27, the rollers P1 to P3 of the first roller unit 1150 may be disposed so as to be inclined at a first angle θ11 with respect to a first reference line 1501.

Furthermore, the rollers Q1 to Q3 of the second roller unit 1160 may be disposed so as to be inclined at a second angle with respect to the first reference line.

Here, the first reference line 1501 may be an imaginary line (for example, an x axis) parallel to the direction toward the second post 1216b from the first post 1216a. For example, the first reference line 1501 may extend through the point at which the rollers (for example, P1, P2 and P3) of the first roller unit 1150 meet the first support 1116a of the base 1210. Alternatively, the first reference line may extend through the point at which the rollers (for example, Q1, Q2 and Q3) of the second roller unit 1160 meet the second support 1116b of the base 1210.

For example, the central axis 601 (see FIG. 6) of the roller (for example, P1) of the first roller unit 1150 may be inclined at a first angle (θ11) with respect to the first reference line 1501. Furthermore, the central axis of the roller (for example, Q1) of the second roller unit 1160 may be inclined at a second angle with respect to the first reference line.

For example, the first angle 811 may be an angle between the central axis 601 (see FIG. 4) of the roller (for example, P1) of the first roller unit 1150 and the first reference line 1501, and the second angle may be an angle between the roller (for example, Q1) of the second roller unit 1160 and the first reference line.

For example, the first angle 811 may be an angle to which the central axis 601 of the roller (for example, P1) of the first roller unit 1150 is rotated clockwise with respect to the first reference line 1501.

Furthermore, the second angle may be an angle to which the central axis of the roller (for example, Q1) of the second roller unit 1160 is rotated clockwise with respect to the first reference line.

For example, the central axis 601 of the roller (for example, P1) may be an axis that extends through the center of the roller (for example, P1) and is parallel to the longitudinal direction of the roller (for example, P1). For example, the center of the roller (for example, P1) may be the diametric center of the roller. The description regarding the central axis 601 of the rollers (for example, P1, P2 and P3) of the first roller unit 1150 may be applied to the central axis of the rollers (for example, Q1, Q2 and Q3) of the second roller unit 1160.

Each of the rollers (for example, P1, P2 and P3) of the first roller unit 1150 may be disposed such that the central axis 601 is disposed so as to be perpendicular to the optical axis OA, and may be rotated about the optical axis.

Each of the rollers (for example, Q1, Q2 and Q3) of the second roller unit 1160 may be disposed such that the central axis is disposed so as to be perpendicular to the optical axis OA, and may be rotated about the optical axis.

The first angle 811 and the second angle may be different from each other.

For example, the first angle θ11 may be 30°~60% and the second angle may be 120°~150°. For example, the second angle may be a value obtained by subtracting the first angle 811 from 180°.

For example, the first angle θ11 may be 40°~50°.
For example, the first angle θ11 may be 43°~47°.
For example, the first angle θ11 may be 45°.

When the first angle θ11 is smaller than 40°, an effect of suppressing the movement of the bobbin 1110 in the x-axis direction may be reduced. When the first angle θ11 is smaller than 40°, an effect of suppressing the movement of the bobbin 1110 in the x-axis direction may be reduced. When the first angle θ11 is larger than 60°, an effect of suppressing the movement of the bobbin 1110 in the y-axis direction may be reduced.

Since the rollers P1 to P3 of the first roller unit 1150 are disposed so as to be inclined at the first angle θ11 with respect to the first reference line 1501 and the rollers Q1 to Q3 of the second roller unit 1160 are disposed so as to be inclined at the second angle with respect to the first reference line, it is possible to suppress the movement of the bobbin 1110 in a direction parallel to the first reference line 1501 (for example, in the x-axis direction) or in a direction parallel to the second reference line 1502 (for example, in the y-axis direction). For example, the second reference line 1502 may be an imaginary line perpendicular to the first reference line 1501.

For example, when the first angle θ11 is 45° and the second angle is 135°, the rollers P1 to P3 of the first roller unit 1150 and the rollers Q1, Q2 and Q3 of the second roller unit 1160 are able to suppress the movement of the bobbin 1110 in the x-axis direction and the y-axis direction in a balanced manner.

For example, the central line 1503 of the first support 1116a of the base 1210 and the central axis 601 of the rollers (for example, P1, P2 and P3) of the first roller unit 1150 may be perpendicular to each other, and the central line of the second support 1116b of the base 1210 and the central axis of the rollers (for example, Q1, Q2 and Q3) of the second roller unit 1160 may be perpendicular to each other; however, the disclosure is not limited thereto.

The central line 1503 of the first support 1116a may be a line that extends through the point, at which the first support is in contact with the rollers (for example, P1, P2 or P3), and divides the first support 1116a into two. For example, the central line 1503 of the first support 1116a may be a line that divides the first support 1116a into two symmetrical segments.

Furthermore, the central line of the second support 1116b may be a line that extends through the point, at which the second support is in contact with the rollers (for example, Q1, Q2 or Q3) and divides the second support 1116b into two. For example, the central line of the second support 1116b may be a line that divides the second support 1116b into two symmetrical segments.

In FIG. 27, the description regarding the disposition of the rollers P1 to P3 of the first roller unit 1150 may also be applied to the disposition of the rollers Q1 to Q3 of the second roller unit 1160.

Referring to FIG. 24, the first roller unit 1150 and the second roller unit 1160 may be parallel to a direction toward the fourth post 1216d from the first post 1216a, and may be symmetrically disposed with respect to the central line 1701 (see FIG. 24), which extends through the center of the opening 1101 in the bobbin 1110.

Next, the magnetic body 1195 will be described.

The magnetic body 1195 may be disposed at the base 1210 and may be positioned under the coil 1120. Attractive force may act between the magnetic body 1195 and the magnet 1130.

For example, the magnetic body 1195 may be positioned lower than the magnet 1130 based on the lower surface of the base 1210, and may serve to suppress tilting of the bobbin 1110 during movement of the bobbin 1110. The magnetic body 1195 may also be referred to as a "tilt suppressor", "tilt compensator" or "tilt controller" because the magnetic body suppresses the occurrence of tilting of the bobbin 1110.

In the lens moving apparatus 1100 according to the embodiment, because the magnet 1130 is disposed on only one side surface 1110b-1 of the bobbin 1110 and only one coil 1120 is disposed so as to correspond to the one magnet 1130, an imbalance in electromagnetic force may occur between the side surface (for example, 1110b-1) of the bobbin 1110 on which the magnet 1130 is disposed, and the opposite side surface 1110b-3 thereof.

Owing to the imbalance in electromagnetic force, tilting of the bobbin 1110 may occur during movement of the bobbin 1110. However, it is possible to suppress the occurrence of tilting of the bobbin since the magnetic body 1195 is made of a material that is attracted to the magnet 1130.

The magnetic body 1195 may be composed of a material that is attracted to a magnet, for example, a magnetic material (for example, a material exhibiting magnetism).

In another embodiment, the magnetic body 1195 may be embodied by a material that is attracted to a magnet, for example, a metal material (for example, iron).

The magnetic body 1195 may be disposed on the outer surface of the base 1210.

For example, the magnetic body 1195 may be disposed on the outer surfaces of the first and second posts 1216a and 1216b and the outer surface of the first side portion 218a of the body 1213 of the base 1210. For example, the magnetic body 1195 may be disposed in the second mounting recess 1042.

The magnet body 1195 may have a plate shape.

For example, the magnet body 1195 may include a plate 1195-1 disposed on the outer surface of the body 1213, a first extension 1195-2 disposed on the outer surface of the first post 1216a and extending upwards from one end of the plate 1195-1, and a second extension 1195-3 disposed on the outer surface of the second post 1216b and extending upwards from the other end of the plate 1195-1.

The plate 1195-1 of the magnetic body 1195 may be disposed on the outer surface of the first side portion 218a of the body 1213 of the base 1210. For example, the magnetic body 1195 may be secured or attached to the base 1210 using an adhesive member.

The first extension 1195-2 may be disposed on the side surface (for example, the outer surface) of the first post 1216a, and may extend in a direction toward the upper surface from the lower surface of the base 1210.

The second extension 1195-3 may be disposed on the side surface (for example, the outer surface) of the second post 1216b, and may extend in a direction toward the upper surface from the lower surface of the base 1210.

The first and second extensions 1195-2 and 1195-3 are capable of increasing the binding force between the magnet body 1195 and the base 1210.

In order to increase the force acting between the magnet 1130 and the magnetic body 1195, the horizontal length L1 (see FIG. 1) of the plate 1195-1 of the magnetic body 1195 may be larger than the horizontal length L2 (see FIG. 20) of the magnet 1130; however, the disclosure is not limited thereto. In another embodiment, L1 may equal to L2.

Since attractive force acts between the magnet 1195 and the magnet 1130, it is possible to set the initial position of the bobbin 1110 even when a drive signal is not applied to the coil 1120.

For example, when a drive signal is not applied to the coil 1120, the force acting between the magnetic body 1195 and the magnet 1130 may cause the bobbin 1110 to be disposed at the lowest position. Here, the lowest level of the bobbin 1110 may be the lowest position from the base 210 within the range of displacement of the bobbin 1110. Here, the lowest position of the bobbin 1110 may be the initial position of the bobbin 1110.

For example, when a drive signal is not applied to the coil 1120, the force acting between the magnetic body 1195 and the magnet 1140 may be equal to or larger than the force required to cause the bobbin 1110 to be disposed at the lowest position.

Since it is possible to set the initial position of the bobbin 1110 by means of the attractive force acting between the magnetic body 1195 and the magnet 1130, it is possible to perform accurate AF operation even without an additional location sensor.

Since the center of the bobbin 1110 is not aligned with the center of the base and only one magnet 1130 is used, the embodiment is able to reduce the number of components.

Since the embodiment includes the rollers in place of a spring, the embodiment is able to reduce the amount of current that is consumed during AF operation compared to a lens moving apparatus employing a spring. Furthermore, since the settling time is reduced, it is possible to increase the speed of AF operation.

Since the magnetic body 1195 and the magnet 1130 are disposed at one side portion 1218*a* of the body 1213 of the base 1210, the embodiment is able to simultaneously perform both tilt compensation and drive operation.

Since the rollers P1 to P3 of the first roller unit 1150 are inclined at a first angle with respect to the first reference line 1501 and the rollers Q1 to Q3 of the second roller unit 1160 are inclined at a second angle with respect to the first reference line, the embodiment is able to suppress the movement of the bobbin 1110 in the x-axis direction and the y-axis direction.

Although the embodiment shown in FIGS. 19 to 27 does not include a location sensor, the disclosure is not limited thereto. A lens moving apparatus according to another embodiment may include a location sensor.

Figure 28:
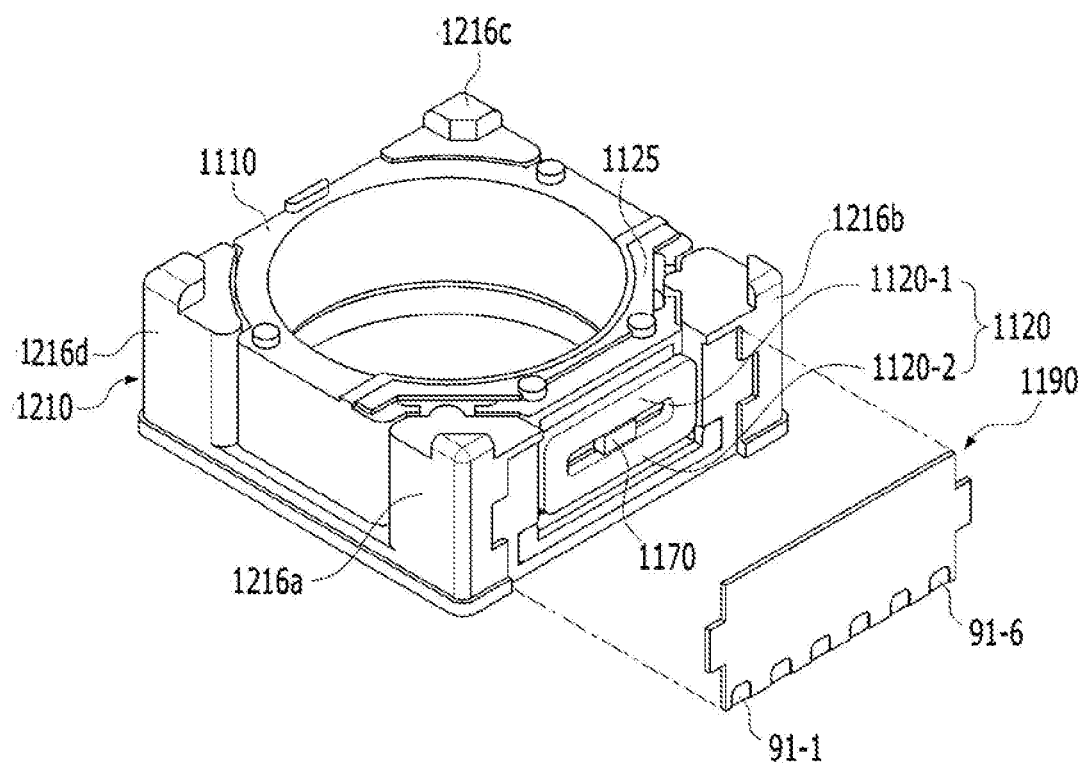
FIG. 28 illustrates a location sensor, which is additionally provided in the lens moving apparatus.

FIG. 28 illustrates a location sensor 1170, which is additionally provided at the lens moving apparatus 1100. FIG. illustrates a cross-sectional view of the embodiment including the location sensor 1170 shown in FIG. 28.

Figure 29:
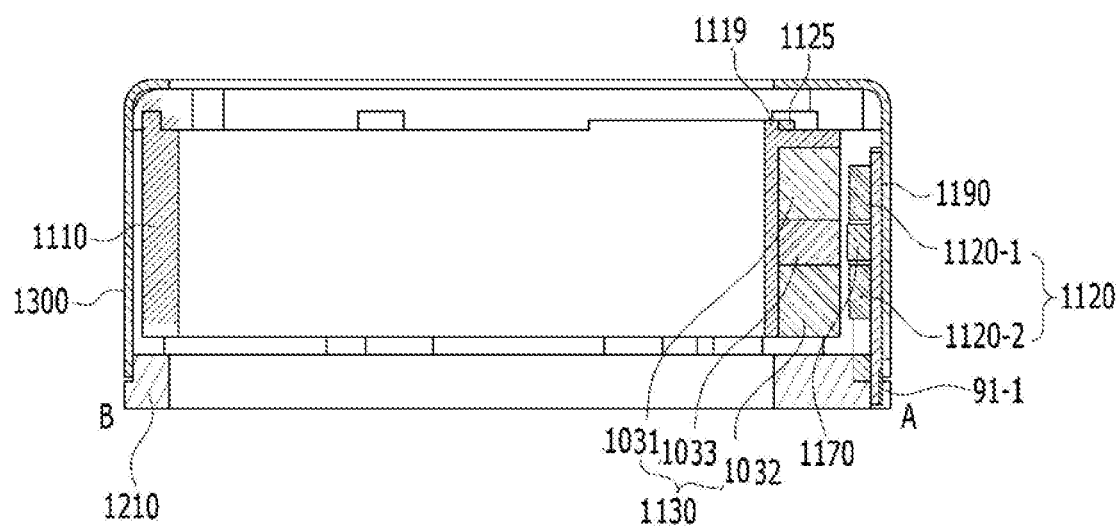
FIG. 29 is a cross-sectional view of the embodiment including the location sensor shown in FIG. 28.

Referring to FIGS. 28 and 29, the location sensor 1170 may be disposed or mounted on the circuit board 1190 and may be positioned in the space formed in the center of the coil 1120.

For example, the location sensor 1170 may be positioned in the space between the upper portion 1120-1 and the lower portion 1120-2 of the coil 1120.

For example, the location sensor 1170 may overlap the non-magnetic partition 1033 of the magnet 1130 in a direction toward the fourth post 1216*d* from the first post 1216*a*.

The location sensor 1170 may detect the intensity of a magnetic field of the magnet 1130 mounted on the bobbin 1110 according to the movement of the bobbin 1110 and may output an output signal corresponding to the detected intensity. The location sensor 1170 may be disposed on the first surface of the circuit board 1190. Here, the first surface of the circuit board 1190 may be the surface on which the coil 1120 is disposed.

The location sensor 1170 may be embodied as a drive-IC-type sensor including a hall sensor or may be embodied as only a single location detection sensor such as a hall sensor or the like.

For example, when the location sensor 1170 is embodied by only one hall sensor, the location sensor 1170 may include two input terminals and two output terminals.

The circuit board 1190 may be conductively connected to the location sensor 1170.

For example, the four terminals of the location sensor 1170 may be conductively connected to the circuit board 1190.

The circuit board 1190 may include a plurality of terminals 91-1 to 91-6, and some of the plurality of terminals may be conductively connected to the four terminals of the location sensor 1170.

For example, the circuit board 1190 may include two terminals (for example, 91-1 and 91-2) conductively connected to the coil 1120 and four terminals (for example, 91-3 to 91-6) conductively connected to the location sensor 1170.

When the location sensor 1170 is a drive-IC-type sensor including a hall sensor, the circuit board 1190 may include four terminals conductively connected to the location sensor 1170 because a drive signal is applied to the coil 1120 from the location sensor 1170.

Since the embodiment is configured such that the first roller unit 1150 and the second roller unit 1160 are disposed at the bobbin 1110, it is possible to increase the amount of available space in the base 1210, and it is thus advantageous to realize desired lengths of the magnet 1130 and the coil 1120.

Furthermore, when the location sensor 1170 is embodied by a location sensor with a driver integrally formed therewith, it is possible to ensure sufficient space to allow the location sensor with the driver to be mounted therein.

Figure 31:
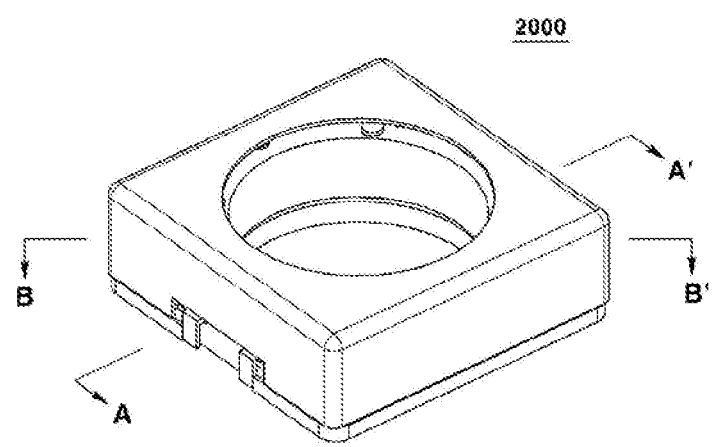
FIG. 31 is a perspective view of a lens moving apparatus according to a further embodiment.
Figure 32:
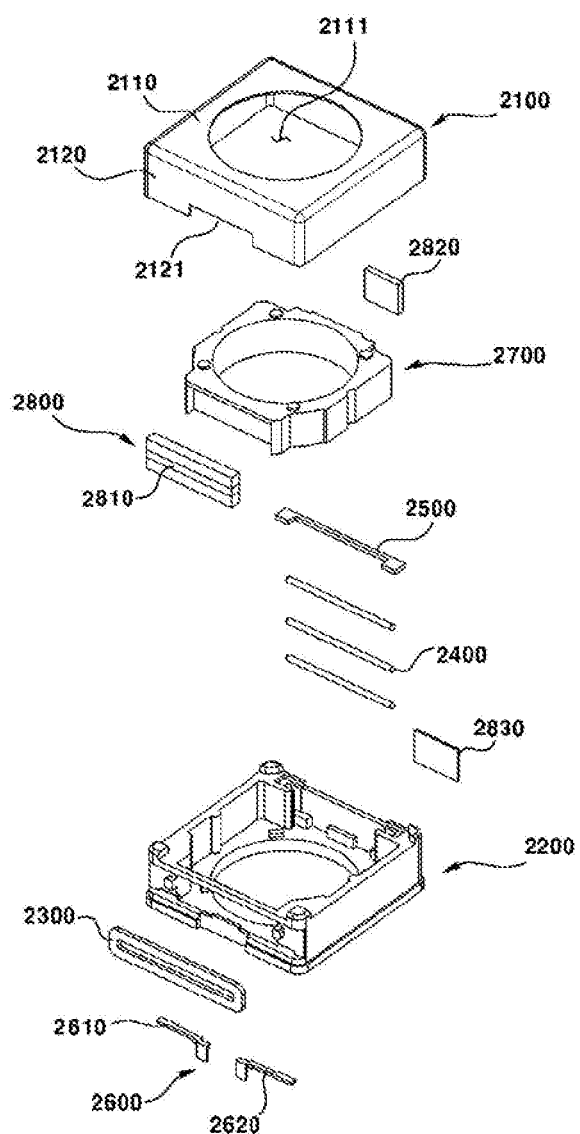
FIG. 32 is an exploded perspective of the lens moving apparatus shown in FIG. 31.
Figure 33:
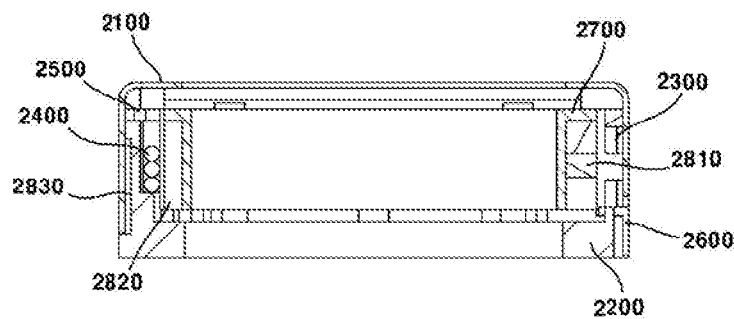
FIG. 33 is a cross-sectional view of the lens moving apparatus shown in FIG. 31, taken along line A-A'.
Figure 34:
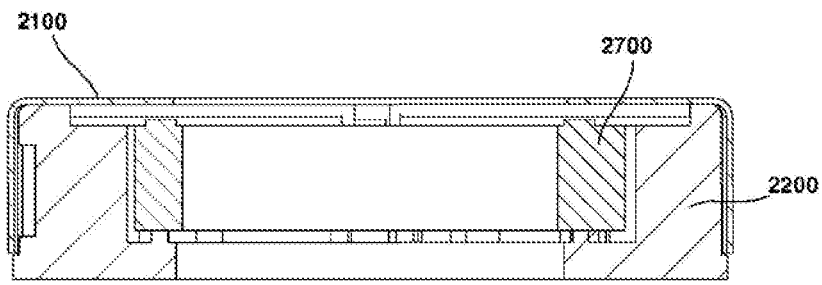
FIG. 34 is a cross-sectional view of the lens moving apparatus shown in FIG. 31, taken along line B-B'.
Figure 35:
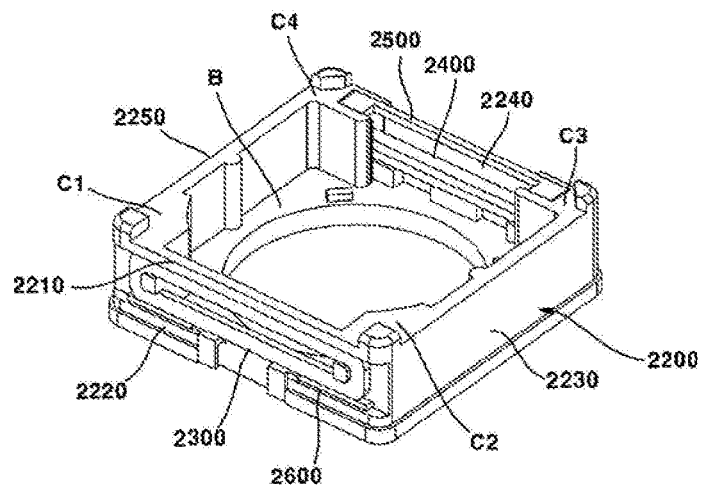
FIG. 35 is a perspective view of the housing, the coil, the roller, the shield member and the base, which are shown in FIG. 32.
Figure 36:
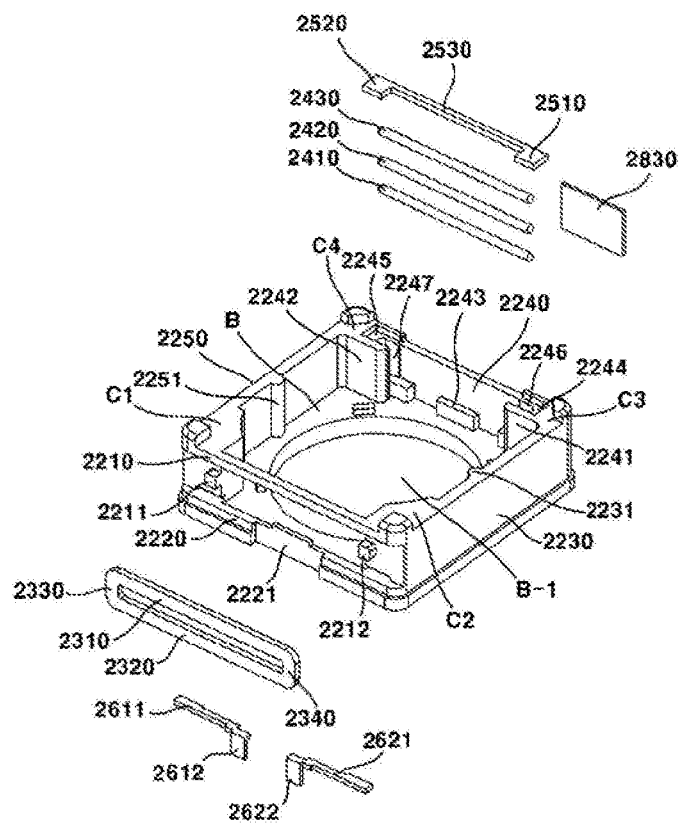
FIG. 36 is a perspective view of the housing, the coil, the roller, the shield member and the terminal, which are shown in FIG. 32.
Figure 37:
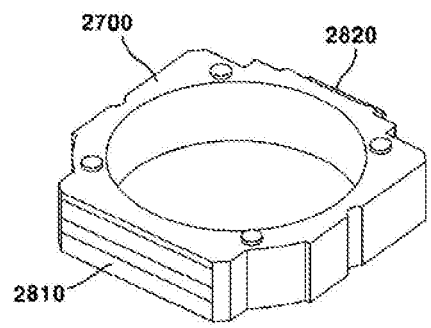
FIG. 37 is a perspective view of the bobbin shown in FIG. 32.
Figure 38:
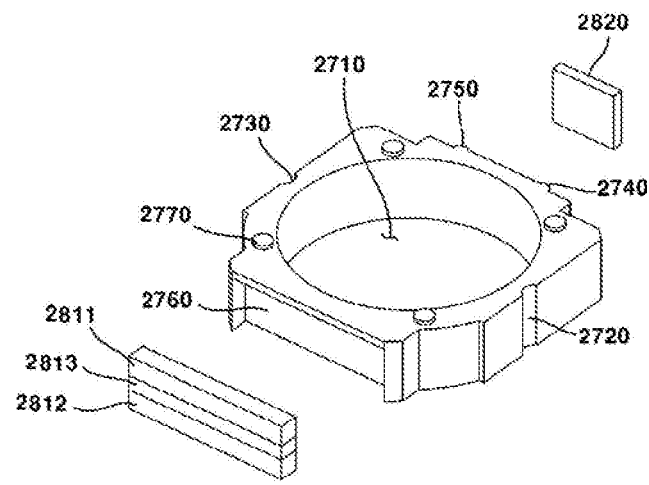
FIG. 38 is a perspective view of the bobbin, the first magnet and the second magnet, which are shown in FIG. 32.
Figure 39:
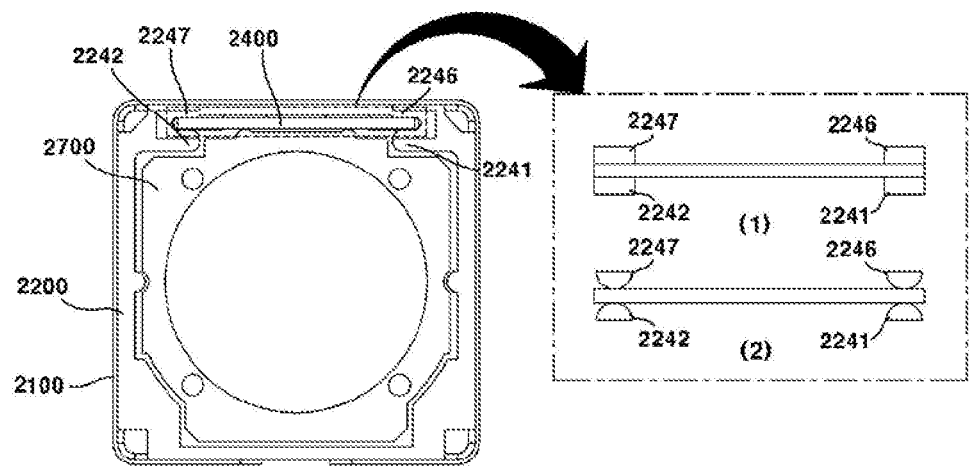
FIG. 39 is a plan view of the lens moving apparatus shown in FIG. 32 in which the roller is in contact with the base of the housing.

FIG. 31 is a perspective view of a lens moving apparatus 2000 according to a further embodiment. FIG. 32 is an exploded perspective view of the lens moving apparatus 2000 shown in FIG. 31. FIG. 33 is a cross-sectional view of the lens moving apparatus 2000 of FIG. 31, taken along line A-A'. FIG. 34 is a cross-sectional view of the lens moving apparatus 2000 of FIG. 31, taken along line B-B'. FIG. 35 is a perspective view of a housing 2200, a coil 2300, a roller 2400, a shield member 2500 and a base 2600, which are shown in FIG. 35. FIG. 36 is a perspective view of the housing 2200, the coil 2300, the roller 2400 and a terminal 2600, which are shown in FIG. 32. FIG. 37 is a perspective view of the bobbin 2700 shown in FIG. 32. FIG. 38 is a perspective view of the bobbin 2700, a first magnet 2810 and a second magnet 2820, which are shown in FIG. 32. FIG. 39 is a plan view illustrating the lens moving apparatus 2000 shown in FIG. 32 in which the roller 2400 is in contact with the base B of the housing 2200.

In the lens moving apparatus 2000 according to the embodiment, a lens module 2010 mounted on the bobbin 2700 is moved vertically (or in the optical-axis direction) together with the bobbin 2700 so as to perform an autofocusing function.

The lens moving apparatus 2000 may include a cover 2100, the housing 2200, the roller 2400, the shield member 2500, the terminal 2600, the bobbin 2700 and a magnet 2800.

The cover 2100 may be an exterior member for the lens moving apparatus 2000.

The cover 2100 may include a metal material. The cover 2100 may block the introduction of electromagnetic waves to the inside thereof from the outside thereof or the radiation of electromagnetic waves to the outside thereof from the inside thereof. Accordingly, the cover 2100 may be referred to as a "shield can". However, the material of the cover 2100 is not limited thereto. In an example, the cover 2100 may include a plastic material.

The cover 2100 may include a top plate 2110 and side plates 2120. The top plate 2110 and the side plates 2120 of the cover 2100 may be integrally formed.

The top plate 2110 of the cover 2100 may be configured to have the form of a square plate with rounded corners. A hole 2111 may be formed in the center of the top plate 2110 of the cover 2100 so as to be aligned with the optical axis.

The side plates 2120 of the cover 2100 may extend downwards from the peripheral edge of the top plate 2110. The number of side plates 2120 of the cover 2100 may be plural.

The side plates 2120 of the cover 2100 may include a first side plate extending downwards from a first side of the top plate 2110, a second side plate extending downwards from a second side of the top plate 2110, a third side plate extending downwards from a third side of the top plate 2110, and a fourth side plate extending downwards from a fourth side of the top plate 2110.

In other words, the cover 2100 may be configured to have the shape of a rectangular parallelepiped with rounded corners and a hole formed in the upper surface thereof, and which is open at the lower surface thereof. The lower opening in the cover 2100 may be closed by means of the base B of the housing 2200. When the cover 2100 is coupled to the housing 2200, the lower surfaces of the side plates 2120 of the cover 2100 may be in contact with (may face) the upper surface of the base B of the housing 2200. An adhesive is applied (disposed) to the contact regions at which the lower surfaces of the side plates 2120 of the cover 2100 are in contact with the upper surface of the base B of the housing 220 or regions between the lower surfaces of the side plates 2120 of the cover 2100 and the upper surface of the base B.

The internal space defined between the cover 2100 and the base B of the housing 2200 may accommodate therein the remaining portion of the housing 2200, the coil 2300, the roller 2400, the shield member 2500, the terminal 2600, the bobbin 2700 and the magnet 2800.

Among the plurality of side plates 2120 of the cover 2100, the side plate that faces the coil 2300 is provided therein with a terminal-exposing portion 2121. The terminal-exposing portion 2121 may be formed upwards from the lower end of the side plate that faces the coil 2300 among the plurality of side plates 2120.

A second-of-first terminal portion 2612 and a second-of-second terminal portion 2622 of the terminal 2600 may be exposed to the outside through the terminal-exposing portion 2121.

The housing 2200 may be disposed inside the cover 2100. The housing 2200 may be disposed under the cover 2100. The bobbin 2700 may be disposed in the housing 2200.

The coil 2300, the roller 2400, the shield member 2500 and the terminal 2600 may be disposed in the housing 2200. The housing 2200 may include a plastic material. The housing 2200 may be an injection-molded plastic product.

The housing 2200 may include the base B, a first post C1, a second post C2, a third post C3, a fourth post C4, a first connector 2210, a second connector 2220, a first side wall 2230, a second side wall 2240, a third side wall 2250, a first holder 2211, a second holder 2212, a terminal-receiving portion 2221, a first stopper 2231, a second stopper 2251, a first shield wall 2241, a second shield wall 2242, a support 2243, a first stepped portion 2244, a second stepped portion 2245, a first contact 2246 and a second contact 2247.

The base B of the housing 2200 may be disposed under the cover 2100. The base B of the housing 2200 may be coupled to the cover 2100. The base B of the housing 2200 may support the cover 2100. Here, the lower surfaces of the plurality of side plates of the cover 2100 may be in contact with the upper surface of the base B. The base B of the housing 2200 may have the approximate form of a square plate.

The first post C1, the second post C2, the third post C3 and the fourth post C4 of the housing 2200 may be respectively disposed at the four corners of the base B. The first post C1, the second post C2, the third post C3 and the fourth post C4 of the housing 2200 may project upwards from the base B. The first post C1, the second post C2, the third post C3 and the fourth post C4 of the housing 2200 may be spaced apart from one another. The first post C1, the second post C2, the third post C3 and the fourth post C4 of the housing 2200 may be positioned so as to correspond one to each of the four corners of the base B.

The first post C1 of the housing 2200 may be provided with the first holder 2211 projecting outwards. The second post C2 of the housing 2200 may be provided with a second holder 2212 projecting outwards.

The first holder 2211 and the second holder 2212 of the housing 2200 may be disposed in the space defined between the first coil portion 2310, the second coil portion 2320, the third coil portion 2330 and the fourth coil portion 2340 of the coil 2300 so as to hold the coil 2300.

The first connector 2210 and the second connector 2220 of the housing 2200 may be positioned between the first post C1 and the second post C2. The first connector 2210 and the second connector 2220 of the housing 2200 may connect the first post C1 to the second post C2.

The first connector 2210 of the housing 2200 may be positioned above the second connector 2220. The second connector 2220 of the housing 2200 may be positioned under the first connector 2210.

The first connector 2210 of the housing 2200 may connect the upper end of the first post C1 to the upper end of the second post C2. The second connector 2220 of the housing 2200 may connect the lower end of the first post C1 to the lower end of the second post C2. The first connector 2210 and the second connector 2220 may be positioned outside the first post C1 and the second post C2. In other words, the first connector 2210 and the second connector 2220 of the housing 2200 may connect the outer surface of the first post C1 to the outer surface of the second post C2.

The coil 2300 may be positioned between the first connector 2210 and the second connector 2220 of the housing 2200. The lower surface of the first connector 2210 of the housing 2200 may be in contact with the upper surface of the first coil portion 2310. An adhesive may be disposed at the contact region in which the first connector 2210 of the housing 2200 is in contact with the coil 2300.

The terminal 2600 may be disposed between the second connector 2220 of the housing 2200 and the coil 2300. A first-of-first terminal portion 2611 and a first-of-second terminal portion 2621 may be disposed between the upper surface of the second connector 2220 of the housing 2200 and the lower surface of the second coil portion 2320.

The terminal-receiving portion 2221 may be formed in the center of the second connector 2220 of the housing 2200. The terminal-receiving portion 2221 may be formed inwards from the outer surface of the second connector 2220. The terminal-receiving portion 2221 may be positioned so as to directly face the terminal-exposing portion in the cover 2100. The terminal-receiving portion 2221 may extend the lower end of the base B from the second connector 2220 of the housing 2200.

The second-of-first terminal portion 2612 and the first-of-second terminal portion 2622 may be disposed in the terminal-receiving portion 2221 in the housing 2200. Here, the inner surfaces of the second-of-first terminal portion 2612 and the first-of-second terminal portion 2622 may face the terminal-receiving portion 2221 and may be in contact therewith. The outer surfaces of the second-of-first terminal portion 2612 and the first-of-second terminal portion 2622 may be exposed to the outside through the terminal-exposing portion 2121 in the cover 2100.

The first side wall 2230 of the housing 2200 may be positioned between the second post C2 and the third post C3. The first side wall 2230 of the housing 2200 may connect the second post C2 to the third post C3. The first side wall 2230 of the housing 2200 may face the third side wall 270, with the bobbin 2700 interposed therebetween. The first side wall 2230 of the housing 2200 may be provided at the center thereof with a first stopper 2231 projecting inwards.

The first stopper 2231 of the housing 2200 may face a second stopper 2251 with the bobbin 2700 interposed therebetween. The first stopper 2231 of the housing 2200 may take the form of a semicircular column extending vertically. In other words, the inner surface of the first stopper 2231 of the housing 2200 may be provided with a curvature. The horizontal section of the first stopper 2231 may have a semicircular shape.

The first stopper 2231 of the housing 2200 may be received in a first groove 2720 in the bobbin 2700. The first stopper 2231 of the housing 2200 may have a shape corresponding to the first groove 2720 in the bobbin 2700. The first stopper 2231 of the housing 2200 may be spaced apart from the bobbin 2700 by a predetermined distance. When tilting of the bobbin 2700 occurs, the first stopper 2231 of the housing 2200 may come into contact with the bobbin 2700, thereby preventing tilting of the bobbin 2700.

The second side wall 2240 of the housing 220 may be positioned between the third post C3 and the fourth post C4. The second side wall 2240 of the housing 2200 may connect the third post C3 to the fourth post C4. The second side wall 2240 of the housing 2200 may face the first connector 2210 and the second connector 2220 with the bobbin 2700 interposed therebetween. The inner surface of the second side wall 2240 of the housing 2200 may be provided with the roller 2400.

The shield member 2500 may be disposed on the second side wall 2240.

The outer surface of the second side wall 2240 of the housing 2200 may be provided with a third magnet 2830.

The third post C3 of the housing 2200 may be provided with the first shield wall 2241, which projects toward the fourth post C4 from the third post C3. The first shield wall 2241 may be positioned inside the second side wall 2240. The first shield wall 2241 may be spaced apart from the second side wall 2240 of the housing 2200.

One end of the roller 2400 may be positioned between the first shield wall 2241 of the housing 2200 and the second side wall 2240. The outer surface of the first shield wall 2241 may be in contact with the roller 2400. As illustrated in (1) of FIG. 39, the outer surface of the first shield wall 2241 may be planar. As a result, the outer surface of the first shield wall 2241 and the roller 2400 may be in line contact with each other at the same level (in the vertical section). Alternatively, as illustrated in (2) of FIG. 29, the outer surface of the first shield wall 2241 may be convex toward the roller 2400. As a result, the outer surface of the first shield wall 2241 and the roller 2400 may in point contact with each other at the same level (in the vertical section).

The fourth post C4 of the housing 2200 may be provided with the second shield wall 2242, which projects toward the third post C3 from the fourth post C4. The second shield wall 2242 may be positioned inside the second side wall 2240. The second shield wall 2242 of the housing 2200 may be spaced apart from the second side wall 2240. The other end of the roller 2400 may be positioned between the second shield wall 2242 of the housing 2200 and the second side wall 2240. The outer surface of the second shield wall 2242 may be in contact with the roller 2400. As illustrated in (1) of FIG. 39, the outer surface of the second shield wall 2242 may be planar. As a result, the outer surface of the second shield wall 2242 and the roller 2400 may be in line contact with each other at the same level (in the vertical section).

Alternatively, as illustrated in (2) of FIG. 39, the outer surface of the second shield wall 2242 may be convex toward the roller 2400. As a result, the outer surface of the second shield wall 2242 and the roller 2400 may be in point contact with each other at the same level (in the vertical section).

The base B of the housing 2200 may be provided with a support 2243 projecting upwards. The support 2243 may be positioned inside the second side wall 2240 of the housing 2200.

The support 2243 may be positioned under the roller 2400. The upper surface of the support 2243 may be in contact with the roller 2400 so as to support the roller 2400. The upper surface of the support 2243 may be in contact with a first roller 2410 so as to support the first roller 2410.

The upper surface of the third post C3 of the housing 2200 may be provided with the first stepped portion 2244 depressed downwards. The first stepped portion 2244 may be positioned between the second side wall 2240 and the first shield wall 2241.

The upper surface of the fourth post C4 of the housing 2200 may be provided with the second stepped portion 2245 depressed downwards. The second stepped portion 2245 may be positioned between the second side wall 2240 of the housing 2200 and the second shield wall 2242 of the housing 2200.

The shield member 2500 may be disposed on the first stepped portion 2244 and the second stepped portion 2245 of the housing 2200. Here, a first shield portion 2510 of the shield member 2500 may be disposed on the first stepped portion 2244. A second shield portion 2520 of the shield member 2500 may be disposed on the second stepped portion 2245.

The second side wall 2240 of the housing 2200 may be provided with the first contact 2246, which projects toward one end of the roller 2400 from the inner surface of the second side wall 2240. The first contact 2246 may be in contact with the roller 2400. The first contact 2246 may extend vertically. As illustrated in (1) of FIG. 39, the outer surface of the first contact 2246 may be planar. As a result, the outer surface of the first contact 2246 and the roller 2400 may be in contact with each other at the same level (in the vertical section).

Alternatively, as illustrated in (2) of FIG. 39, the outer surface of the first contact 2246 may be convex toward one end of the roller 2400. In other words, the first contact 2246 may have a semicircular column shape. As a result, the outer surface of the first contact 2246 and the roller 2400 may be in point contact with each other at the same level (in the vertical section).

The second side wall 2240 of the housing 2200 may be provided with the second contact 2247, which projects toward the other end of the roller 2400 from the inner surface of the second side wall 2240. The second contact 2247 may be in contact with the roller 2400.

The second contact 2247 may project vertically. As illustrated in (1) of FIG. 39, the outer surface of the second contact 2247 may be planar. As a result, the outer surface of the second contact 2247 and the roller 2400 may be in line contact with each other at the same level (in the vertical section). Alternatively, as illustrated in (2) of FIG. 39, the outer surface of the second contact 2247 may be convex toward the other end of the roller 2400. In other words, the second contact 2247 may have a semicircular column shape. As a result, the outer surface of the second contact 2247 and the roller 2400 may be in point contact with each other at the same level (in the vertical section).

The third side wall 2250 of the housing 2200 may be positioned between the fourth post C4 and the first post C1. The third side wall 2250 of the housing 2200 may connect the fourth post C4 to the first post C1. The third side wall 2250 of the housing 2200 may face the first side wall 2230 with the bobbin 2700 interposed therebetween. The third side wall 2250 of the housing 2200 may be provided at the center thereof with the second stopper 2251 projecting inwards.

The second stopper 2251 may face the first stopper 2231 with the bobbin 2700 interposed therebetween. The second stopper 2251 may have a semicircular column shape extending vertically. In other words, the inner surface of the second stopper 2251 may be formed with a curvature. The horizontal section of the second stopper 2251 may have a semicircular shape.

The second stopper 2251 of the housing 220 may be received in a second groove 2730 in the bobbin 2700. The second stopper 2251 of the housing 2200 may have a shape corresponding to that of the second groove 2730 in the bobbin 2700. The second stopper 2251 of the housing 2200 may be spaced apart from the bobbin 2700 by a predetermined distance. When tilting of the bobbin 2700 occurs, the second stopper 2251 of the housing 2200 may come into contact with the bobbin 2700, thereby preventing tilting of the bobbin 2700.

The coil 2300 may be disposed at the housing 2200. The coil 2300 may be disposed on the outer surfaces of the first post C1 and the second post C2 of the housing 2200. At least a portion of the coil 2300 may be exposed to the inside of the housing 2200 through the opening defined between the first post C1 and the second post C2.

The coil 2300 may be disposed such that the portion of the coil 2300 that is exposed to the inside of the housing 2200 directly faces the magnet 2800. The coil 2300 may face the roller 2400 with the bobbin 2700 interposed therebetween. The coil 2300 may be positioned between the first connector 2210 and the second connector 2220.

The coil 2300 may be held by the first holder 2211 and the second holder 2212 of the housing 2200.

The coil 2300 may be conductively connected to the terminal 2600. Here, one lead wire of the coil 2300 may be conductively connected to the first-of-first terminal portion 2611 of the first terminal 2610, and the other lead wire of the coil 2300 may be conductively connected to the first-of-second terminal portion 2621 of the second terminal 2620.

In place of the circuit board 190, 1190 illustrated in FIGS. 1 and 19, the first terminal 2610 and the second terminal 2620 of the terminal 600 illustrated in FIGS. 32 and 36 may be disposed at the base 210, 1210. Here, the description regarding the first-of-first terminal portion 2611 of the first terminal 2610 and the first-of-second terminal portion 2621 of the second terminal 2620 of the terminal 600 illustrated in FIGS. 32 and 36 may be applied.

When current is applied to the coil 2300, the coil 2300 may electromagnetically interact with the first magnet 2810 of the magnet 2800, thereby providing force required for AF operation to the bobbin 2700. Here, the current is supplied to the coil 2300 from a substrate 2030 (see FIG. 41) via the terminal 2600. The intensity, wavelength, direction or the like of the current applied to the coil 2300 may be controlled.

The coil 2300 may include the first coil portion 2310, the second coil portion 2320, the third coil portion 2330 and the fourth coil portion 2340.

The first coil portion 2310 may be positioned above the second coil portion 2320. The first coil portion 2310 may extend toward the outer surface of the second post C2 from the outer surface of the first post C1.

The second coil portion 2320 may be positioned under the first coil portion 2310. The second coil portion 2320 may extend toward the outer surface of the first post C1 from the outer surface of the second post C2 of the housing 2200.

The third coil portion 2330 may connect one end of the first coil portion 2310 to one end of the second coil portion 2320. The fourth coil portion 2340 may connect the other end of the first coil portion 2310 to the other end of the second coil portion 2320. Consequently, the coil 2300 may have a ring shape.

The roller 2400 may be disposed at the housing 2200. The roller 2400 may be positioned inside the second side wall 2240 of the housing 2200. The roller 2400 may be positioned between the third post C3 and the fourth post C4 of the housing 2200. The roller 2400 may face the coil 2300 with the bobbin 2700 interposed therebetween. The roller 2400 may face the third magnet 2830 with the second side wall 2240 interposed therebetween.

The roller 2400 may be disposed between the second magnet 2820 and the third magnet 2830. One end of the roller 400 may be positioned between the second side wall 2240 and the first shield wall 2241 of the housing 2200. The other end of the roller 2400 may be disposed between the second side wall 2240 and the second shield wall 2242 of the housing 2200.

The roller 2400 may include a plastic material. The roller 2400 may be an injection-molded plastic product.

One end of the roller 2400 may be in contact with the first contact 2246 of the second side wall 2240 of the housing 2200 and may be supported thereby. One end of the roller 2400 may be in contact with the outer surface of the first shield wall 2241 of the housing 2200 and may be supported thereby.

The other end of the roller 2400 may be in contact with the second contact 2247 of the second side wall 2240 of the housing 2200 and may be supported thereby. The other end of the roller 2400 may be in contact with the outer surface of the second shield wall 2241 of the housing 2200 and may be supported thereby. The intermediate portion of the roller 2400 may be in contact with a third contact 2740 and a fourth contact 2750 of the bobbin 2700. Here, the roller 2400 may support the bobbin 2700.

The roller 2400 may have a circular cylindrical shape. The axis of the roller 2400 may extend to the fourth post C4 from the third post C3 of the housing 2200. The roller 2400 may have a curved surface, which is configured to be rotated about the axis extending to the fourth post C4 from the third post C3 of the housing 2200. The roller 2400 may have a curved surface, which is configured to be circumferentially disposed about the axis extending to the fourth post C4 from the third post C3 of the housing 2200. Accordingly, the roller 2400 is capable not only of guiding the bobbin 2700 in the vertical direction but also of supporting the bobbin 2700 in the horizontal direction when the bobbin 2700 is moved vertically (in an up-and-down direction).

The support 2243 of the housing 2200 may be positioned under the roller 2400. The shield member 2530 may be positioned above the roller 2400.

The roller 2400 may include a plurality of rollers. In an example, the number of rollers 2400 may be three. The roller 2400 may include a first roller 2410, a second roller 2420, and a third roller 2430, which are layered vertically.

The first roller 2410 may be in contact with the support 2243 and may be supported thereby. The shield member 2500 may be positioned above the third roller 2430. Accordingly, the shield member 2500 is capable of preventing the roller 2400 from being moved upwards and separated from the housing 2200 together with the bobbin 2700.

The shield member 2500 may be disposed at the housing 2200. The shield member 2500 may be disposed above the roller 2400. The shield member 2500 may be disposed above the third roller 2430. The lower surface of the shield member 2500 may face the roller 2400. The shield member 2500 may have a plate shape. The shield member 2500 may include a first shield portion 2510, a second shield portion 2520 and a third shield portion 2530.

The first shield portion 2510 of the shield member 2500 may be disposed on the third post C3 of the housing 2200. The first shield portion 2510 of the shield member 2500 may be disposed on the first stepped portion 2244 of the housing 2200. The lower surface of the first shield portion 2510 of the shield member 2500 may be in contact with the upper surface of the first stepped portion 2244 of the housing 2200.

The second shield portion 2520 of the shield member 2500 may be disposed on the fourth post C4 of the housing 2200. The second shield portion 2520 of the shield member 2500 may be disposed on the second stepped portion 2245 of the housing 2200. The lower surface of the second stepped portion 2520 of the shield member 2500 may be in contact with the upper surface of the second stepped portion 2245 of the housing 2200.

The third shield portion 2530 of the shield member 2500 may connect the first shield portion 2510 to the second shield portion 2520. The third shield portion 2530 of the shield member 2500 may be disposed on the second side wall 2240 of the housing 2200. The lower surface of the third shield portion 2530 of the shield member 2500 may be in contact with the upper surface of the second side wall 2240 of the housing 2200.

The terminal 2600 may be disposed at the housing 2200. The terminal 2600 may be disposed between the second connector 2220 of the housing 2200 and the coil 2300. The terminal 2600 may be conductively connected to the coil 2300. The terminal 2600 may be conductively connected to the substrate 2030 of the camera module. The terminal 2600 may include an electrical conductive material. The terminal 2600 may include a magnetic material. The terminal 2600 may include metal.

The terminal 2600 may serve to supply current to the coil 2300.

Because the terminal is magnetic, attractive force may act between the terminal 2600 and the first magnet 2810 of the magnet 2800. As a result, the terminal 2600 may prevent tilting of the bobbin 2700. In an example, when vertical drive force is generated at the bobbin 2700 due to the electromagnetic interaction between the coil 2300 and the first magnet 2810, a moment may be generated at the bobbin 2700 because the first magnet 2810 is eccentrically disposed at one side of the bobbin 2700. In this case, since the bobbin 2700 is correctly positioned by the attractive force acting between the terminal 2600 and the first magnet 2810, it is possible to prevent tilting of the bobbin.

The terminal 2600 may include the first terminal 2610 and the second terminal 2620. The first terminal 2610 and the second terminal 2620 may be spaced apart from each other. Here, the first terminal 2610 may be disposed at the first post C1 of the housing 2200 in an imbalanced manner, and the second terminal 2620 may be disposed at the second post C2 of the housing 2200 in an imbalanced manner.

The first terminal 2610 may include the first-of-first terminal portion 2611 and the second-of-first terminal portion 2612. The first-of-first terminal portion 2611 may have a plate shape and may be positioned between the coil 2300 and the second connector 2220. The second-of-first terminal portion 2612 may extend downwards from the first-of-first terminal portion 2611 and may be disposed in the terminal-receiving portion 2221.

The first-of-first terminal portion 2611 may be conductively connected to one lead wire of the coil 2300. The second-of-first terminal portion 2612 may be conductively connected to the substrate 2030 of the camera module 2001.

The second terminal 2620 may include the first-of-second terminal portion 2621 and the second-of-second terminal portion 2622. The first-of-second terminal portion 2621 may have a plate shape and may be positioned between the coil 2300 and the second connector 2220. The second-of-second terminal portion 2622 may extend downwards from the first-of-second terminal portion 2621, and may be disposed in the terminal-receiving portion 2221. The first-of-second terminal portion 2621 may be conductively connected to the other lead wire of the coil 2300. The second-of-second terminal portion 2622 may be conductively connected to the substrate 2030 of the camera module 2001.

The bobbin 2700 may be positioned inside the housing 2200. The bobbin 2700 may have the form of a block having a hole 2710 vertically formed in the center thereof. The lens module 2010 of the camera module 2001 may be mounted in the bobbin 2700. The magnet 2800 may be disposed at the bobbin 2700. The bobbin 2700 may include a plastic material. The bobbin 2700 may be an injection-molded plastic product.

The bobbin 2700 may be moved vertically (in an up-and-down direction) so as to perform an AF function by the electromagnetic interaction between the coil 2300 and the first magnet 2810. Here, the bobbin 2700 may be supported by the roller 2400, and may be guided vertically.

The bobbin 2700 may include the hole 2710, the first groove 2720, the second groove 2730, the first contact 2740, the second contact 2750, a magnet-receiving portion 2760 and an upper stopper 2770.

The surface of the bobbin 2700 that corresponds to the first side wall 2230 of the housing 2200 may be provided with the first groove 2720. The first groove 2720 may be formed inwards from the outer surface of the bobbin 2700. The first stopper 2231 of the housing 2200 may be received in the first groove 2720.

The surface of the bobbin 2700 that corresponds to the third side wall 2250 of the housing 2200 may be provided with the second groove 2730. The second groove 2730 may be formed inwards from the outer surface of the bobbin 2700. The second stopper 2251 of the housing 2200 may be received in the second groove 2730.

The surface of the bobbin 2700 that corresponds to the second side wall 2240 of the housing 2200 may be provided with the third contact 2740 and the fourth contact 2750.

The third contact 2740 of the bobbin 2700 may project from the outer surface of the bobbin 2700 toward the portion between the center and one end of the roller 2400. The third contact 2740 of the bobbin 2700 may be in contact with the roller 2400.

The third contact 2740 of the bobbin 2700 may extend vertically. The outer surface of the third contact 2740 of the bobbin 2700 may be convex toward the roller 2400. In other words, the third contact 2740 of the bobbin 2700 may have a semicircular column shape. As a result, the outer surface of the third contact 2740 of the bobbin 2700 and the roller 2400 may be in point contact with each other at the same level (in the vertical section).

In a modification (not shown), the outer surface of the third contact of the bobbin 2700 may be planar. As a result, the outer surface of the third contact of the bobbin 2700 and the roller 2400 may be in line contact with each other at the same level (in the vertical direction).

The fourth contact 2750 of the bobbin 2700 may project from the outer surface of the bobbin 2700 toward a portion between the center and the other end of the roller 2400. The fourth contact 2750 of the bobbin 2700 may be in contact with the roller 2400. The fourth contact 2750 of the bobbin 2700 may extend vertically. The outer surface of the fourth contact 2750 of the bobbin 2700 may be convex toward the roller 2400. In other words, the fourth contact 2750 of the bobbin 2700 may have a semicircular column shape. As a result, the outer surface of the fourth contact 2750 of the bobbin 2700 and the roller 2400 may be in point contact with each other at the same height (in the vertical section).

In a modification (not shown), the outer surface of the fourth contact of the bobbin 2700 may be planar. As a result, the outer surface of the fourth contact of the bobbin 2700 and the roller 2400 may be in line contact with each other at the same level (in the vertical section).

The third contact 2740 and the fourth contact 2750 of the bobbin 2700 may be spaced apart from each other, and may be positioned between the first shield wall 2241 and the second shield wall 2242 of the housing 2200.

The third contact 2740 of the bobbin 2700 may be positioned close to one end of the roller 2400, and the fourth contact 2750 may be positioned close to the other end of the roller 2400.

The surface of the bobbin 2700 that faces the coil 2300 may be provided therein with the magnet-receiving portion 2760. The magnet-receiving portion 2760 may be formed inwards from the outer surface of the bobbin 2700. The first magnet 2810 may be disposed in the magnet-receiving portion 2760.

The upper surface of the bobbin 2700 may be provided with the upper stopper 2770, which projects upwards. When the bobbin 2700 is moved upwards, the upper stopper 2770 may come into contact with the top plate 2110 of the cover 2100, thereby blocking the upward movement of the bobbin 2700. The upper stopper 2770 may include a plurality of stoppers. In an example, there may be four upper stoppers 2770, and the four upper stoppers 2770 may be circumferentially spaced apart from each other around the hole 2710 in the bobbin.

The magnet 2800 may be disposed at the bobbin 2700 and the housing 2200. The magnet 2800 may serve to provide drive force to the bobbin 2700, to prevent tilting of the bobbin 2700 and to maintain the contact between the bobbin 2700 and the roller 2400.

The magnet 2800 may include the first magnet 2810, the second magnet 2820 and the third magnet 2830.

The first magnet 2810 may be disposed at the bobbin 2700. The first magnet 2810 may be disposed at the surface of the bobbin 2700 that faces the first connector 2210 and the second connector 2220 of the housing 2200. The first magnet 2810 may be received in the magnet-receiving portion 860. The first magnet 2810 may directly face the coil 2300.

The first magnet 2810 electromagnetically interacts with the coil 2300 to provide drive force to the bobbin 2700. Accordingly, the first magnet 2810 may be referred to as a "drive magnet". Attractive force may act between the first magnet 2810 and the terminal 2600, thereby prevent tilting of the bobbin 2700.

The first magnet 2810 may include a first magnet portion 2811, a second magnet portion 2812 and a third magnet portion 2813. The first magnet portion 2811 may be vertically spaced apart from the second magnet portion 2812.

The third magnet portion 2813 may be positioned between the first magnet portion 2811 and the second magnet portion 2812.

The first magnet portion 2811 may directly face the first coil portion 2310. The second magnet portion 2812 may directly face the second coil portion 2320. The orientation of the polarities of the first magnet portion 2811 and the second magnet portion 2812 (the orientation of an N pole and an S pole) may be different from each other (opposite each other).

The reason for this is because the direction in which current flows along the first coil portion 2310 and the direction in which current flows along the second coil portion 2320 are different from each other. As a result, drive force in the same direction may be generated even when the direction in which current flows along the first coil portion 2310 and the direction in which current flows along the second coil portion 2320 are different from each other.

The polarities of the first magnet portion 2811 and the second magnet portion 2812 may be disposed at the outside and the inside. In an example, the inside of the first magnet portion 2811 may be an N pole, the outside of the first magnet portion 2811 may be an S pole, the inside of the second magnet portion 2812 may be an S pole, and the outside of the second magnet portion 2812 may be an N pole.

The third magnet portion 2813 may be disposed between the first magnet portion 2811 and the second magnet portion 2812. The third magnet portion 2813 may have no polarity. In other words, the polarity of the third magnet portion 2813 may be neutral.

The second magnet 2820 may be disposed at the bobbin 2700. The second magnet 2820 may be disposed on the surface of the bobbin 2700 that faces the second side wall 2240 of the housing 2200.

The second magnet 700 may directly face the roller 2400. The second magnet 2820 may be disposed between the third contact 2740 and the fourth contact 2750 of the bobbin 2700. The second magnet 2820 may be prevented from coming into contact with the roller 2400 (may be spaced apart from the roller) by the third contact 2740 and the fourth contact 2750.

The second magnet 2820 may face the third magnet 2830 with the roller 2400 and the second side wall 2240 of the housing 2200 interposed therebetween. Attractive force may act between the second magnet 2820 and the third magnet 2830.

The reason for this is because the roller 2400 and the housing 2200 are injection-molded plastic products, which are permeable to magnetic field lines. As a result, the second magnet 2820 is capable of preventing tilting of the bobbin 2700. Accordingly, the second magnet 2820 may be referred to as a "first tilting magnet". Furthermore, the second magnet 2820 may bring the roller 2400 into contact with the bobbin 2700. In other words, the contact between the third contact 2740 of the bobbin 2700 and the roller 2400 and the contact between the fourth contact 2750 of the bobbin 2700 and the roller 2400 may be maintained by the attractive force acting between the second magnet 2820 and the third magnet 2830.

The third magnet 2830 may be disposed at the housing 2200. The third magnet 2830 may be disposed outside the second side wall 2240 of the housing 2200. The third magnet 2830 may face the second magnet 2820 with the roller 2400 and the second side wall 2240 of the housing 2200 interposed therebetween. Attractive force may act between the third magnet 2830 and the second magnet 2820. As a result, the third magnet 2830 may prevent tilting of the bobbin

2700. Accordingly, the third magnet 2830 may be referred to as a "second tilting magnet". Furthermore, the third magnet 2830 may bring the roller 2400 into contact with the bobbin 2700. In other words, the contact between the third contact 740 of the bobbin 2700 and the roller 2400 may be maintained by the attractive force acting between the third magnet 2830 and the second magnet 2820.

In a first modification (not shown) of the lens moving apparatus 2000 shown in FIG. 32, the third magnet 2830 may be a magnetic member. Here, the magnetic member may include magnetic metal. Similarly, since attractive force acts between the second magnet 2820 and the magnetic member, it is possible to perform the function performed by the second magnet 2820 and the third magnet 2830 shown in FIG. 32.

In a second modification (not shown) of the lens moving apparatus 2000 shown in FIG. 32, the second magnet 2820 may be a magnetic member. Here, the magnetic member may include magnetic metal. Similarly, since attractive force acts between the third magnet 2830 and the magnetic member, it is possible to perform the function performed by the second magnet 2820 and the third magnet 2830 shown in FIG. 32. In the second modification, the third magnet 2830 may be referred to as "second magnet".

Figure 40:
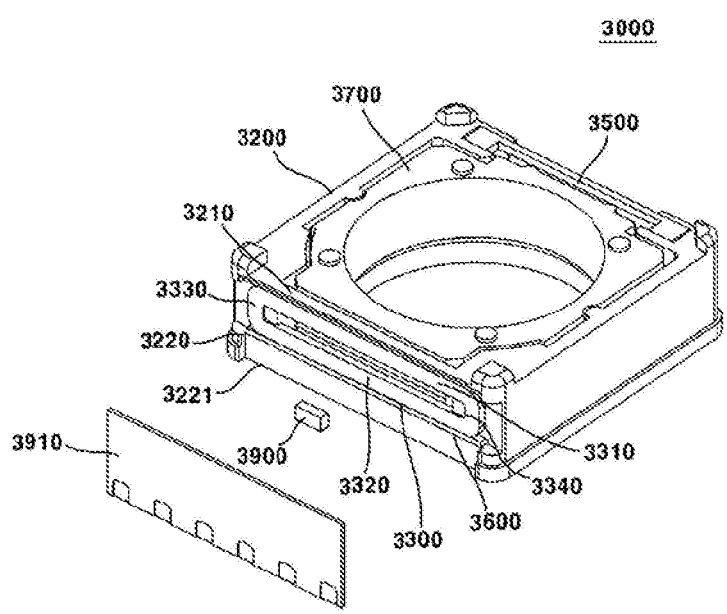
FIG. 40 is a perspective view of a lens moving apparatus according to a further embodiment, from which a cover is removed.

FIG. 40 is a perspective view of a lens moving apparatus 3000 according to a further embodiment, from which a cover is removed.

Referring to FIG. 40, the lens moving apparatus 3000 may include a cover (not shown), a housing 3200, a coil 3300, a roller (not shown), a shield member 3500, a bobbin 3700 and a magnet (not shown), like the lens moving apparatus 2000 shown in FIG. 32. The lens moving apparatus 2000 shown in FIG. 32 may be similar to the lens moving apparatus 3000 according to the embodiment shown in FIG. 40. In other words, the description regarding the housing 2200, the coil 2300, the roller 2400, the shield member 2500, the bobbin 2700 and the magnet 2800, which are shown in FIG. 32, may be applied to the housing 3200, the coil 3300, the roller (not shown), the shield member 3500, the bobbin 3700 and the magnet (not shown), which are shown in FIG. 40.

The lens moving apparatus according to the embodiment shown in FIG. 40 is characterized by inclusion of a hall sensor 33900. The lens moving apparatus 3000 may further include a hall sensor substrate 3910.

Since the hall sensor 3900 may measure the position (or displacement) of the bobbin 3700 and provide feedback on the measured information so as to perform an AF function, thereby more accurately performing an AF function.

The hall sensor 3900 may be disposed in the space defined between a first coil portion 3310, a second coil portion 3320, a third coil portion 3330 and a fourth coil portion 3340 of the coil 3300.

The hall sensor 3900 may be disposed between a first holder and a second holder of the housing 3200. In other words, the hall sensor 3900 may be disposed at the center of the coil 3300.

The hall sensor 3900 may measure the position of the bobbin 3700 by detecting the magnetic force of the first magnet. The hall sensor 3900 may be mounted on the hall sensor substrate 3910.

The hall sensor substrate 3910 may be disposed between the housing 3200 and the cover. The hall sensor substrate 3910 may be disposed so as to face the coil 3300. The hall sensor substrate 3910 may be conductively connected to the coil 3300. The hall sensor substrate 3910 may be conductively connected to the substrate 2030 of the camera module 2001. Consequently, the coil 1300 may receive current from the substrate 2030 of the camera module 2001 via the hall sensor substrate 3910.

The measured position value of the bobbin 3700 may be transmitted to the substrate 2030 of the camera module 2001 via the hall sensor substrate 3910. The controller of the camera module 2001 may control the current applied to the coil 3300 according to the measured position value of the bobbin 3700.

In the lens moving apparatus 3000, the terminal 2600 of the lens moving apparatus 2000 shown in FIG. 32 may be omitted. Instead, a magnetic body 3600 may be additionally provided. The magnetic body 3600, which has a plate shape, may be disposed between the second coil portion 3320 and the second connector. Attractive force may act between the magnetic body 3600 and the first magnet, thereby preventing tilting of the bobbin 3700.

An optical device according to an embodiment may include a body (not shown), a display unit (not shown) disposed on one surface of the body for displaying information, and a camera module (not shown) for taking an image or a photograph, the camera module being disposed inside the body and conductively connected to the display unit.

Figure 41:
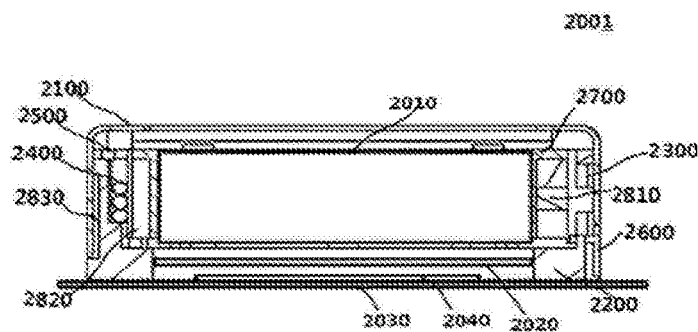
FIG. 41 is a cross-sectional view of a camera module according to an embodiment based on the view of FIG. 33.

Hereinafter, the construction of a camera module 2001 according to an embodiment will be described with reference to the accompanying drawings. FIG. 41 is a cross-sectional view illustrating the camera module 2001 according to the embodiment based on the view of FIG. 33. The camera module 2001 may include a lens moving apparatus 3000, a lens module 2010, an infrared-blocking filter 2020, a substrate 2030, an image sensor 2040 and a controller (not shown).

The lens module 2010 may include a lens and a lens barrel. The lens module 2010 may include one or more lenses (not shown) and a lens barrel accommodating the one or more lenses. The lens module 2010 does not necessarily include the lens barrel as one component thereof, and any holder structure is possible as long as it is capable of supporting the one or more lenses.

The lens module 2010 may be coupled to the lens moving apparatus 3000 and may be moved therewith. For example, the lens module 2010 may be coupled to the lens moving apparatus 3000. For example, the lens module 2010 may be coupled to the lens moving apparatus 3000 in a threaded engagement manner.

For example, the lens module 2010 may be coupled to the lens moving apparatus 3000 using an adhesive (not shown). The light, having passed through the lens module 2010, may be radiated to the image sensor 2040.

The infrared-blocking filter 2020 may be capable of preventing light in an infrared region from entering the image sensor 2040. For example, the infrared-blocking filter 2020 may be positioned between the lens module 2010 and the image sensor 2040.

The infrared-blocking filter 2020 may be positioned at a holder member (not shown), which is provided separately from the housing 2200. Alternatively, the infrared-blocking filter 2020 may be mounted in the hole B-1 formed in the central area of the base B of the housing 2200.

The infrared-blocking filter 2020 may be made of, for example, a film material or a glass material. For example, the infrared-blocking filter 2020 may be manufactured by coating a plate-shaped optical filter, such as cover glass for protecting an image area, with an infrared-screening material.

The substrate 2030 may be a PCB (printed circuit board). The substrate 2030 may support the lens moving apparatus 3000. The image sensor 20 may be mounted on the substrate 2030. For example, the image sensor may be positioned in the inside area of the upper surface of the substrate, and a sensor holder (not shown) may be positioned in the outside area of the upper surface of the substrate.

The lens moving apparatus 3000 may be positioned above the sensor holder. Alternatively, the image sensor 2040 may be positioned in the inside area of the upper surface of the substrate 2030, and the image sensor 2040 may be positioned in the inside area of the upper surface of the substrate 2030. By virtue of this configuration, the light that has passed through the lens module 2010 accommodated in the lens moving apparatus 3000, may be radiated to the image sensor 2040 mounted on the substrate 2030.

The substrate 2030 may supply power to the lens moving apparatus 3000. The substrate 2030 may be conductively connected to the display unit. The controller for controlling the lens moving apparatus 3000 may be positioned at the substrate 2030.

The image sensor 2040 may be mounted on the substrate 2030. The image sensor 2040 may be positioned such that the optical axis thereof is aligned with the lens module 2010. Consequently, the image sensor 2040 may receive the light that has passed through the lens module 2010. The image sensor 2040 may output the radiated light as an image. The image sensor 2040 may be, for example, a CCD (charge coupled device), an MOS (metal oxide semiconductor), a CPD or a CID. However, the type of the image sensor 2040 is not limited thereto.

The controller may be mounted on the substrate 2030. The controller may be positioned outside the lens moving apparatus 3000. Alternatively, the controller may also be positioned inside the lens moving apparatus 3000. The controller may control the direction, the intensity, the amplitude or the like of the current supplied to each of the components constituting the lens moving apparatus 3000. The controller may control the lens moving apparatus 3000 to perform an autofocusing function. In other words, the controller may control the lens moving apparatus 3000 to move the lens module 2010 in the optical-axis direction.

Figure 42:
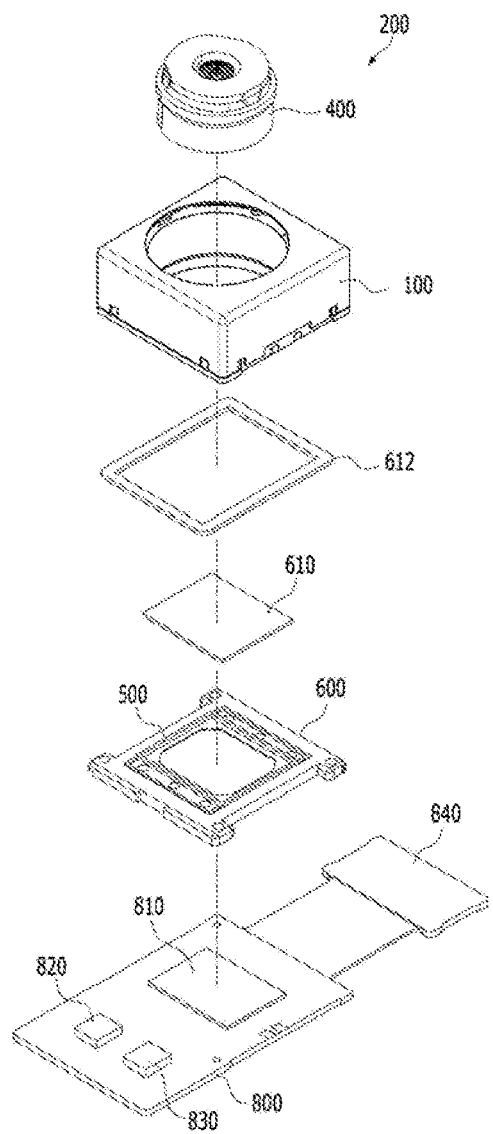
FIG. 42 is an exploded perspective view illustrating a camera module according to another embodiment.

FIG. 42 is an exploded perspective view illustrating a camera module 200 according to an embodiment.

Referring to FIG. 42, the camera module 200 may include a lens or a lens barrel 400, the lens moving apparatus 100, an adhesive member 612, a filter 610, a first holder 600, a second holder 800, an image sensor 810, a motion sensor 820, a controller 830, and a connector 840. A camera module according to another embodiment may include the lens moving apparatus 1100 or 2000 according to other embodiments, in place of the lens moving apparatus 100.

The lens or the lens barrel 400 may be mounted in the bobbin 110 of the lens moving apparatus 100.

The first holder 600 may be disposed under the base 210 of the lens moving apparatus 100. The filter 610 may be mounted on the first holder 600, and the first holder 600 may have a raised portion 500 on which the filter 610 is seated.

The adhesive member 612 may couple or attach the base 210 of the lens moving apparatus 100 to the first holder 600. The adhesive member 612 may be, for example, epoxy, thermohardening adhesive, or ultraviolet hardening adhesive.

The filter 610 may serve to prevent light within a specific frequency band that passes through the lens barrel 400 from being introduced into the image sensor 810. The filter 610 may be, for example, an infrared-light-blocking filter, without being limited thereto. Here, the filter 610 may be oriented parallel to the X-Y plane.

The region of the first holder 600 in which the filter 610 is mounted may have formed therein an opening in order to allow the light that passes through the filter 610 to be introduced into the image sensor 810.

The second holder 800 may be disposed under the first holder 600, and the image sensor 810 may be mounted on the second holder 600. The image sensor 810 may be an area on which an image included in the light that passes through the filter 610 and that is introduced thereinto is formed.

The second holder 800 may include, for example, various circuits, devices, and a controller in order to convert the image, formed on the image sensor 810, into electrical signals and to transmit the electrical signals to an external component. The second holder 800 may be embodied as a circuit board, on which the image sensor 810 may be mounted, on which a circuit pattern may be formed, and to which various devices may be coupled.

The image sensor 810 may receive an image contained in the light introduced through the lens moving apparatus 100, 1100, 2100 and may convert the received image into electrical signals.

The filter 610 and the image sensor 810 may be spaced apart from each other so as to be opposite each other in the first direction.

The motion sensor 820 may be mounted on the second holder 800, and may be conductively connected to the controller 830 through the circuit pattern formed on the second holder 800.

The motion sensor 820 may output information about a rotational angular speed caused by motion. The motion sensor 820 may be embodied as a dual-axis or triple-axis gyro sensor or an angular speed sensor.

The controller 830 may be mounted on the second holder 800. The second holder 800 may be conductively connected to the lens moving apparatus 100. For example, the second holder 800 may be conductively connected to the coil 120 of the lens moving apparatus 100, and may provide a drive signal to the coil 120.

The connector 840 may be conductively connected to the second holder 800, and may be have a port that is intended to be conductively connected to an external device.

Figure 43:
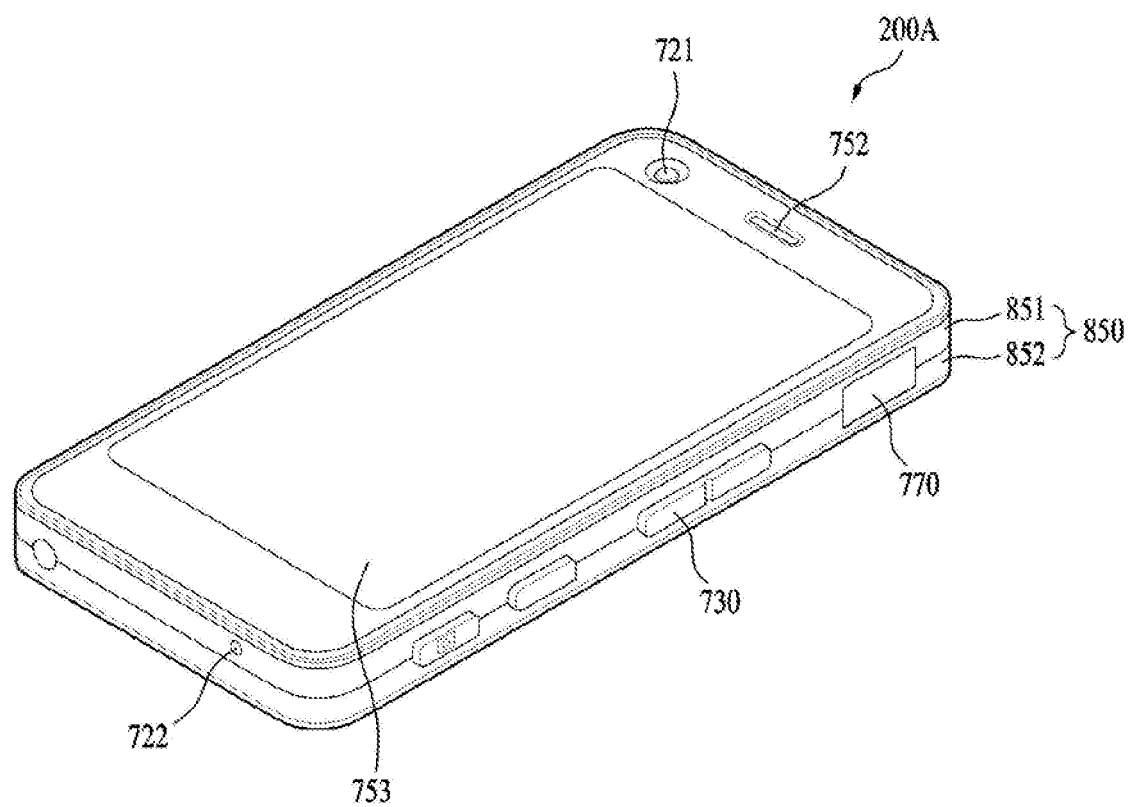
FIG. 43 is a perspective view of a portable terminal according to an embodiment.

FIG. 43 is a perspective view illustrating a portable terminal 200A according to an embodiment. FIG. 43 is a view illustrating the configuration of the portable terminal 200A illustrated in FIG. 35.

Figure 44:
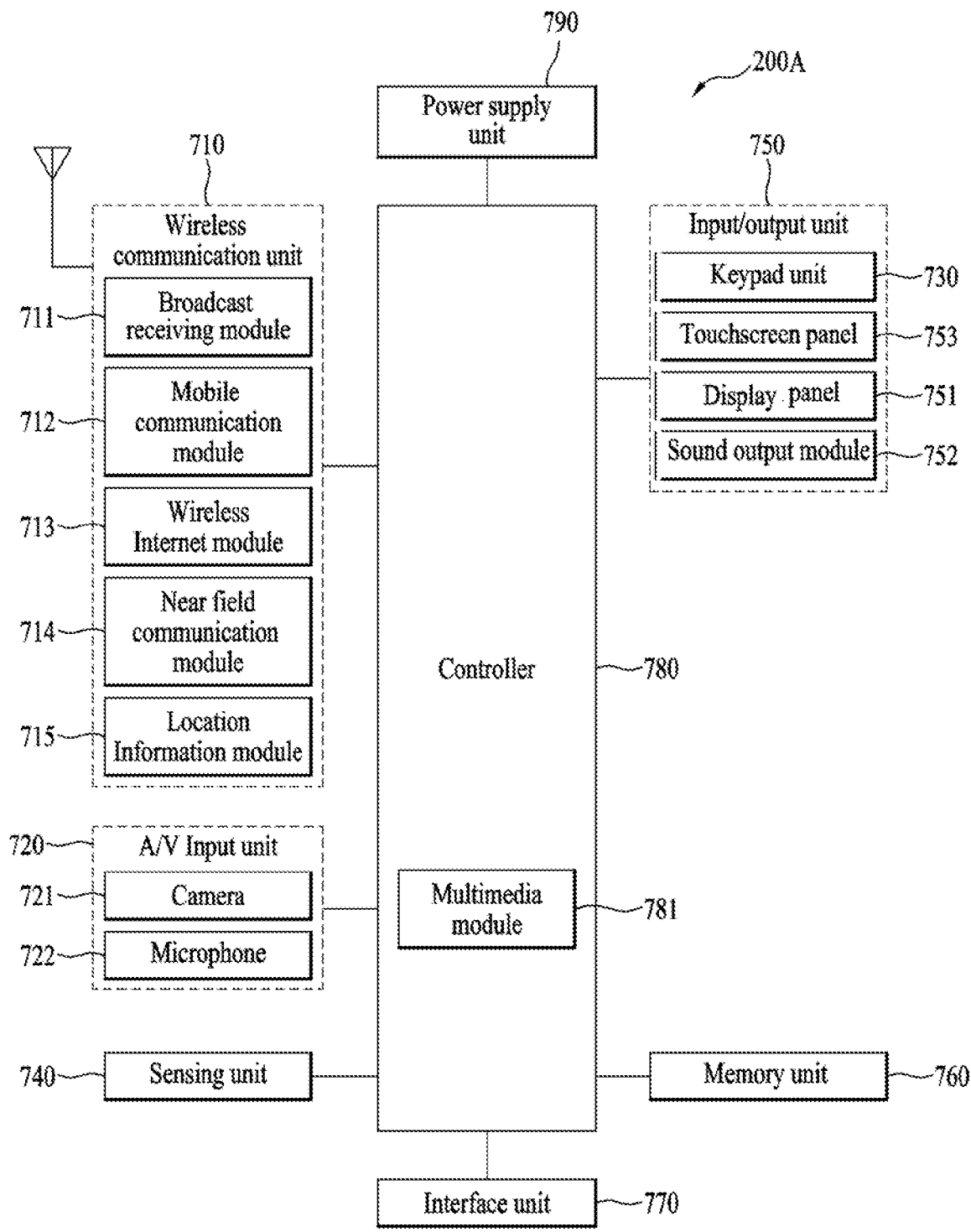
FIG. 44 is a view illustrating the configuration of the portable terminal illustrated in FIG. 43.

Referring to FIGS. 43 and 44, the portable terminal 200A (hereinafter referred to as a "terminal") may include a body 850, a wireless communication unit 710, an audio/video (A/V) input unit 720, a sensing unit 740, an input/output unit 750, a memory unit 760, an interface unit 770, a controller 780, and a power supply unit 790.

The body 850 illustrated in FIG. 43 has a bar shape, without being limited thereto, and may be any of various types, such as, for example, a slide type, a folder type, a swing type, or a swivel type, in which two or more sub-bodies are coupled so as to be movable relative to each other.

The body 850 may include a case (e.g. casing, housing, or cover) defining the external appearance of the terminal. For example, the body 850 may be divided into a front case 851 and a rear case 852. Various electronic components of the terminal may be accommodated in the space defined between the front case 851 and the rear case 852.

The wireless communication unit 710 may include one or more modules, which enable wireless communication between the terminal 200A and a wireless communication system or between the terminal 200A and a network in which the terminal 200A is located. For example, the wireless communication unit 710 may include a broadcast-receiving module 711, a mobile communication module 712, a wireless Internet module 713, a nearfield communication module 714, and a location information module 715.

The A/V input unit 720 serves to input audio signals or video signals, and may include, for example, a camera 721 and a microphone 722.

The camera 721 may be the camera 200 including the camera module 200 according to the embodiment.

The sensing unit 740 may sense the current state of the terminal 200A, such as, for example, the opening or closing of the terminal 200A, the location of the terminal 200A, the presence of a user's touch, the orientation of the terminal 200A, or the acceleration/deceleration of the terminal 200A, and may generate a sensing signal to control the operation of the terminal 200A. When the terminal 200A is, for example, a slide-type cellular phone, the sensing unit 740 may sense whether the slide-type cellular phone is opened or closed. Furthermore, the sensing unit 740 may sense the supply of power from the power supply unit 790, coupling of the interface unit 770 to an external device and the like.

The input/output unit 750 serves to generate, for example, visual, audible, or tactile input or output. The input/output unit 750 may generate input data to control the operation of the terminal 200A, and may display information processed in the terminal 200A.

The input/output unit 750 may include a keypad unit 730, a display module 751, a sound output module 752, and a touchscreen panel 753. The keypad unit 730 may generate input data in response to input on a keypad.

The display module 751 may include a plurality of pixels, the color of which varies in response to electrical signals applied thereto. For example, the display module 751 may include at least one among a liquid crystal display, a thin-film-transistor-liquid crystal display, an organic light-emitting diode, a flexible display and a 3D display.

The sound output module 752 may output audio data received from the wireless communication unit 710 in, for example, a call-signal reception mode, a call mode, a recording mode, a voice recognition mode, or a broadcast reception mode, or may output audio data stored in the memory unit 760.

The touchscreen panel 753 may convert variation in capacitance, caused by a user's touch on a specific region of a touchscreen, into electrical input signals.

The memory unit 760 may temporarily store programs for the processing and control of the controller 780, and input/output data (for example, telephone numbers, messages, audio data, stationary images, moving images and the like). For example, the memory unit 760 may store images captured by the camera 721, for example, pictures or moving images.

The interface unit 770 serves as a path through which the lens moving apparatus is connected to an external device connected to the terminal 200A. The interface unit 770 may receive power or data from the external component, and may transmit the same to respective constituent elements inside the terminal 200A, or may transmit data inside the terminal 200A to the external component. For example, the interface unit 770 may include a wired/wireless headset port, an external charger port, a wired/wireless data port, a memory card port, a port for connection to a device equipped with an identification module, an audio input/output (I/O) port, a video input/output (I/O) port, an earphone port and the like.

The controller 780 may control the general operation of the terminal 200A. For example, the controller 780 may perform control and processing related to, for example, voice calls, data communication, and video calls.

The controller 780 may include a multimedia module 781 for multimedia playback. The multimedia module 781 may be embodied in the controller 780 or may be embodied separately from the controller 780.

The controller 780 may perform a pattern recognition process capable of recognizing writing input or drawing input carried out on a touch screen as a character and an image, respectively.

The power supply unit 790 may supply power required to operate the respective constituent elements upon receiving external power or internal power under the control of the controller 780.

The features, configurations, effects and the like described above in the embodiments are included in at least one embodiment, but the invention is not limited only to the embodiments. In addition, the features, configurations, effects and the like exemplified in the respective embodiments may be combined with other embodiments or modified by those skilled in the art. Accordingly, content related to these combinations and modifications should be construed as falling within the scope of the embodiments.

INDUSTRIAL APPLICABILITY

The embodiments are applicable to a lens moving apparatus capable of improving the speed of AF operation, of suppressing movement of a bobbin during AF operation and of increasing the range of possible sizes of magnet and a coil, and a camera module and an optical device each including the same.

The invention claimed is:

1. A lens moving apparatus comprising:
    a base comprising a body, a first post disposed at a first corner portion of the body, a second post disposed at a second corner portion of the body, a third post disposed at a third corner portion of the body, and a fourth post disposed at a fourth corner portion of the body, the first to fourth posts extending upward from an upper surface of the body;
    a bobbin disposed on the body;
    a first roller unit disposed in a first groove formed in the first post;
    a second roller unit disposed in a second groove formed in the second post adjacent to the first post;
    a magnet disposed at the bobbin; and
    a coil disposed between the first post and the second post so as to correspond to the magnet,
    wherein the first groove comprises a first opening spaced from opposite ends of the first groove, through which a portion of the first roller unit is exposed, and
    wherein the second groove comprises a second opening spaced from opposite ends of the second groove, through which a portion of the second roller unit is exposed, and
    wherein the bobbin comprises:
        a first support extending into the first opening so as to be in contact with the first roller unit; and
        a second support extending into the second opening so as to be in contact with the second roller unit.

2. The lens moving apparatus according to claim 1, wherein the first support projects from an outer surface of the bobbin, and the second support projects from the outer surface of the bobbin.

3. The lens moving apparatus according to claim 1, wherein the first roller unit is in contact with four regions of the first groove and the second roller unit is in contact with four regions of the second groove.

4. The lens moving apparatus according to claim 1, further comprising: a circuit board, which is secured to the base and to which the coil is coupled, the circuit board being secured to the first post and the second post.

5. The lens moving apparatus according to claim 4, wherein the circuit board comprises a terminal conductively connected to the coil, the terminal comprising a first terminal and a second terminal and being disposed at the body.

6. The lens moving apparatus according to claim 1, further comprising: a magnetic body disposed at the base under the coil so as to generate attractive force in cooperation with the magnet.

7. The lens moving apparatus according to claim 6, wherein the magnetic body is disposed on an outer surface of the base.

8. The lens moving apparatus according to claim 7, wherein the magnetic body comprises:
a plate disposed on an outer surface of the body of the base;
a first extension disposed on an outer surface of the first post and extending upwards from the plate; and
a second extension disposed on an outer surface of the second post and extending upwards from the plate.

9. The lens moving apparatus according to claim 1, wherein each of the first roller unit and the second roller unit comprises a plurality of rollers, each of the plurality of rollers having a cylindrical shape.

10. The lens moving apparatus according to claim 9, wherein each of the first roller unit and the second roller unit is disposed so as to be rotatable about an axis perpendicular to an optical axis defined by the bobbin.

11. The lens moving apparatus according to claim 1, wherein the first groove comprises a first side surface, and a second side surface opposite to the first side surface, and the first opening is formed at the first side surface, and
wherein the second groove comprises a third side surface, and a fourth side surface opposite to the third side surface, and the second opening is formed at the third side surface.

12. The lens moving apparatus according to claim 1, wherein the bobbin comprises first to fourth projections disposed at the side surface thereof,
wherein the magnet is disposed in a mounting recess formed in the first projection, and
wherein the first projection is disposed between the first post and the second post, and the second projection is disposed between the second post and the third post, and the third projection is disposed between the third post and the fourth post and the fourth projection is disposed between the fourth post and the first post.

13. The lens moving apparatus according to claim 1, comprising a lubricant disposed in the first groove and the second groove,
wherein the lubricant is in contact with the first groove and the first roller unit, and
wherein the lubricant is in contact with the second groove and the second roller unit.

14. The lens moving apparatus according to claim 1, further comprising a cover member coupled to the base and comprising a top plate and side plates,
wherein the cover member comprises:
a first protrusion projecting from an inner surface of the top plate and disposed in the first groove; and
a second protrusion and projecting from the inner surface of the top plate and disposed in the second groove.

15. A lens moving apparatus comprising:
a base comprising a body, a first post disposed at a first corner portion of the body, a second post disposed at a second corner portion of the body, a third post disposed at a third corner portion of the body, and a fourth post disposed at a fourth corner portion of the body, the first to fourth posts extending upward from an upper surface of the body;
a bobbin disposed on the body;
a first roller unit disposed in a first groove formed in the first post;
a second roller unit disposed in a second groove formed in the second post adjacent to the first post;
a magnet disposed at the bobbin; and
a coil disposed between the first post and the second post so as to correspond to the magnet,
wherein the first groove comprises a first opening, through which a portion of the first roller unit is exposed, and
wherein the second groove comprises a second opening, through which a portion of the second roller unit is exposed, and
wherein the bobbin comprises:
a first support disposed in the first opening so as to be in contact with the first roller unit; and
a second support disposed in the second opening so as to be in contact with the second roller unit,
wherein the first groove comprises a first side surface, and a second side surface opposite to the first side surface, and the first opening is formed at the first side surface, and
wherein the second groove comprises a third side surface, and a fourth side surface opposite to the third side surface, and the second opening is formed at the third side surface, and
wherein the base comprises:
a first guide groove formed in the second side surface of the first groove for injecting lubricant into the first groove; and
a second guide groove formed in the fourth side surface of the second groove for injecting lubricant into the second groove.

16. The lens moving apparatus according to claim 1, wherein each of the first roller unit and the second roller unit comprises a plurality of rollers, and
wherein a ratio of a diameter and a longitudinal length of each of the plurality of rollers is 1:1.5~1:5.

17. The lens moving apparatus according to claim 1, wherein the first roller unit is disposed so as to be inclined at a first angle with respect to a first reference line, and wherein the second roller unit is disposed so as to be inclined at a second angle with respect to the first reference line, and
wherein the first reference line is an imaginary line parallel to a direction toward the second post from the first post, and the first angle is different from the second angle.

18. The lens moving apparatus according to claim 17, wherein each of the first and second angles is 30° 60°.

19. A camera module comprising:
a lens;
a lens moving apparatus according to claim 1; and
an image sensor.

* * * * *